United States Patent
Reid et al.

(10) Patent No.: US 10,118,714 B2
(45) Date of Patent: Nov. 6, 2018

(54) SYSTEM AND METHOD FOR POSITIONING AN AUTOMATED ASSEMBLY TOOL RELATIVE TO A STRUCTURE

(71) Applicant: The Boeing Company, Chicago, IL (US)

(72) Inventors: Eric M. Reid, Kenmore, WA (US); David Paul Banks, Lake Stevens, WA (US); Darrell Darwin Jones, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 875 days.

(21) Appl. No.: 14/558,853

(22) Filed: Dec. 3, 2014

(65) Prior Publication Data

US 2015/0314888 A1    Nov. 5, 2015

Related U.S. Application Data

(60) Provisional application No. 61/986,796, filed on Apr. 30, 2014.

(51) Int. Cl.
*B64F 5/10* (2017.01)
*B64F 5/00* (2017.01)
*B25J 13/08* (2006.01)

(52) U.S. Cl.
CPC ........... *B64F 5/0009* (2013.01); *B25J 13/089* (2013.01); *B64F 5/10* (2017.01); *Y10S 901/41* (2013.01); *Y10S 901/44* (2013.01); *Y10S 901/46* (2013.01)

(58) Field of Classification Search
None
See application file for complete search history.

(56) References Cited

U.S. PATENT DOCUMENTS

| | | | |
|---|---|---|---|
| 4,006,650 A | 2/1977 | Elmer |
| 4,108,566 A | 8/1978 | Jones |
| 4,148,401 A | 4/1979 | Kautetzky |
| 4,445,588 A | 5/1984 | Truninger |
| 4,477,216 A | 10/1984 | Van De Motter et al. |
| 4,483,080 A | 11/1984 | Knoll |
| 4,599,018 A | 7/1986 | Woods |
| 4,674,949 A | 6/1987 | Kroczynski |
| 4,710,086 A | 12/1987 | Naaktgeboren et al. |
| 4,781,517 A | 11/1988 | Pearce et al. |

(Continued)

FOREIGN PATENT DOCUMENTS

| | | | |
|---|---|---|---|
| CA | 2497249 A1 | 8/2006 |
| CA | 2793202 A1 | 6/2013 |

(Continued)

OTHER PUBLICATIONS

Extended European Search Report, dated Sep. 22, 2015, regarding Application No. EP14196571.5, 8 pages.

(Continued)

*Primary Examiner* — Michael Lebentritt
(74) *Attorney, Agent, or Firm* — Yee & Associates, P.C.

(57) ABSTRACT

A method and apparatus for positioning an end effector relative to a structure. The apparatus may comprise the end effector and a sensor system. The end effector may be configured to perform an operation on the structure. The sensor system may have a plurality of sensors extending outward from the end effector.

44 Claims, 32 Drawing Sheets

(56) References Cited

U.S. PATENT DOCUMENTS

| | | | |
|---|---|---|---|
| 4,850,763 A | 7/1989 | Jack et al. | |
| 4,885,836 A * | 12/1989 | Bonomi | B21J 15/10 |
| | | | 227/51 |
| 4,940,382 A | 7/1990 | Castelain et al. | |
| 4,995,146 A | 2/1991 | Woods | |
| 5,022,542 A | 6/1991 | Beier | |
| 5,150,506 A | 9/1992 | Kotake et al. | |
| 5,203,855 A * | 4/1993 | Givler | B21J 15/10 |
| | | | 408/1 R |
| 5,210,935 A * | 5/1993 | Givler | B21J 15/10 |
| | | | 29/243.53 |
| 5,213,454 A * | 5/1993 | Givler | B21J 15/10 |
| | | | 408/61 |
| 5,216,819 A * | 6/1993 | Givler | B21J 15/10 |
| | | | 29/243.53 |
| 5,231,747 A * | 8/1993 | Clark | B21J 15/10 |
| | | | 227/152 |
| 5,231,754 A * | 8/1993 | Givler | B21J 15/10 |
| | | | 29/243.53 |
| 5,259,104 A * | 11/1993 | Givler | B21J 15/10 |
| | | | 29/426.5 |
| 5,263,236 A * | 11/1993 | Givler | B23B 39/16 |
| | | | 29/243.53 |
| 5,326,201 A | 7/1994 | King | |
| 5,351,626 A | 10/1994 | Yanagisawa | |
| 5,390,128 A | 2/1995 | Ryan et al. | |
| 5,407,415 A | 4/1995 | Spishak | |
| 5,419,268 A * | 5/1995 | Fyler | D05B 23/00 |
| | | | 112/470.14 |
| 5,468,099 A | 11/1995 | Wheetley et al. | |
| 5,524,180 A * | 6/1996 | Wang | B60R 21/0132 |
| | | | 600/117 |
| 5,526,203 A | 6/1996 | Mohajerani et al. | |
| 5,564,655 A | 10/1996 | Garland et al. | |
| 5,646,870 A | 7/1997 | Krivokapic et al. | |
| 5,653,351 A | 8/1997 | Grout et al. | |
| 5,657,429 A * | 8/1997 | Wang | A61B 34/70 |
| | | | 600/118 |
| 5,709,026 A | 1/1998 | Veselaski et al. | |
| 5,715,729 A | 2/1998 | Toyama et al. | |
| 5,761,064 A | 6/1998 | La et al. | |
| 5,822,877 A | 10/1998 | Dai | |
| 5,848,859 A * | 12/1998 | Clark | B23B 39/14 |
| | | | 408/1 R |
| 5,910,894 A * | 6/1999 | Pryor | G05B 19/41875 |
| | | | 219/121.64 |
| 5,920,394 A | 7/1999 | Gelbart et al. | |
| 6,098,260 A | 8/2000 | Sarh | |
| 6,210,084 B1 * | 4/2001 | Banks | B21J 15/10 |
| | | | 29/34 B |
| 6,230,382 B1 | 5/2001 | Cunningham et al. | |
| 6,779,272 B2 | 8/2004 | Day et al. | |
| 6,843,328 B2 | 1/2005 | Boyl-Davis et al. | |
| 6,862,912 B2 | 3/2005 | Olsson | |
| 6,871,524 B2 | 3/2005 | Olsson | |
| 6,926,094 B2 | 8/2005 | Amtson et al. | |
| 6,961,626 B1 | 11/2005 | Paik | |
| 7,168,898 B2 | 1/2007 | Hamann | |
| 7,249,943 B2 | 7/2007 | Benson et al. | |
| 7,273,333 B2 | 9/2007 | Buttrick et al. | |
| 7,406,758 B2 | 8/2008 | Jones et al. | |
| 7,614,154 B2 | 11/2009 | Cobb | |
| 8,005,563 B2 | 8/2011 | Cobb et al. | |
| 8,299,118 B2 | 10/2012 | Chang et al. | |
| 8,539,658 B2 | 9/2013 | Munk | |
| 8,606,388 B2 | 12/2013 | Cobb et al. | |
| 8,620,470 B2 | 12/2013 | Cobb et al. | |
| 8,661,684 B1 | 3/2014 | Boyd et al. | |
| 8,763,953 B2 | 7/2014 | Sakurai et al. | |
| 8,790,050 B2 | 7/2014 | Marguet et al. | |
| 9,090,357 B2 | 7/2015 | Oberoi et al. | |
| 9,205,933 B2 | 12/2015 | Oberoi et al. | |
| 9,299,118 B1 | 3/2016 | McGraw | |
| 9,486,917 B2 * | 11/2016 | Reid | B25J 11/005 |
| 9,708,079 B2 * | 7/2017 | DesJardien | B64F 5/10 |
| 2002/0066192 A1 | 6/2002 | Cunningham et al. | |
| 2002/0136612 A1 * | 9/2002 | Martinez | B23Q 1/70 |
| | | | 408/14 |
| 2003/0043964 A1 | 3/2003 | Sorenson | |
| 2003/0097198 A1 | 5/2003 | Sonderman et al. | |
| 2003/0149502 A1 | 8/2003 | Rebello et al. | |
| 2004/0039465 A1 | 2/2004 | Boyer et al. | |
| 2005/0036879 A1 | 2/2005 | Jhaveri et al. | |
| 2005/0049126 A1 * | 3/2005 | Everson | B23Q 3/15513 |
| | | | 483/47 |
| 2005/0172470 A1 | 8/2005 | Cobb et al. | |
| 2005/0223549 A1 | 10/2005 | Braun | |
| 2006/0108470 A1 | 5/2006 | McCrary et al. | |
| 2007/0029877 A1 | 2/2007 | Longley | |
| 2007/0180674 A1 | 8/2007 | Morden et al. | |
| 2008/0077276 A1 | 3/2008 | Sanjuan et al. | |
| 2008/0155807 A1 | 7/2008 | Toh et al. | |
| 2008/0205763 A1 | 8/2008 | Marsh et al. | |
| 2009/0112349 A1 | 4/2009 | Cobb et al. | |
| 2009/0297316 A1 * | 12/2009 | Wells | B66C 1/0212 |
| | | | 414/737 |
| 2010/0025349 A1 | 2/2010 | Khoshnevis | |
| 2010/0151364 A1 | 6/2010 | Ye et al. | |
| 2010/0180711 A1 | 7/2010 | Kilibarda et al. | |
| 2010/0204817 A1 | 8/2010 | Fujita | |
| 2010/0217437 A1 | 8/2010 | Sarh et al. | |
| 2011/0010007 A1 | 1/2011 | Sarh et al. | |
| 2011/0054694 A1 | 3/2011 | Munk | |
| 2011/0132548 A1 | 6/2011 | De Mafia | |
| 2011/0178727 A1 | 7/2011 | Hafenrichter et al. | |
| 2011/0214586 A1 | 9/2011 | Wessel et al. | |
| 2012/0014759 A1 | 1/2012 | Sarh et al. | |
| 2012/0210802 A1 | 8/2012 | Sarh et al. | |
| 2013/0014368 A1 | 1/2013 | Woods et al. | |
| 2013/0018525 A1 | 1/2013 | Jang et al. | |
| 2013/0145850 A1 | 6/2013 | Lute, Jr. et al. | |
| 2013/0152397 A1 | 6/2013 | Oberoi et al. | |
| 2013/0158697 A1 | 6/2013 | Stone et al. | |
| 2013/0226340 A1 | 8/2013 | Buchstab | |
| 2013/0289766 A1 * | 10/2013 | Hafenrichter | B25J 9/02 |
| | | | 700/245 |
| 2014/0115860 A1 * | 5/2014 | Sarh | B62D 57/024 |
| | | | 29/428 |
| 2014/0157588 A1 | 6/2014 | Boyd et al. | |
| 2014/0277717 A1 | 9/2014 | Jung et al. | |
| 2014/0305217 A1 | 10/2014 | Tapia et al. | |
| 2014/0340509 A1 | 11/2014 | Fairbairn | |
| 2015/0023748 A1 * | 1/2015 | Carberry | B25J 9/1682 |
| | | | 408/1 R |
| 2015/0135535 A1 | 5/2015 | Hallam et al. | |
| 2015/0266147 A1 | 9/2015 | Reid et al. | |
| 2015/0314436 A1 * | 11/2015 | Reid | B25J 11/005 |
| | | | 414/800 |
| 2015/0314890 A1 * | 11/2015 | Desjardien | B66C 5/02 |
| | | | 212/324 |
| 2016/0067792 A1 * | 3/2016 | Cardon | B23B 47/26 |
| | | | 408/1 R |
| 2016/0128656 A1 | 5/2016 | Gregerson et al. | |
| 2016/0334301 A1 * | 11/2016 | Hafenrichter | G01M 5/0075 |
| 2017/0197253 A1 * | 7/2017 | Cardon | B23B 47/26 |

FOREIGN PATENT DOCUMENTS

| | | |
|---|---|---|
| CA | 2553747 C | 7/2013 |
| CN | 101583536 A | 11/2009 |
| CN | 101898301 A | 12/2010 |
| CN | 103158889 A | 6/2013 |
| CN | 103274055 A | 9/2013 |
| CN | 103303491 A | 9/2013 |
| CN | 203512057 U | 4/2014 |
| CN | 104281771 A | 1/2015 |
| DE | 102008041190 A1 | 3/2010 |
| EP | 1227316 A2 | 7/2002 |
| EP | 1884453 A2 | 2/2008 |
| EP | 2108515 A1 | 10/2009 |
| EP | 2221151 A2 | 8/2010 |
| EP | 2631041 A2 | 8/2013 |

(56) References Cited

FOREIGN PATENT DOCUMENTS

| | | |
|---|---|---|
| EP | 2792431 A1 | 10/2014 |
| GB | 2095215 | 9/1982 |
| GB | 2329138 A | 3/1993 |
| GB | 2473100 A | 3/2011 |
| GB | 2498977 A | 8/2013 |
| WO | WO2010018340 A2 | 2/2010 |
| WO | WO2014193602 A2 | 12/2014 |

OTHER PUBLICATIONS

Partial European Search Report, dated Sep. 30, 2015, regarding Application No. EP14196480.9, 6 pages.
Extended European Search Report, dated Oct. 2, 2015, regarding Application No. EP14196553.3, 7 pages.
Office Action, dated May 12, 2016, regarding U.S. Appl. No. 14/558,899, 35 pages.
Office Action, dated May 12, 2016, regarding U.S. Appl. No. 14/558,859, 27 pages.
Spishak et al., "Magnet Sensing Hole Driller and Method Therefor," U.S. Appl. No. 13/931,165, filed Jun. 28, 2013, 33 pages.
Larson et al., "Modular Stanchion System," U.S. Appl. No. 13/926,646, filed Jun. 25, 2013, 31 pages.
Desjardien et al., "Modular and Reconfigurable Support System," U.S. Appl. No. 13/904,789, filed May 29, 2013, 73 pages.
Best et al., "Apparatus and Method for Moving a Structure in a Manufacturing Environment," U.S. Appl. No. 13/940,843, filed Jul. 12, 2013, 45 pages.
Valenzuela et al., "Systems and Methods for Movement of Objects," U.S. Appl. No. 14/189,828, filed Feb. 25, 2014, 41 pages.
Larson et al., "Modular Stanchion System," U.S. Appl. No. 14/265,946, filed Apr. 30, 2014, 34 pages.
Cobb et al., "Metrology System for Positioning Assemblies," U.S. Appl. No. 14/559,034, filed Dec. 3, 2014, 84 pages.
Day et al., "Crawler Robot and Supporting Platform," U.S. Appl. No. 14/558,850, filed Dec. 3, 2014, 78 pages.
Desjardien et al., "Apparatus, System, and Method for Supporting a Wing Assembly," U.S. Appl. No. 14/558,834, filed Dec. 3, 2014, 88 pages.
Reid et al., "Mobile Automated Assembly Tool for Aircraft Structures," U.S. Appl. No. 14/558,859, filed Dec. 3, 2014, 76 pages.
Day et al., "Flexible Manufacturing System for Aircraft Structures," U.S. Appl. No. 14/558,867, filed Dec. 3, 2014, 153 pages.
Desjardien et al., "Mobile Automated Overhead Assembly Tool for Aircraft Structures," U.S. Appl. No. 14/558,899, filed Dec. 3, 2014, 100 pages.
Office Action, dated Mar. 4, 2016, regarding U.S. Appl. No. 14/558,850, 24 pages.
Extended European Search Report, dated Apr. 8, 2016, regarding Application No. EP14196494.0, 6 pages.
Extended European Search Report, dated May 2, 2016, regarding Application No. EP14196483.3, 7 pages.
Extended European Search Report, dated May 2, 2016, regarding Application No. EP14196468.4, 7 pages.
Extended European Search Report, dated May 3, 2016, regarding Application No. EP14196548.3, 7 pages.
Final Office Action, dated Aug. 2, 2016, regarding U.S. Appl. No. 14/558,850, 33 pages.
Notice of Allowance, dated Jul. 7, 2016, regarding U.S. Appl. No. 14/558,859, 29 pages.
Canadian Intellectual Property Office Search Report, dated Feb. 24, 2017, regarding Application No. 2,883,614, 17 pages.
Canadian Intellectual Property Office Search Report, dated Feb. 23, 2017, regarding Application No. 2,896,059, 11 pages.
Canadian Intellectual Property Office Office Action, dated Mar. 1, 2017, regarding Application No. 2,882,420, 7 pages.
Canadian Intellectual Property Office Office Action, dated Mar. 31, 2017, regarding Application No. 2,882,466, 20 pages.
Canadian Intellectual Property Office Office Action, dated Mar. 30, 2017, regarding Application No. 2,882,4485, 17 pages.
Canadian Intellectual Property Office Office Action, dated Apr. 25, 2017, regarding Application No. 2,886,500, 19 pages.
Office Action, dated Jun. 13, 2017, regarding U.S. Appl. No. 14/558,834, 39 pages.
Office Action, dated Nov. 10, 2016, regarding U.S. Appl. No. 14/558,850, 23 pages.
Final Office Action, dated Nov. 17, 2016, regarding U.S. Appl. No. 14/558,899, 36 pages.
Extended European Search Report, dated Jan. 27, 2016, regarding Application No. EP14196480.9, 10 pages.
Notice of Allowance, dated Apr. 24, 2017, regarding U.S. Appl. No. 14/558,850, 11 pages.
Notice of Allowance, dated Feb. 27, 2017, regarding U.S. Appl. No. 14/558,899, 13 pages.
Office Action, dated May 3, 2017, regarding U.S. Appl. No. 14/559,034, 55 pages.
Canadian Intellectual Propoerty Office Examination Report, dated Dec. 14, 2017, regarding Application No. 2,882,446, 16 pages.
Notice of Allowance, dated Jan. 17, 2018, regarding U.S. Appl. No. 14/559,034, 13 pages.
Final Office Action, dated Oct. 2, 2017, regarding U.S. Appl. No. 14/559,034, 21 pages.
Final Office Action, dated Oct. 3, 2017, regarding U.S. Appl. No. 14/558,834, 12 pages.
Canadian Intellectual Property Office Office Action, dated Feb. 15, 2018, regarding Application No. 2,883,614, 20 pages.
State Intellectual Property Office of PRC, Notification of First Office Action, Search Report, and English Translation, dated May 29, 2018, regarding Application No. 201510206735.4, 11 pages.
State Intellectual Property Office of PRC, Notification of First Office Action, Search Report, and English Translation, dated May 31, 2018, regarding Application No. 201510179806.6, 20 pages.
State Intellectual Property Office of PRC, Notification of First Office Action, Search Report, and English Translation, dated Jun. 21, 2018, regarding Application No. 201510210496.X, 20 pages.

* cited by examiner

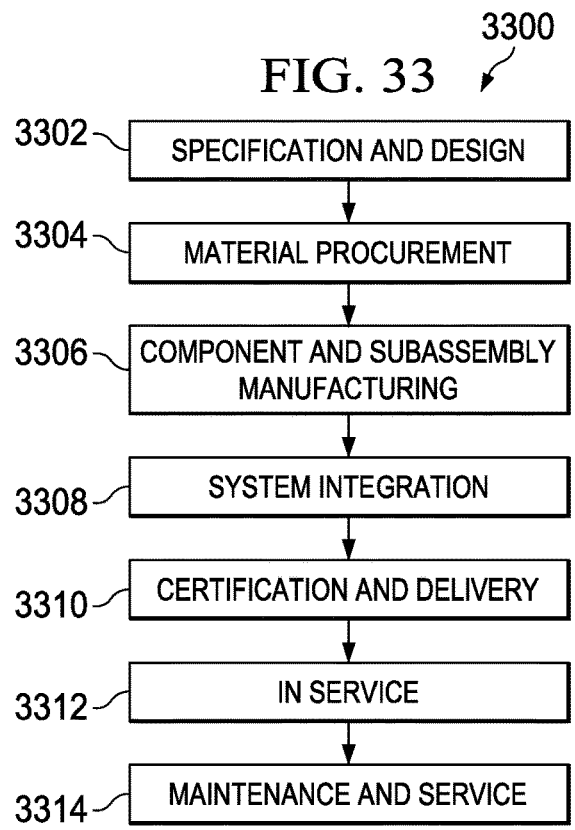
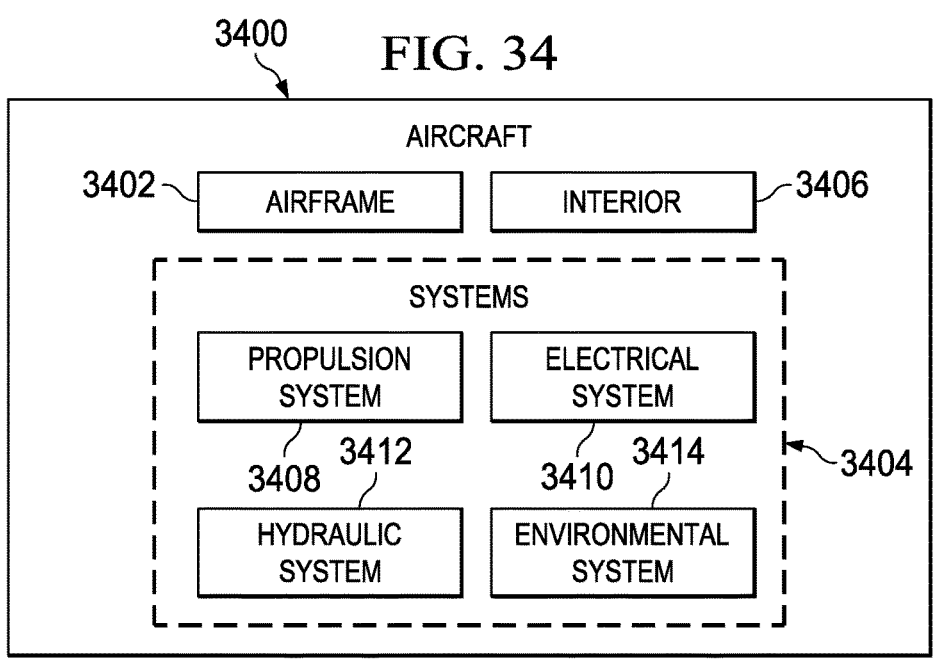

SYSTEM AND METHOD FOR POSITIONING AN AUTOMATED ASSEMBLY TOOL RELATIVE TO A STRUCTURE

RELATED PROVISIONAL APPLICATION

This application claims the benefit of U.S. Provisional Patent Application Ser. No. 61/986,796, filed Apr. 30, 2014, and entitled "System and Method for Positioning an Automated Assembly Tool Relative to a Structure."

CROSS-REFERENCE TO RELATED APPLICATIONS

This application is related to the following patent applications: entitled "Crawler Robot and Supporting Platform," Ser. No. 14/558,850, now U.S. Pat. No. 9,776,330; entitled "Mobile Automated Assembly Tool for Aircraft Structures," Ser. No. 14/558,859, now U.S. Pat. No. 9,486,917; entitled "Metrology System for Positioning Assemblies," Ser. No. 14/559,034; entitled "Flexible Manufacturing System for Aircraft Structures," Ser. No. 14/558,867; entitled "Mobile Automated Overhead Assembly Tool for Aircraft Structures," Ser. No. 14/558,899, now U.S. Pat. No. 9,708,079; and entitled "Apparatus, System, and Method for Supporting a Wing Assembly," Ser. No. 14/558,834, filed of even date herewith, each assigned to the same assignee, and each incorporated herein by reference in its entirety.

BACKGROUND INFORMATION

1. Field

The present disclosure relates generally to aircraft and, in particular, to manufacturing aircraft structures. Still more particularly, the present disclosure relates to a system and method for positioning a tool system relative to a structure.

2. Background

In manufacturing aircraft structures, various operations may be performed to assemble each aircraft structure. These operations may be performed manually by human operators using handheld tools or using automated devices. For example, without limitation, drilling, countersinking, fastening, coupling, sealing, coating, inspecting, or other suitable types of operations may be performed to assemble the aircraft structure.

When performing these operations, precise alignment is needed to avoid rework or discarding of parts. The desire for an increased production rate for aircraft structures has led some manufacturers to use automated drilling and fastening systems in addition to or in place of human operators.

With some existing automated systems, the system must contact the surface of the aircraft structure and press against the surface with a prescribed force. These systems may rely on machine global accuracy and tooling to ensure that the drilling tool is oriented in a desired manner relative to the surface and in contact with the surface. With these systems, however, normality measurements, as well as measurement of clamping forces, may not be as accurate as desired. As a result, holes with poor countersink flushness, as well as fastener misalignment to the surface, may occur.

Other existing solutions may employ an end effector with a pressure-sensing nosepiece. The nosepiece may be the first contact point between the end effector and the airplane skin. With a pressure-sensor integrated into the nosepiece, the nosepiece may provide position feedback as the machine contacts the aircraft structure. This system, however, requires contact with the airplane skin to generate such position information. Consequently, the machine must approach the surface slowly to avoid undesired encounters that could cause undesired inconsistencies to form in the airplane skin, the nosepiece, or both. This slow approach may take more time than desired and reduce the speed at which the aircraft structure is assembled.

These nosepiece systems also give rise to reliability and accuracy concerns. Because the nosepiece also provides clamping force for the automated system, the nosepiece must have a large enough diameter to fit various drills, hole inspection probes, and fastener inserters through the center hole. A large contact surface may reduce countersink depth repeatability due to the differing contours in the surface of the aircraft structure.

Additionally, a nosepiece with a large diameter may contact adjacent fastener heads, skin panel lap joints, and debris on the surface of the skin. As a result, the nosepiece may become misaligned, leading to errors when performing operations. Accordingly, there is a need for a method and apparatus that take into account one or more of the issues discussed above as well as possible other issues.

SUMMARY

In one illustrative embodiment, an apparatus may comprise an end effector and a sensor system. The end effector may be configured to perform an operation on a structure. The sensor system may have a plurality of sensors extending outward from the end effector.

In another illustrative embodiment, a method for positioning an end effector relative to a structure may be provided. Position data about a position of a plurality of sensors in a sensor system relative to a surface of the structure may be generated. A position of the end effector relative to the surface of the structure may be changed based on the position data generated by the plurality of sensors.

In yet another illustrative embodiment, an assembly system may comprise a mobile platform, an end effector associated with the mobile platform, a pressure foot connected to the end effector, and a sensor system. The mobile platform may be configured to move to a desired position relative to a location on a surface of a structure. The end effector may be configured to perform an operation on the surface of the structure at the location. The pressure foot may be configured to contact the surface of the structure at the location. The sensor system may have a plurality of sensors extending outward from the pressure foot. The plurality of sensors may be configured to generate position data about a position of the plurality of sensors relative to the location on the surface of the structure.

In still another illustrative embodiment, a method for drilling a fastener may be provided. An end effector may be moved toward a surface of a structure at a first speed. The end effector may be associated with a sensor system having a plurality of sensors extending outward from the end effector. The surface of the structure may be contacted with at least one of the plurality of sensors. Position data about a position of the plurality of sensors relative to the surface of the structure may be generated. A position of the end effector relative to the surface of the structure may be changed based on the position data from the plurality of sensors. The end effector may be moved toward the surface of the structure at a second speed that is slower than the first speed to contact the surface of the structure with the end effector with a desired contact force. A hole may be drilled into the surface of the structure using the end effector.

In still another illustrative embodiment, a method for positioning a tool on a surface may be provided. The tool may be moved relative to the surface to roughly position the tool within a selected region on the surface using a first movement system. The tool may be moved relative to the surface with at least one degree of freedom to precisely position the tool at a selected position within the selected region on the surface using a second movement system.

In still another illustrative embodiment, a method for positioning a tool on a surface may be provided. The tool may be moved relative to the surface to roughly position the tool within a selected region on the surface using a first movement system. The tool may be moved relative to the surface with at least one degree of freedom to precisely position the tool at a selected position within the selected region on the surface using a second movement system. An element associated with the tool may be aligned for performing an operation at the selected position relative to the selected position using a third movement system.

In yet still another illustrative embodiment, a method for positioning an assembly system relative to a surface may be provided. The assembly system may be moved relative to the surface to roughly position the assembly system within a selected region on the surface using a first movement system. A motion platform may be moved relative to the surface with at least one degree of freedom to precisely position an end effector on the motion platform at a selected position within the selected region on the surface using a second movement system. A tool associated with the end effector may be aligned for performing an operation at the selected position relative to the selected position using the motion platform.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 33 is an illustration of a block diagram of an aircraft manufacturing and service method in accordance with an illustrative embodiment; and FIG. 34 is an illustration of a block diagram of an aircraft is depicted in which an illustrative embodiment may be implemented.

DETAILED DESCRIPTION

Figure 1:
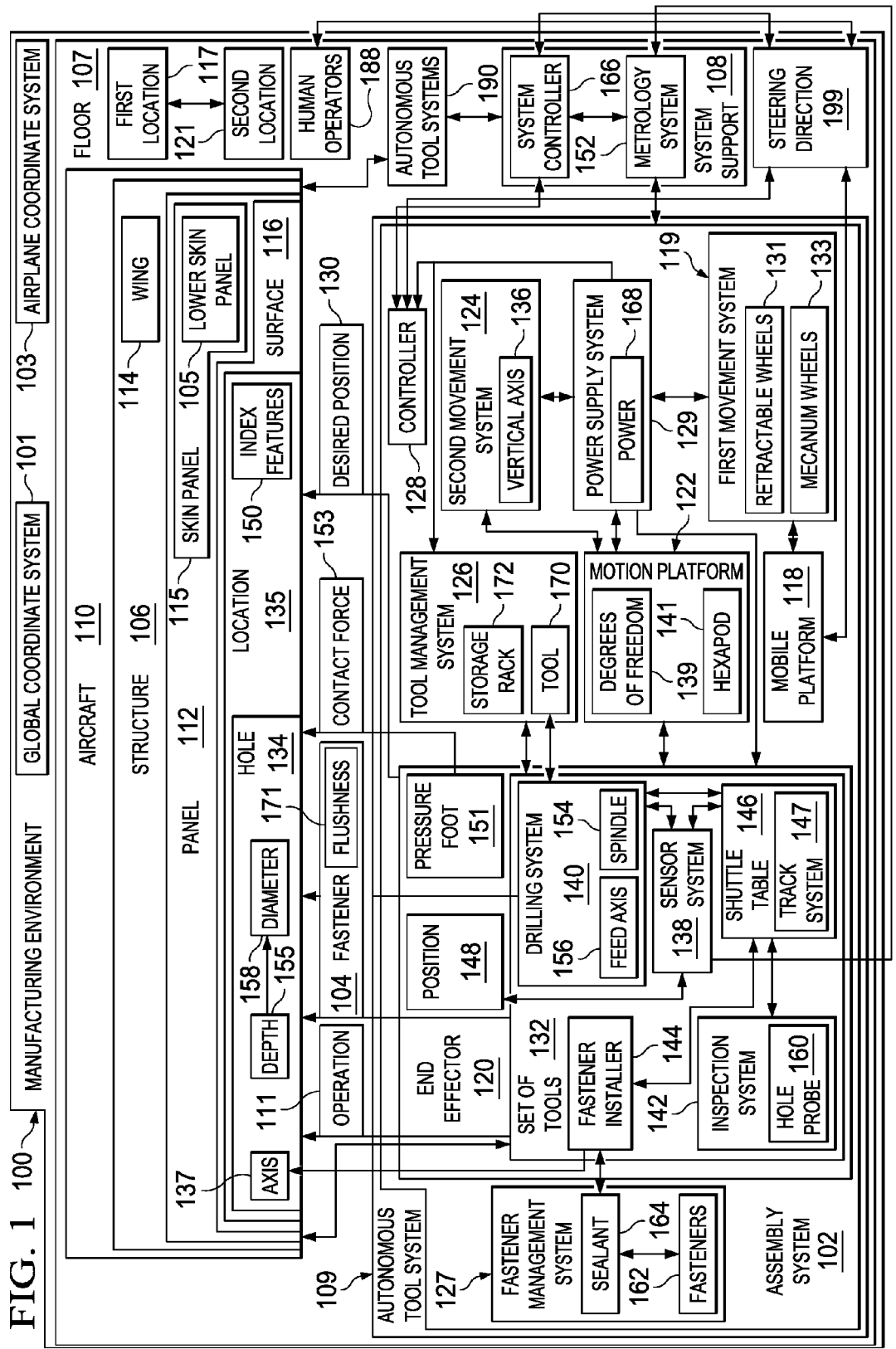
FIG. 1 is an illustration of a block diagram of a manufacturing environment in accordance with an illustrative embodiment.

The illustrative embodiments recognize and take into account one or more different considerations. For example, without limitation, the illustrative embodiments recognize and take into account that it may be desirable to automate the performance of manufacturing operations on an aircraft structure. In particular, the illustrative embodiments recognize and take into account that it may be desirable to have an automated device capable of performing drilling, measuring, inspecting, fastening, and other suitable operations on an aircraft structure.

The illustrative embodiments also recognize and take into account that it may be desirable to have a device capable of maneuvering under aircraft structures to perform manufacturing operations. For instance, the illustrative embodiments recognize and take into account that some locations on an aircraft structure are difficult for human operators to drill holes in a desired manner.

The illustrative embodiments recognize and take into account that drilling a skin panel of a wing from underneath may provide accuracy and ergonomic challenges. For example, without limitation, inconsistencies, such as incorrectly located holes or delamination, may be formed in holes drilled in the skin panel. As another example, a human operator may experience fatigue when installing fasteners in the skin panel. These challenges and others may result in the need for rework, discarding the panel or wing, an increase in the cost of manufacturing the wing more than desired, or some combination thereof.

Further, the illustrative embodiments recognize and take into account that it may be desirable to perform manufacturing operations on an aircraft structure without the use of a fixed monument fixture at different locations within the manufacturing facility. In this illustrative example, a "fixed monument fixture" is a structure that is immovably connected to the facility floor, wall, or other portion of the manufacturing facility. In other words, a fixed monument fixture may be a structure that is not configured to be moved in its entirety from one location to another location in the manufacturing facility without unfixing it from the facility floor, walls, or other un-moveable structure. For example, without limitation, a fixed monument fixture may hold a structure in position as operations are performed on the structure. These fixed monument fixtures may include robotic devices bolted to the facility floor, a fixed gantry system, or other structures.

The illustrative embodiments recognize and take into account that fixed monument fixtures reduce flexibility within a manufacturing facility. For instance, disconnecting an assembly from one fixed monument fixture and moving it to the next fixed monument fixture for further assembly may be difficult. This disconnect-move-reconnect time slows production rates and reduces manufacturing flexibility. Further, these fixed monument fixtures may take up more room than desired, allow limited access to the aircraft structures being assembled, or both. Moreover, fixed monument fixtures may be more costly to manufacture, reconfigure, or maintain than desired. Similar problems arise with the use of fixed tool systems.

Thus, the illustrative embodiments provide a method and apparatus for performing operations on a structure. These operations may include installing a fastener in a structure. An assembly system comprises a motion platform and a mobile platform. The motion platform may be configured to be positioned below a surface of a structure to perform an operation on the surface. The mobile platform may be configured to carry the motion platform across a floor of a manufacturing environment from a first location to a second location.

Turning now to FIG. 1, an illustration of a block diagram of a manufacturing environment is depicted in accordance with an illustrative embodiment. In this depicted example, manufacturing environment 100 is an environment in which assembly system 102 may be used to install fastener 104 in structure 106. Manufacturing environment 100 may have floor 107.

As depicted, manufacturing environment 100 may include structure 106, autonomous tool system 109, and system support 108. In this illustrative example, structure 106 may be an object in aircraft 110. For example, without limitation, structure 106 may be incorporated in at least one of a wing, a fuselage, a horizontal stabilizer, a door, a housing, an engine, or other suitable structures.

In this illustrative example, structure 106 may take the form of panel 112 of wing 114 in aircraft 110. Panel 112 may be skin panel 115 in this illustrative example. For instance, panel 112 may be lower skin panel 105 for wing 114. In other illustrative examples, panel 112 may be a skin panel for a vertical stabilizer in aircraft 110. In still other illustrative examples, panel 112 may be an upper skin panel for wing 114, or some other structure, depending on the particular implementation. Other examples for panel 112 may include panels for installation on a fuselage, horizontal stabilizer, flap, spoiler, aileron, door, slat, nacelle or some other aircraft structure. Panel 112 may have surface 116. Surface 116 may be referred to as a "work surface" in some illustrative examples.

In this depicted example, autonomous tool system 109 may be configured to perform operation 111 on panel 112. Operation 111 may be referred to as an assembly operation in this illustrative example. For instance, assembly system 102 may be configured to perform at least one of a drilling operation, a fastening operation, an inspection operation, a measurement operation, a cleaning operation, a sealing operation, a data collection operation, or other suitable types of operation 111.

As used herein, the phrase "at least one of," when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required.

For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

In this illustrative example, autonomous tool system 109 may take the form of assembly system 102. In this manner, assembly system 102 may be referred to as an autonomous tool or an automated tool system. Assembly system 102 may be configured to install fastener 104 in surface 116 of panel 112.

Assembly system 102 may include a number of components. As used herein, a "number of" items may be one or more items. In this illustrative example, a number of components may be one or more components.

One or more components in assembly system 102 may move with at least one degree of freedom up to six degrees of freedom or more. For instance, each component may move with at least one degree of translational freedom or at least one degree of rotational freedom, but can have up to three degrees of translational freedom, up to three degrees of rotational freedom, or both. Each components may move with at least one degree of freedom independently of other components in assembly system 102 in some examples.

Assembly system 102 may be located and positioned based on at least one of global coordinate system 101 and airplane coordinate system 103, or more particular coordinate systems like wing, flap, spoiler, aileron, door, stabilizer, slat, fuselage, or some other structure or even component systems like spars, ribs, frames, or some other component. Global coordinate system 101 may be a reference coordinate system for manufacturing environment 100.

Airplane coordinate system 103 may represent a reference coordinate system in which airplane parts are located in three-dimensional space. Airplane coordinate system 103 may be based on an origin or reference point in aircraft 110. Using at least one of global coordinate system 101 and airplane coordinate system 103, assembly system 102 and the components within assembly system 102 may be crudely and precisely positioned relative to structures within manufacturing environment 100.

As depicted, assembly system 102 may comprise mobile platform 118, first movement system 119, end effector 120, motion platform 122, second movement system 124, tool management system 126, fastener management system 127, controller 128, and power supply system 129. In this illustrative example, mobile platform 118 may be a mechanical device that holds the components within assembly system 102. For instance, mobile platform 118 may be configured to carry motion platform 122 to perform operation 111.

In this illustrative example, when an item is "mobile," the item may be able to move across floor 107 in manufacturing environment 100. In other words, the item is moveable and not fixed to a particular location in manufacturing environment 100.

A mobile item also may be drivable. As used herein, an item that is "drivable" may be an item that can drive to different positions by moving or being guided. Driving an item may include moving the item by at least one of translating the item with at least one degree of translational freedom or rotating the item with at least one degree of rotational freedom. Further, driving an item may include moving an entirety of the item and all of the components that make up the item together in unison. A drivable item may be capable of autonomously driving to different locations. In other words, the item may have autonomous or semi-autonomous drive capability to move in its entirety from one location to another location relative to floor 107 in manufacturing environment 100.

In other cases, a drivable item may be driven by some other system. For example, a controller, a movement system, a human operator, or some other type of device or operator may drive an item. In this manner, a drivable item may be electronically driven, mechanically driven, electromechanically driven, manually driven, or driven in some other manner.

In this illustrative example, mobile platform 118 and the components associated with mobile platform 118 are not fixed in a location. Rather, the entirety of mobile platform 118 may move across floor 107 of manufacturing environment 100. For example, without limitation, mobile platform 118 may use first movement system 119 to drive from first location 117 to second location 121 on floor 107 of manufacturing environment 100.

As illustrated, first movement system 119 may be physically associated with mobile platform 118. A first component, such as first movement system 119, may be considered to be physically associated with a second component, such as mobile platform 118, by being secured to the second component, bonded to the second component, mounted to the second component, welded to the second component, fastened to the second component, connected to the second component in some other suitable manner, or a combination thereof. The first component also may be connected to the second component using a third component. Further, the first component may be considered to be associated with the second component by being formed as part of the second component, as an extension of the second component, or a combination thereof.

In this depicted example, first movement system 119 may comprise a number of components configured to drive mobile platform 118 from first location 117 to second location 121. For instance, first movement system 119 may include wheels, a track system, pulleys, or other suitable movement devices. In this manner, first movement system 119 provides crude positioning for mobile platform 118.

In an illustrative example, first movement system 119 may include retractable wheels 131. Retractable wheels 131 may be retracted to lower mobile platform 118 to floor 107 of manufacturing environment 100. Lowering mobile platform 118 to floor 107 of manufacturing environment 100 may temporarily plant assembly system 102 in place during installation of fastener 104. After the installation of fastener 104 is completed, retractable wheels 131 may be extended to lift mobile platform 118 from floor 107 and move mobile platform 118 from first location 117 to second location 121 on floor 107 of manufacturing environment 100.

In this depicted example, first movement system 119 may include mecanum wheels 133. Mecanum wheels 133 allow mobile platform 118 to achieve omni-directional movement. In other words, mecanum wheels 133 may move mobile platform 118 forward and backward, as well as side to side.

In some illustrative examples, mecanum wheels 133 also may be retractable or may lock to substantially prevent undesired movement of mobile platform 118. In other illustrative examples, first movement system 119 may include holonomic wheels, another type of omni-wheels, casters, other suitable movement devices, or a combination thereof. These types of wheels may or may not be retractable in an illustrative example.

As depicted, end effector 120 may be a device to which set of tools 132 are attached. In particular, end effector 120 may be configured to hold set of tools 132. Set of tools 132 may be used to install fastener 104 in panel 112.

As used herein, a "set" of items may be one or more items. In this illustrative example, set of tools 132 may be one or more tools. When two or more tools are present in set of tools 132, the tools also may be referred to a group of tools, a plurality of tools, simply "tools," or the like.

In this illustrative example, motion platform 122 may be a device configured to position end effector 120 in desired position 130 relative to surface 116. In this illustrative example, desired position 130 may include at least one of a location or an orientation for end effector 120 in three-dimensional space relative to panel 112 of structure 106.

Motion platform 122 may move set of tools 132 on end effector 120 to desired position 130 relative to location 135 on surface 116 of panel 112 to install fastener 104. Specifically, motion platform 122 may be configured to position set of tools 132 on end effector 120 relative to surface 116 of panel 112 at location 135. For example, without limitation, motion platform 122 may position set of tools 132 perpendicular to location 135, parallel to location 135, co-linear to a central axis of location 135 for fastener 104, or in some other manner.

Motion platform 122 provides fine positioning for end effector 120 relative to location 135. Location 135 may be a desired location for drilling hole 134 for fastener 104.

When set of tools 132 are positioned relative to location 135 on surface 116 of panel 112, fastener 104 may be installed in a desired manner. For instance, positioning set of tools 132 perpendicular to surface 116 at location 135 may allow set of tools 132 to drill hole 134 in surface 116 along axis 137. Axis 137 may run perpendicular to surface 116 at location 135 in some cases. Drilling hole 134 in this manner may provide a desired alignment for fastener 104 when inserted into hole 134. In another illustrative example, positioning set of tools 132 perpendicular to surface 116 may allow set of tools 132 to drill hole 134 without forming a crack, delamination, or other out of tolerance inconsistencies in panel 112. In other examples, axis 137 may be at an angle.

In this depicted example, motion platform 122 may take various forms. Motion platform 122 takes the form of hexapod 141 in this illustrative example. In other illustrative examples, without limitation, motion platform 122 may take the form of a Stewart platform or other suitable types of motion platforms.

Motion platform 122 may provide degrees of freedom 139 of movement for end effector 120 in this illustrative example. Degrees of freedom 139 may refer to the movement of end effector 120 in three-dimensional space. For instance, motion platform 122 may be configured to provide seven degrees of freedom 139 for end effector 120.

As illustrated, second movement system 124 may be physically associated with motion platform 122. Second movement system 124 may comprise a number of components configured to move motion platform 122 along vertical axis 136 toward surface 116 of panel 112. For example, second movement system 124 may include an elevator, a panel, or some other type of structure used to support motion platform 122 as motion platform 122 moves along vertical axis 136.

Vertical axis 136 may be an axis substantially perpendicular to surface 116 at location 135 in this illustrative example. Set of tools 132 on end effector 120 may move along vertical axis 136 as motion platform 122 moves.

In this illustrative example, set of tools 132 may comprise a number of different types of tools. Set of tools 132 may include sensor system 138, drilling system 140, inspection system 142, and fastener installer 144 in this illustrative example.

In an illustrative example, set of tools 132 may be positioned on shuttle table 146 on end effector 120. Shuttle table 146 may hold set of tools 132 and move set of tools 132.

Shuttle table 146 may be configured to move set of tools 132 relative to surface 116 of panel 112 along track system 147. As an example, shuttle table 146 may move set of tools 132 back and forth along an axis parallel to surface 116 of panel 112 using track system 147.

As illustrated, sensor system 138 may comprise various sensing devices configured to identify at least one of panel 112, position 148 of end effector 120 relative to location 135 on surface 116 of panel 112, or location 135 on surface 116 of panel 112 to drill hole 134 for fastener 104. For example, without limitation, sensor system 138 may include a camera, a proximity sensor, a magnetic through-skin sensor, or some other suitable type of sensor.

After using at least one of first movement system 119 and second movement system 124, position 148 of end effector 120 may be verified using sensor system 138 in set of tools 132. In this illustrative example, position 148 may include a current location, an orientation, or both for end effector 120 relative to surface 116 of panel 112. Position 148 may be compared to desired position 130 and adjustments may be made.

In some illustrative examples, sensor system 138 may be configured to identify position 148 of end effector 120 relative to location 135 on surface 116 based on index features 150 of surface 116. Index features 150 may be pre-determined reference points on surface 116. These index features 150 may take the form of at least one of a magnet, a sensor, a graphical indicator, a radio-frequency identification tag, a target, or some other suitable type of index feature. End effector 120 may be moved along surface 116 based on the position of index features 150. Index features 150 also may be used to identify where to drill hole 134 in surface 116.

In some other illustrative examples, sensor system 138 may communicate with metrology system 152 in system support 108 to identify position 148 of end effector 120. Metrology system 152 may be one or more measurement devices in this illustrative example.

System support 108 with metrology system 152 may be configured to support operation of assembly system 102. Specifically, system support 108 may provide navigation, utilities, position information, task assignment, and other suitable types of resources.

As an example, system support 108 may provide navigation for assembly system 102. As another example, metrology system 152 may be configured to make measurements about the position of structure 106 in some illustrative examples. In some cases, system support 108 may provide electricity, air, hydraulic fluid, water, vacuum, or other utilities to assembly system 102. System support 108 may be configured to provide these resources to various other devices located in manufacturing environment 100 as well.

In this illustrative example, pressure foot 151 may be connected to end effector 120. Pressure foot 151 may be a pressure-sensing device in this illustrative example. Pressure foot 151 may be the first portion of end effector 120 to contact surface 116 of panel 112.

In this illustrative example, pressure foot 151 may be configured to identify contact force 153 between pressure foot 151 and surface 116 of panel 112. Contact force 153 may be an amount of force exerted on surface 116 by end effector 120.

Pressure foot 151 may sense contact force 153 using a load cell or some other type of load sensor. An indication of contact force 153 may be desirable to reduce the risk of damage to at least one of surface 116, end effector 120, or both.

Pressure foot 151 may be manually or automatically removed and replaced to optimize the area of contact with to panel 112. For instance, pressure foot 151 may be interchanged with a pressure foot having a different diameter, shape, or other feature. In some illustrative examples, pressure foot 151 may be designed to safely break away in the event of an undesired encounter with panel 112 to avoid damage of panel 112, components within assembly system 102, or both.

A desired contact force 153 may be needed in this illustrative example. For instance, contact force 153 may be used to clamp panel 112 to the substructure for panel 112 before installing fastener 104. As an example, panel 112 may need to be pressed against a rib, spar, or load bearing fitting for proper installation of fastener 104. Thus, a desired contact force 153 may be needed to achieve these results.

Once end effector 120 and set of tools 132 are in position, assembly system 102 may drill hole 134 in location 135 on surface 116 of panel 112. Assembly system 102 may drill hole 134 in location 135 on surface 116 using drilling system 140 in this illustrative example.

Drilling system 140 may be configured to drill different types of holes in location 135 on surface 116. For example, without limitation, hole 134 may take the form of a cylindrical hole, a conical hole, a countersunk hole, a counterbored hole, a spot face, a blind hole, or some other type of hole in this illustrative example.

Drilling system 140 may include spindle 154 and feed axis 156. In this illustrative example, spindle 154 may comprise a number of mechanical parts configured to rotate to drill hole 134. As an example, spindle 154 may include a drill bit on an end of spindle 154. Spindle 154 may rotate the drill bit to drill hole 134 with depth 155 and diameter 158 in a desired manner. In another example, spindle 154 may rotate a milling cutter. Spindle 154 may be operated using hydraulic power, pneumatic power, electricity, or some other energy source.

In some cases, the mechanical parts in spindle 154 may be changed based on the requirements for hole 134. For instance, the drill bit on spindle 154 may be changed to change at least one of depth 155 and diameter 158 of hole 134. For example, a thinner bit may be used to decrease diameter 158 of hole 134. In other illustrative examples, a longer cutter may be used to increase depth 155 of hole 134.

As depicted, feed axis 156 may be perpendicular to surface 116 at location 135. In other examples, depending on the particular implementation, feed axis 156 may not be perpendicular to surface 116.

Feed axis 156 may include various mechanical parts configured to move spindle 154 relative to surface 116 at location 135 to drill hole 134. For example, without limitation, feed axis 156 may include a platform, a track system, a load cell, a roller bearing, and other mechanical parts. Feed axis 156 may move spindle 154 toward location 135 on surface 116 to drill hole 134. When hole 134 is completed, feed axis 156 may move spindle 154 in the opposite direction.

After drilling hole 134, assembly system 102 may inspect hole 134. Assembly system 102 may use inspection system 142 to inspect hole 134. Inspection system 142 may inspect at least one of depth 155 and diameter 158 of hole 134. Inspection system 142 may inspect diameter 158 of hole 134 using hole probe 160.

In this illustrative example, hole probe 160 may be an elongate device configured to measure diameter 158 of hole 134. In some illustrative examples, hole probe 160 may be inserted into hole 134 to determine if hole 134 has a desired diameter. Depending on the type of hole 134 formed, inspection system 142 may be used to inspect other parameters for hole 134. For example, without limitation, inspection system 142 may be used to inspect at least one of a countersink depth, countersink angle, countersink normality to location 135, the normality of hole 134 to location 135, a countersink diameter, a grip length, or some other parameter for hole 134.

Hole probe 160 may be removed to place a different probe into inspection system 142. Different probes may be placed into inspection system 142 to inspect different diameters. In some illustrative examples, hole probe 160 may be replaced with a thinner probe to inspect hole 134 having a smaller diameter. In other illustrative examples, hole probe 160 may be replaced with a thicker probe to inspect hole 134 having a larger diameter.

After inspecting hole 134, assembly system 102 may place fastener 104 into hole 134. Fastener 104 may join panel 112 to a part positioned against panel 112. For example, without limitation, fastener 104 may join panel 112 to a rib, a spar, or some other structural member in wing 114. In another illustrative example, fastener 104 may join a skin panel to panel 112.

In this depicted example, fastener 104 may take the form of one of a rivet, a lockbolt, a bolt, a hexdrive, and other suitable types of fasteners. Fastener 104 may be placed in hole 134 using fastener installer 144. In this illustrative example, fastener installer 144 may be a mechanical device configured to apply a force to fastener 104 to insert fastener 104 in hole 134. In some illustrative examples, fastener installer 144 may accommodate several diameters of fasteners.

Fastener management system 127 may hold fasteners 162 and other parts for fastener installer 144. Fastener management system 127 may be configured to hold several different diameters and grip lengths of fasteners 162. Fastener management system 127 may also perform other functions. For example, fastener management system 127 may perform at least one of washing fasteners 162 to remove any residue, applying sealant 164 to fasteners 162, inspecting fastener and sealant application, supplying one of fasteners 162 having sealant 164 to fastener installer 144, or other desirable actions.

In this illustrative example, sealant 164 may take the form of a polymeric material, a dielectric material, paint, or some other type of coating material. Sealant 164 may be configured to provide electromagnetic effect protection for fasteners 162, seal hole 134, or perform various other functions.

In this depicted example, fastener 104 may have flushness 171 with surface 116 of panel 112. Flushness 171 may represent the position of fastener 104 relative to surface 116 when installed in panel 112. For example, without limitation, flushness 171 may represent whether fastener 104 is recessed, proud, or substantially planar to surface 116 of panel 112 within selected tolerances. An indication of flushness 171 of fastener 104 may be desirable to ensure installation of fastener 104 meets at least one of certification requirements, internal manufacturing standards, or other suitable requirements.

As illustrated, tool management system 126 may include a number of parts configured to exchange tool 170 between storage rack 172 and end effector 120. Tool 170 may be one of set of tools 132 configured for use on end effector 120. In this illustrative example, storage rack 172 may be a structure used to hold tool 170 and other tools when not used by end effector 120.

Tool management system 126 may place tool 170 on end effector 120 when tool 170 is needed. In a similar fashion, tool management system 126 may take a tool that is no longer needed off end effector 120 and place it in storage rack 172.

In this illustrative example, controller 128 may be a device configured to control operation of assembly system 102. Controller 128 may be in communication with the various components in assembly system 102, as well as system controller 166 and metrology system 152 in system support 108.

When one component is "in communication" with another component, the two components may be configured to send signals back and forth over a communications medium. For example, without limitation, controller 128 may communicate with system controller 166 wirelessly over a network. In another illustrative example, controller 128 may communicate with motion platform 122 via a wired or wireless connection.

Controller 128 may be further configured to prevent undesired encounters with human operators 188, autonomous tool systems 190, or both in manufacturing environment 100. In this illustrative example, autonomous tool systems 190 may be other devices configured to work on panel 112. In some examples, autonomous tool systems 190 may be referred to as automated tools.

Controller 128 may use system support 108 to determine the location of human operators 188 and maneuver assembly system 102 around human operators 188. Controller 128 also may be configured to shut down assembly system 102 if human operators 188 are too close to assembly system 102. In still another illustrative example, controller 128 may use system support 108 to determine the location of autonomous tool systems 190 within manufacturing environment 100 to avoid undesired encounters between assembly system 102 and autonomous tool systems 190.

In this illustrative example, at least one of controller 128 and system controller 166 may be implemented in software, hardware, firmware, or a combination thereof. When software is used, the operations performed by the controller may be implemented using, for example, without limitation, program code configured to run on a processor unit. When firmware is used, the operations performed by the controller may be implemented using, for example, without limitation, program code and data and stored in persistent memory to run on a processor unit.

When hardware is employed, the hardware may include one or more circuits that operate to perform the operations in the controller. Depending on the implementation, the hardware may take the form of a circuit system, an integrated circuit, an application specific integrated circuit (ASIC), a programmable logic device, or some other suitable type of hardware device configured to perform any number of operations.

With a programmable logic device, the device may be configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

In some illustrative examples, the operations, processes, or both performed by controller 128 and system controller 166 may be performed using organic components integrated with inorganic components. In some cases, the operations, processes, or both may be performed entirely by organic components, excluding a human being. As one illustrative example, circuits in organic semiconductors may be used to perform these operations, processes, or both.

As illustrated, assembly system 102 also may have power supply system 129. Power supply system 129 may include a power source configured to provide power 168 to assembly system 102. This power source may take the form of a battery, a solar cell, a pressurized air generator, a fuel cell, a combustion engine, a cable to an external power source, or some other suitable device. Power supply system 129 may be configured to supply power 168 to assembly system 102 such that utility cables or other connections may not be needed to move assembly system 102 relative to surface 116 of panel 112.

In this illustrative example, steering direction 199 may be provided for assembly system 102. As an example, steering direction 199 may be provided for mobile platform 118 as mobile platform 118 moves from location to location in through manufacturing environment 100. Steering direction 199 may take the form of commands, instructions, path generation, physically changing the direction of movement of mobile platform 118, and other methods of guidance for mobile platform 118. In this illustrative example, steering direction 199 may dynamically change as conditions within manufacturing environment 100 change.

Steering direction 199 may be provided by at least one of controller 128, system controller 166, human operators 188, or some other suitable device. In other illustrative examples, mobile platform 118 may steer itself, not under the direction of a controller. As an example, system controller 166 may send commands to steer mobile platform 118 from first location 117 to second location 121. In yet another example, one or more of human operators 188 may steer mobile platform 118 between first location 117 to second location by physically changing its direction.

In some cases, object 174 may be present on surface 116 of panel 112. Object 174 may be, for example, without limitation, a protrusion, foreign object debris, an installed fastener, a seal, a cap, and other suitable types of objects. Contact with object 174 by pressure foot 151 or other portions of end effector 120 may be undesirable because it may affect position 148 of end effector 120 relative to surface 116 of panel 112.

As an example, contact with object 174 may cause misalignment in pressure foot 151 relative to surface 116. When misalignment occurs, operation 111 may be performed incorrectly. For example, without limitation, hole 134 may be drilled at an undesired angle. In another illustrative example, fastener 104 may be installed such that flushness 171 is outside selected tolerances.

The illustration of manufacturing environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in some cases, first movement system 119 may include at least one of an air system, retractable tracks, or other devices in addition to or in place of retractable wheels 131, mecanum wheels 133, or other types of omni-wheels or omni-directional wheels, or some combination thereof. The air system may include, for example, without limitation, air bearings that may be used to form air cushions that can be used to move mobile platform 118. In some illustrative examples, a locking mechanism also may be included. In another illustrative example, gravity may hold mobile platform 118 in place.

In still other illustrative examples, set of tools 132 may include tools in addition to or in place of the ones shown in FIG. 1. In still other illustrative examples, an additional sealant applicator, a cleaning system, a sprayer, a cooling system, or other device also may be positioned on end effector 120.

Figure 2:
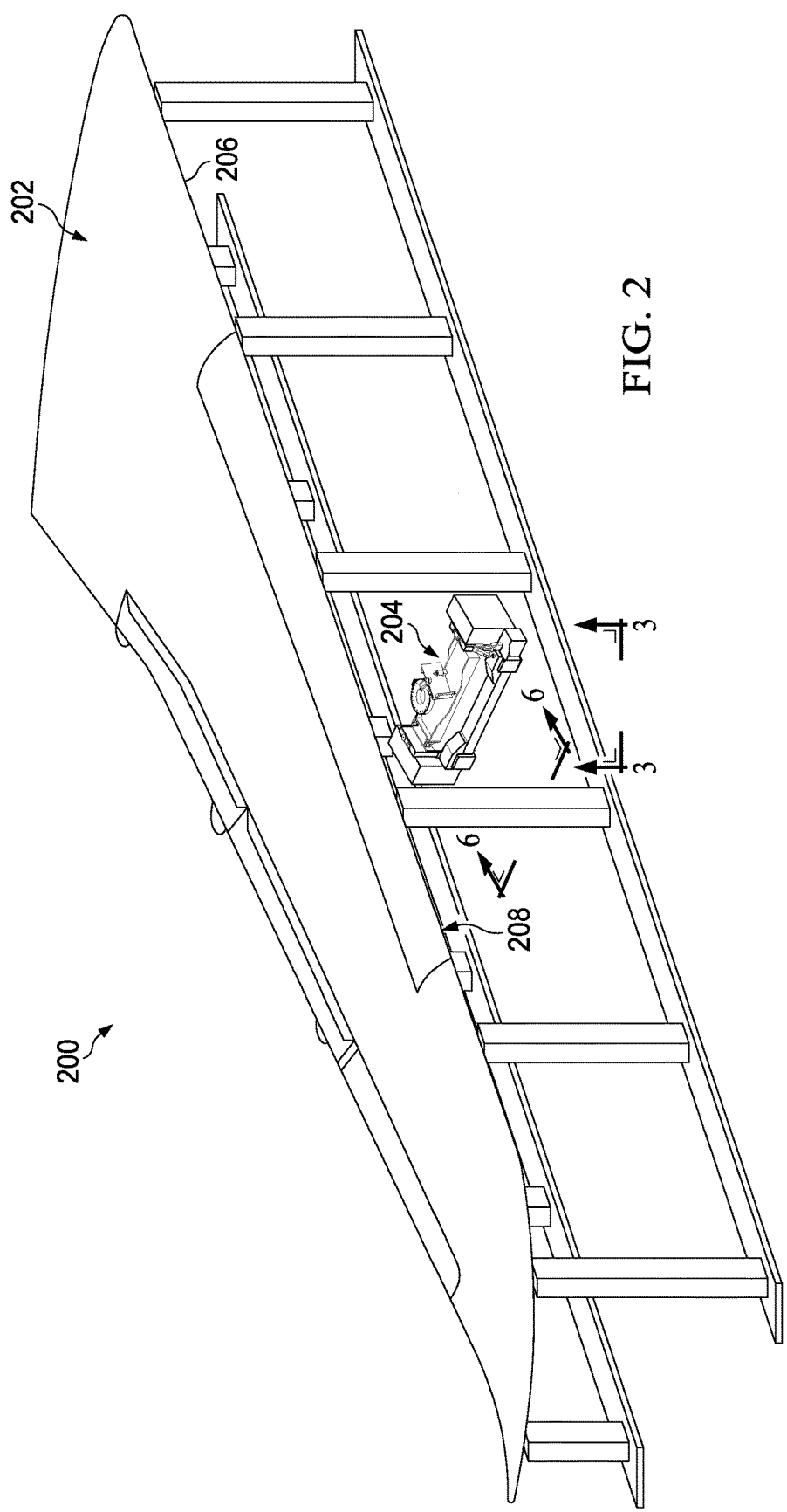
FIG. 2 is an illustration of a manufacturing environment in accordance with an illustrative embodiment.

Turning next to FIG. 2, an illustration of a manufacturing environment is depicted in accordance with an illustrative embodiment. Manufacturing environment 200 may be an example of a physical implementation for manufacturing environment 100 in FIG. 1.

In this depicted example, manufacturing environment 200 may include wing assembly 202. Wing assembly 202 may be an example of a physical implementation for wing 114 shown in block form in FIG. 1 as wing 114 is being assembled.

As depicted, assembly system 204 may be positioned below wing assembly 202. In this illustrative example, assembly system 204 may be positioned below surface 206 of panel 208 of wing assembly 202. For instance, panel 208 may be a lower skin panel for wing assembly 202. Surface 206 and panel 208 may be examples of physical implementations for surface 116 and panel 112, respectively, shown in FIG. 1.

Figure 3:
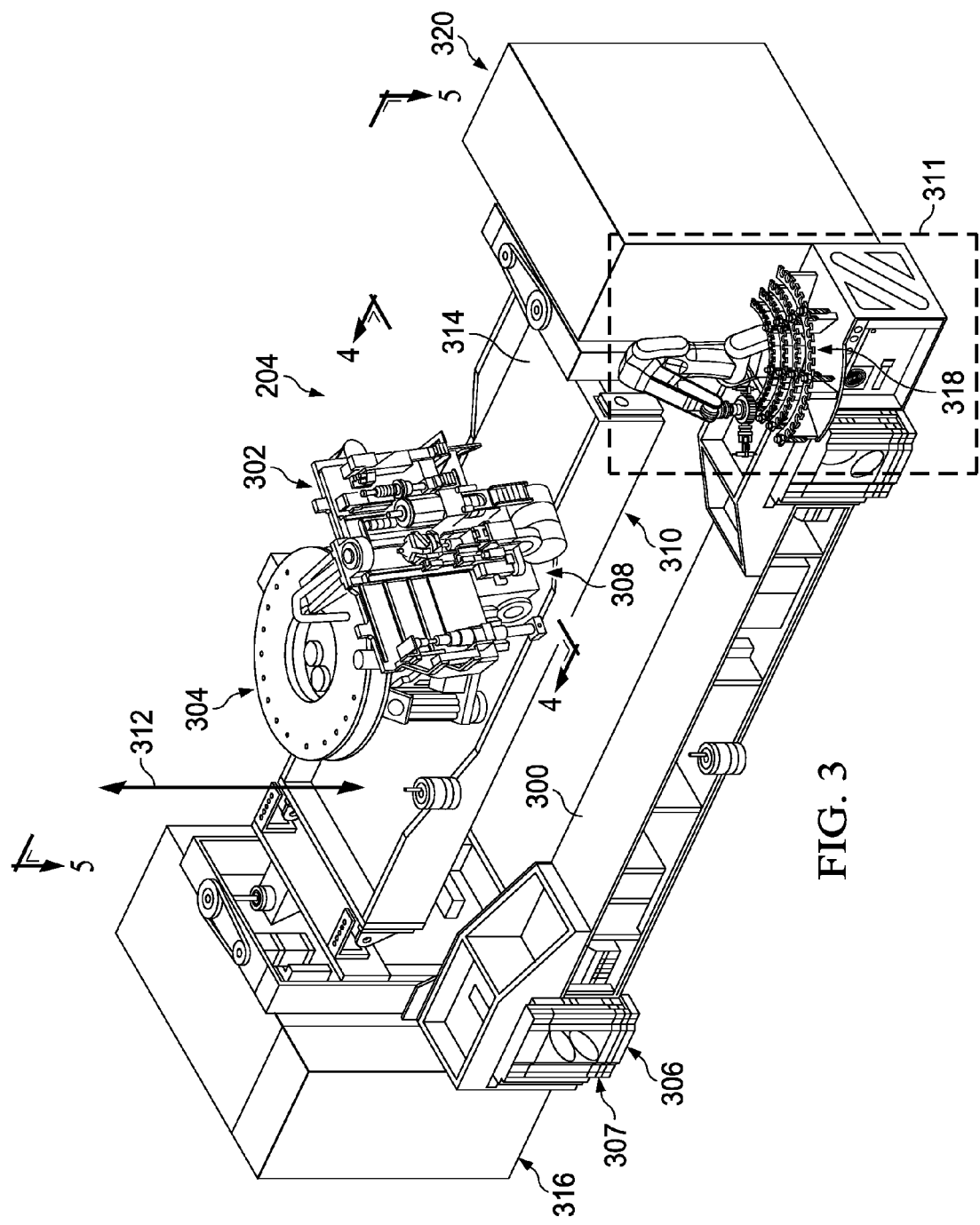
FIG. 3 is an illustration of an isometric view of an assembly system in accordance with an illustrative embodiment.

In FIG. 3, an illustration of an isometric view of assembly system 204, shown in the direction of lines 3-3 in FIG. 2, is depicted in accordance with an illustrative embodiment. In this depicted example, an enlarged view of assembly system 204 is shown such that components within assembly system 204 may be seen in greater detail.

As depicted, assembly system 204 may include mobile platform 300, end effector 302, and motion platform 304. Mobile platform 300, end effector 302, and motion platform 304 may be examples of physical implementations for mobile platform 118, end effector 120, and motion platform 122, respectively, shown in block form in FIG. 1.

In this illustrative example, mobile platform 300 may move relative to wing assembly 202 shown in FIG. 2 using first movement system 306. First movement system 306 may take the form of retractable wheels 307 in this illustrative example. Retractable wheels 307 retract to temporarily plant assembly system 102 in place while installing a fastener (not shown in this view) in surface 206 of panel 208 in FIG. 2. First movement system 306 with retractable wheels 307 may be an example of a physical implementation for first movement system 119 with retractable wheels 131 shown in block form in FIG. 1.

As illustrated, end effector 302 may be connected to motion platform 304. Motion platform 304 may move end effector 302 relative to surface 206 of panel 208. End effector 302 may hold set of tools 308. Set of tools 308 may be used to install the fastener in panel 208. Set of tools 308 may be an example of a physical implementation for set of tools 132 in FIG. 1.

In this illustrative example, second movement system 310 may move motion platform 304 and end effector 302 along vertical axis 312. Second movement system 310 may include platform 314 in this illustrative example. Platform 314 may move motion platform 304 back and forth along vertical axis 312. Second movement system 310 and vertical axis 312 may be examples of physical implementations for second movement system 124 and vertical axis 136, respectively, shown in FIG. 1.

As depicted, assembly system 204 also may include fastener management system 316, tool management system 318, and controller 320. Fastener management system 316, tool management system 318, and controller 320 may be examples of physical implementations for fastener management system 127, tool management system 126, and controller 128, respectively, shown in block form in FIG. 1.

In this illustrative example, fastener management system 316 and tool management system 318 may be configured to assist set of tools 308 in installing the fastener. For example, without limitation, fastener management system 316 may supply the fastener to set of tools 308 for installation. In another illustrative example, tool management system 318 may supply a drill bit with a desired diameter to set of tools 308 for use. Tool management system 318 is shown in section 311.

In this depicted example, controller 320 may be configured to control the operation of each of the components in assembly system 204. For instance, controller 320 may be configured to retract and extend retractable wheels 307. As another example, controller 320 may send commands to move platform 314 along vertical axis 312 in a desired manner. In another illustrative example, controller 320 may communicate with tool management system 318 to provide a desired tool for use on end effector 302.

In some cases, controller 320 may receive commands from a system controller (not shown in this view) to navigate assembly system 204 through manufacturing environment 200. Alternatively, controller 320 may autonomously drive assembly system 204. In still another illustrative example, assembly system 204 may be non-autonomously driven from one location to another location. Steering direction may be provided as assembly system 204 moves through manufacturing environment 200. Steering direction may be provided by at least one of controller 320, the system controller, a human operator, or some other suitable device. In other illustrative examples, mobile platform 300 may steer itself, not under the direction of a controller.

Figure 4:
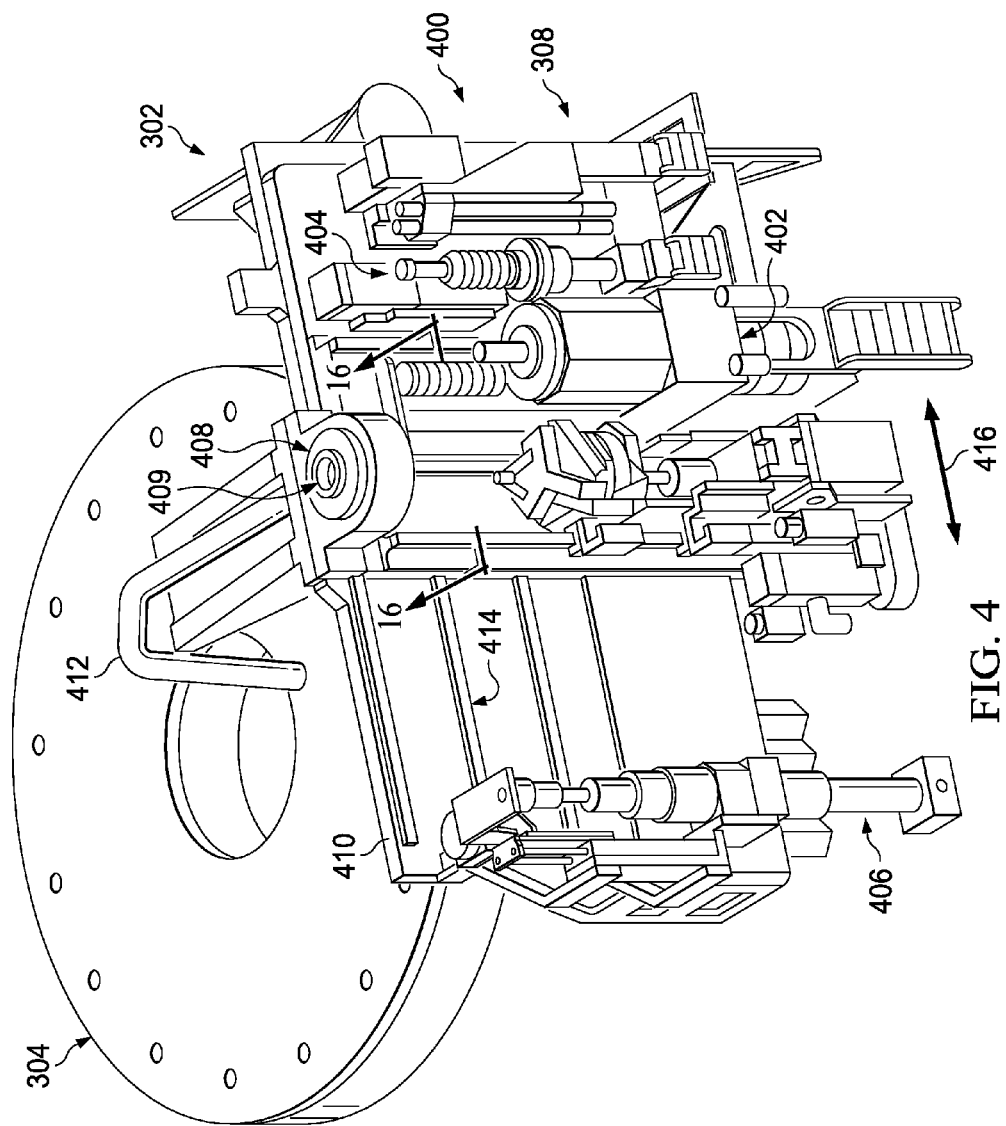
FIG. 4 is an illustration of an end effector and a set of tools in accordance with an illustrative embodiment.

With reference now to FIG. 4, an illustration of end effector 302 and set of tools 308 shown in the direction of view lines 4-4 in FIG. 3 is depicted in accordance with an illustrative embodiment. In this view, an enlarged view of end effector 302 is shown such that the components within set of tools 308 and end effector 302 are seen in greater detail.

As depicted, set of tools 308 may include sensor system 400, drilling system 402, inspection system 404, and fastener installer 406. Sensor system 400, drilling system 402, inspection system 404, and fastener installer 406 may be examples of physical implementations for sensor system 138, drilling system 140, inspection system 142, and fastener installer 144, respectively, shown in block form in FIG. 1.

Pressure foot 408 may also be seen in this view. Pressure foot 408 may be part of sensor system 400 in this illustrative example. In an illustrative example, pressure foot 408 may be the first contact point with surface 206 of panel 208 in FIG. 2. Pressure foot 408 may be an example of a physical implementation for pressure foot 151 in FIG. 1.

In this depicted example, pressure foot 408 may include channel 409. Channel 409 may be an opening in pressure foot 408. Each tool in set of tools 308 may be extended and retracted through channel 409 to perform operations on panel 208.

A tool in set of tools 308 may move to align with channel 409 of pressure foot 408 before being extended. As operations are performed on panel 208, pressure foot 408 may remain in contact with surface 206 of panel 208 to provide a desired clamping force and alignment.

As illustrated, end effector 302 may include shuttle table 410 and connector 412. Shuttle table 410 may provide structural support for set of tools 308. Shuttle table 410 also may move set of tools 308 along track system 414.

In this illustrative example, shuttle table 410 may move set of tools 308 back and forth in the direction of arrow 416 using track system 414. Shuttle table 410 and track system 414 may be examples of a physical implementations for shuttle table 146 and track system 147 shown in FIG. 1. Connector 412 may be an umbilical cable configured to connect set of tools 308 with various utilities in this illustrative example.

Figure 5:
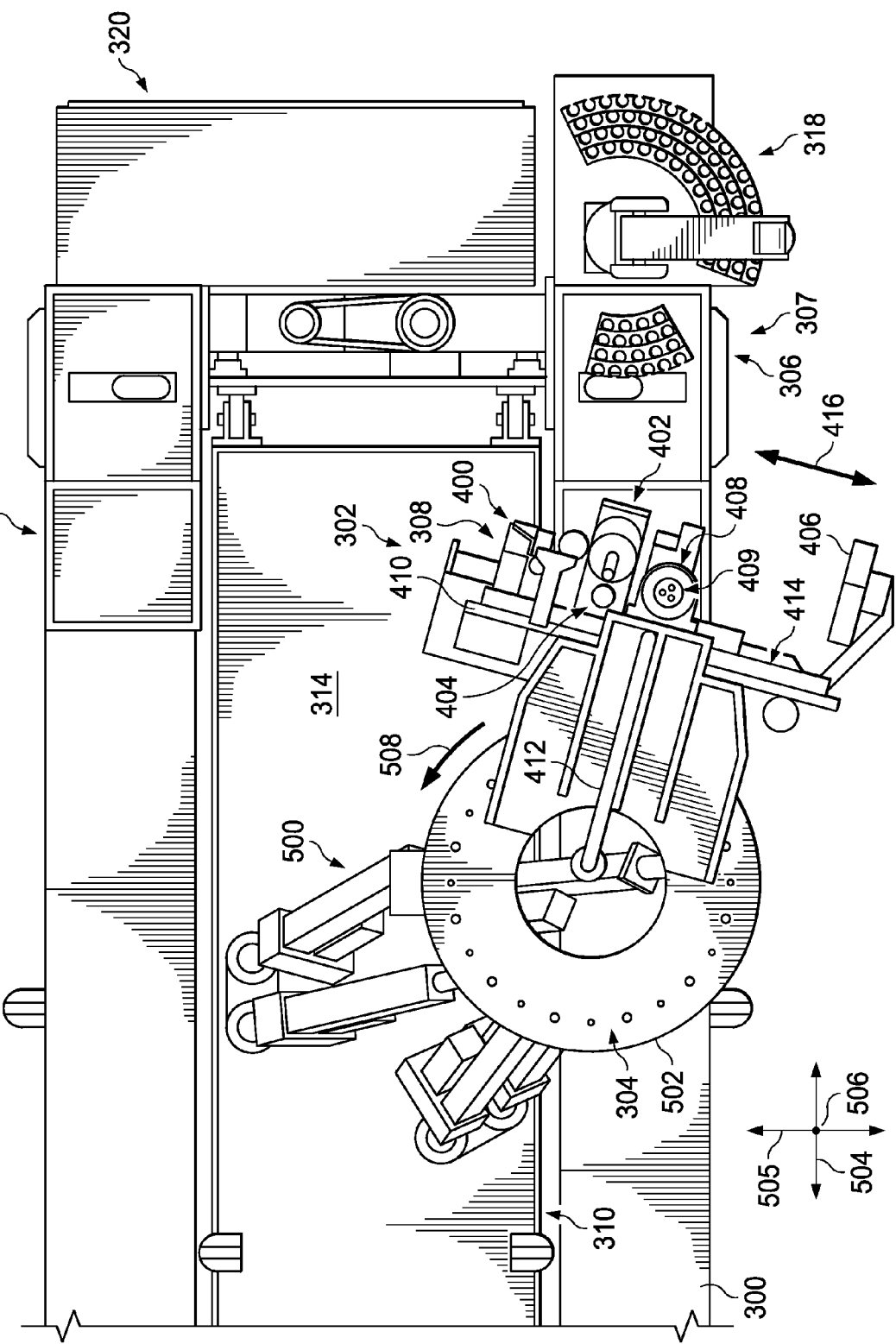
FIG. 5 is an illustration of a top view of an assembly system in accordance with an illustrative embodiment.

In FIG. 5, an illustration of a top view of assembly system 204 shown in the direction of lines 5-5 in FIG. 3 is depicted in accordance with an illustrative embodiment. In this illustrative example, motion platform 304 may include linear actuators 500 and disc actuator 502. Disc actuator 502 is connected to end effector 302 in this illustrative example. The motion of linear actuators 500 or disc actuator 502 may result in movement of end effector 302 in this illustrative example.

Linear actuators 500 may be configured to extend and retract individually to move disc actuator 502 with six degrees of freedom in this illustrative example. Specifically, linear actuators 500 may be configured to translate disc actuator 502 in x-axis 504, y-axis 505, and z-axis 506 and rotate disc actuator 502 about x-axis 504, y-axis 505, and z-axis 506.

In this illustrative example, disc actuator 502 may be configured to rotate in the direction of arrow 508 to move end effector 302 about the circumference of disc actuator 502. In this manner, motion platform 304 provides an additional degree of freedom of movement for end effector 302. In other words, linear actuators 500 with disc actuator 502 may provide a total of seven degrees of freedom of movement for end effector 302. Linear actuators 500, disc actuator 502, or both may move individually or simultaneously to place end effector 302 in a desired position relative to surface 206 of panel 208 shown in FIG. 2.

FIGS. 6-12 show illustrations of assembly system 204 performing operations in accordance with an illustrative embodiment. Specifically, FIGS. 6-12 show assembly system 204 installing a fastener in surface 206 of panel 208 in the direction of lines 6-6 in FIG. 2.

Figure 6:
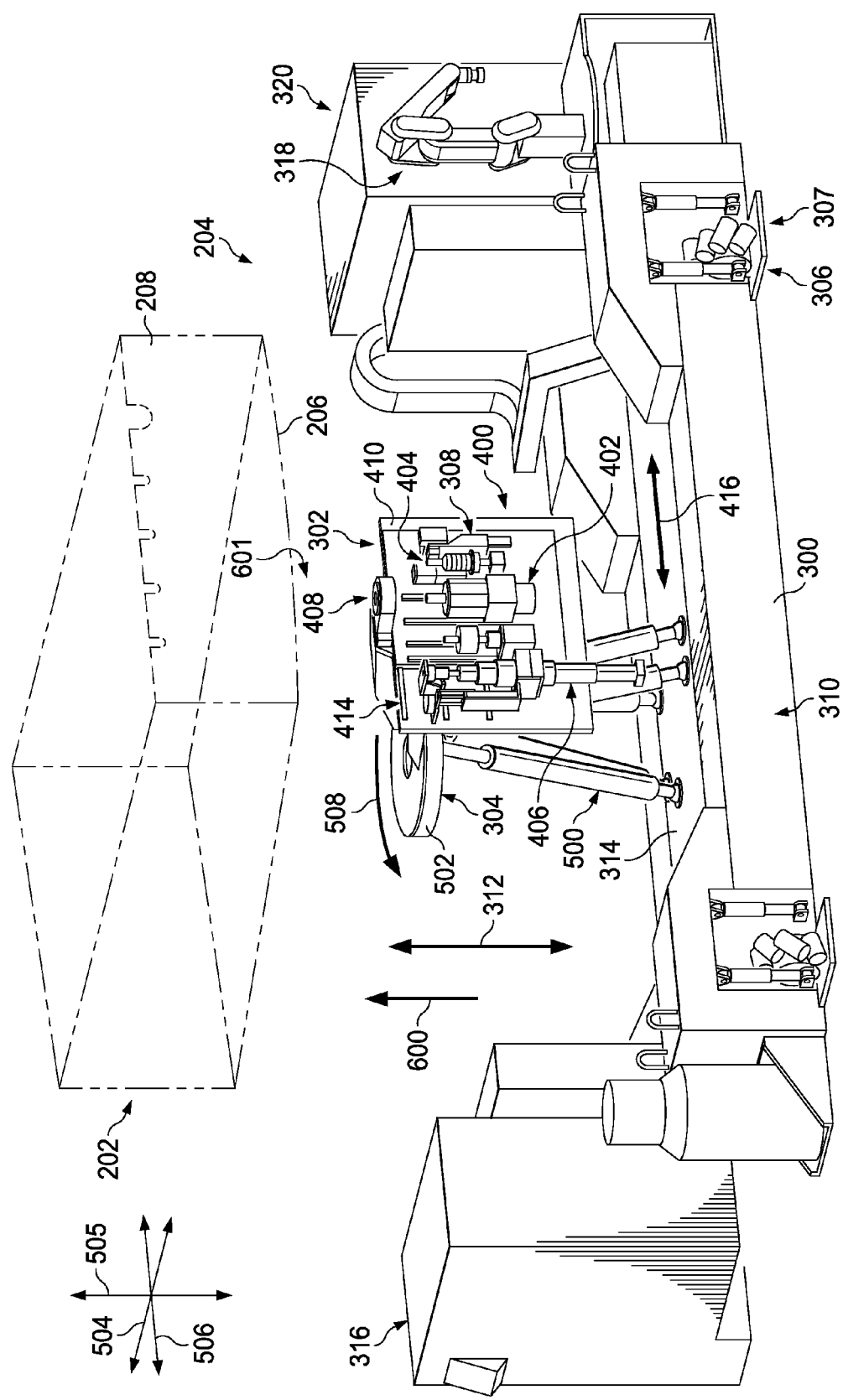
FIG. 6 is an illustration of an assembly system performing operations in accordance with an illustrative embodiment.

Turning to FIG. 6, mobile platform 300 has been placed in a desired position relative to location 601 on surface 206 of panel 208 using first movement system 306. Location 601 may be a location for a hole (not shown in this view) and is an example of a physical implementation for location 135 on surface 116 in FIG. 1. Second movement system 310 may move motion platform 304 in the direction of arrow 600 along vertical axis 312 toward surface 206.

Figure 7:
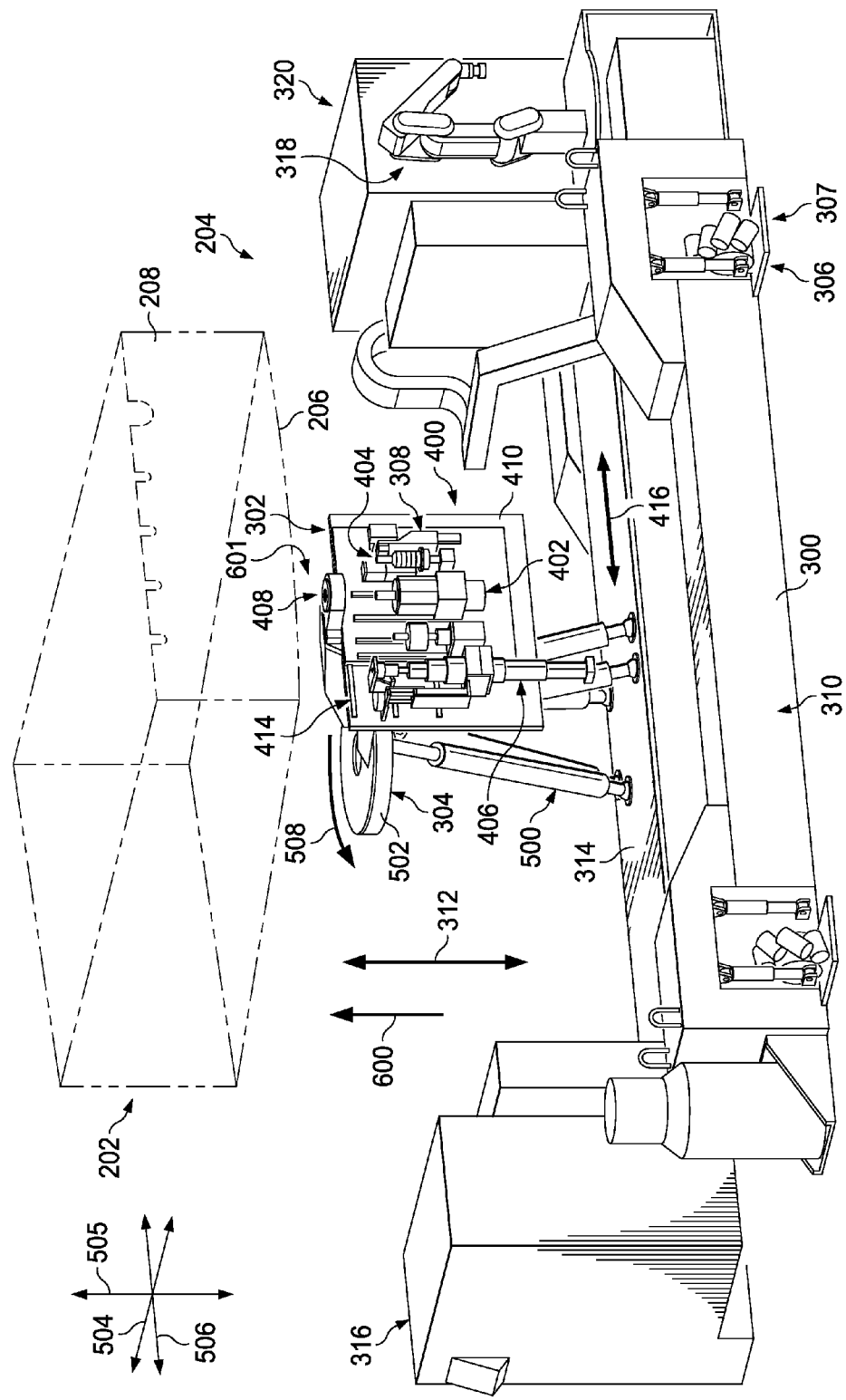
FIG. 7 is another illustration of an assembly system performing operations in accordance with an illustrative embodiment.

In FIG. 7, motion platform 304 has moved in the direction of arrow 600 in FIG. 6. Sensor system 400 may be used to determine a location for a hole to be drilled (not shown in this view). Motion platform 304 may then be used to position end effector 302 with set of tools 308 perpendicular to location 601 on surface 206 of panel 208 in this illustrative example.

In this illustrative example, a portion of linear actuators 500 may be extended to position end effector 302. In addition, disc actuator 502 may rotate end effector 302 in the direction of arrow 508.

Figure 8:
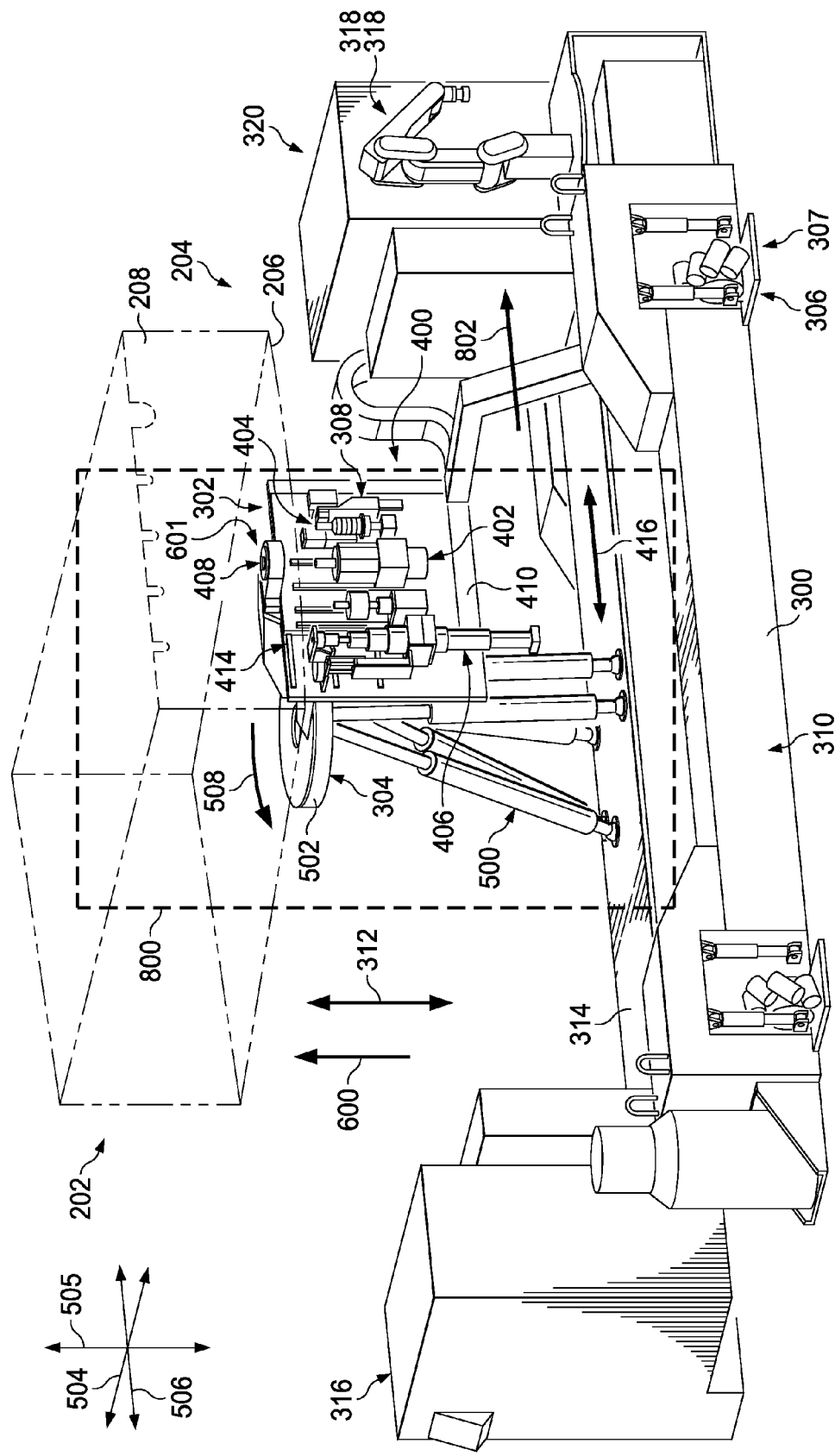
FIG. 8 is yet another illustration of an assembly system performing operations in accordance with an illustrative embodiment.

Turing next to FIG. 8, pressure foot 408 may contact surface 206 of panel 208. Pressure foot 408 may identify a contact force between pressure foot 408 and surface 206 of panel 208. Movement of end effector 302 may be slowed in response to the contact until end effector 302 is in a desired position against surface 206.

In this illustrative example, sensor system 400 may then be used to confirm a desired position for end effector 302 relative to surface 206. Sensor system 400 may confirm that end effector 302 and set of tools 308 are positioned perpendicular to surface 206 at location 601. Set of tools 308 is shown in section 800 in this illustrative example. Set of tools 308 may be moved in the direction of arrow 802 on track system 414 to move drilling system 402 into a position to drill the hole.

Figure 9:
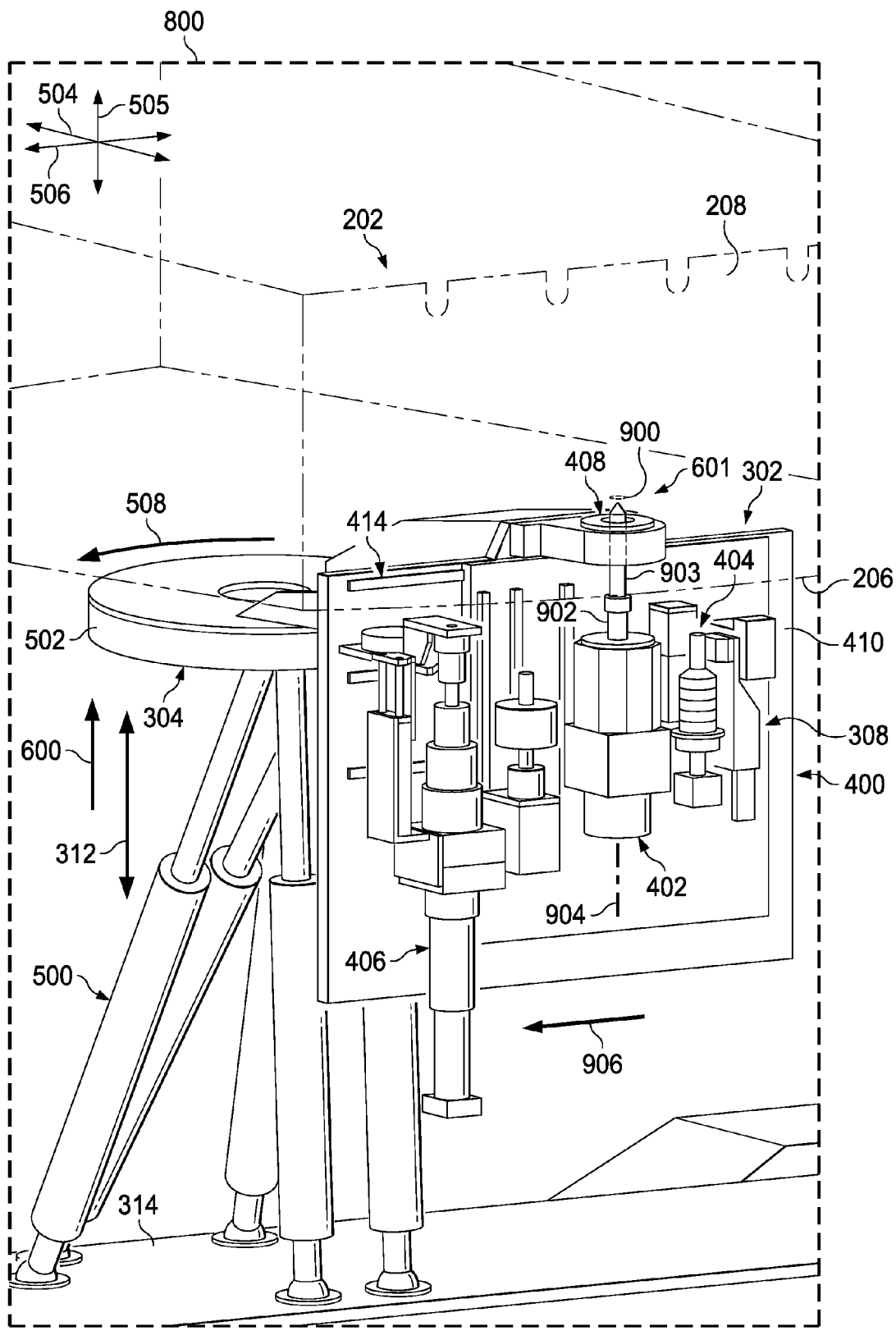
FIG. 9 is still another illustration of an assembly system performing operations in accordance with an illustrative embodiment.

In FIG. 9, drilling system 402 may be used to drill hole 900 in surface 206 of panel 208 at location 601. In particular, spindle 902 with drill bit 903 may extend in the direction of arrow 600 along feed axis 904. Spindle 902 and feed axis 904 may be examples of spindle 154 and feed axis 156, respectively, in drilling system 140 shown in FIG. 1.

After drilling hole 900, spindle 902 may retract downward to its previous position. Set of tools 308 may then move in the direction of arrow 906 along track system 414 into a position to inspect hole 900.

Figure 10:
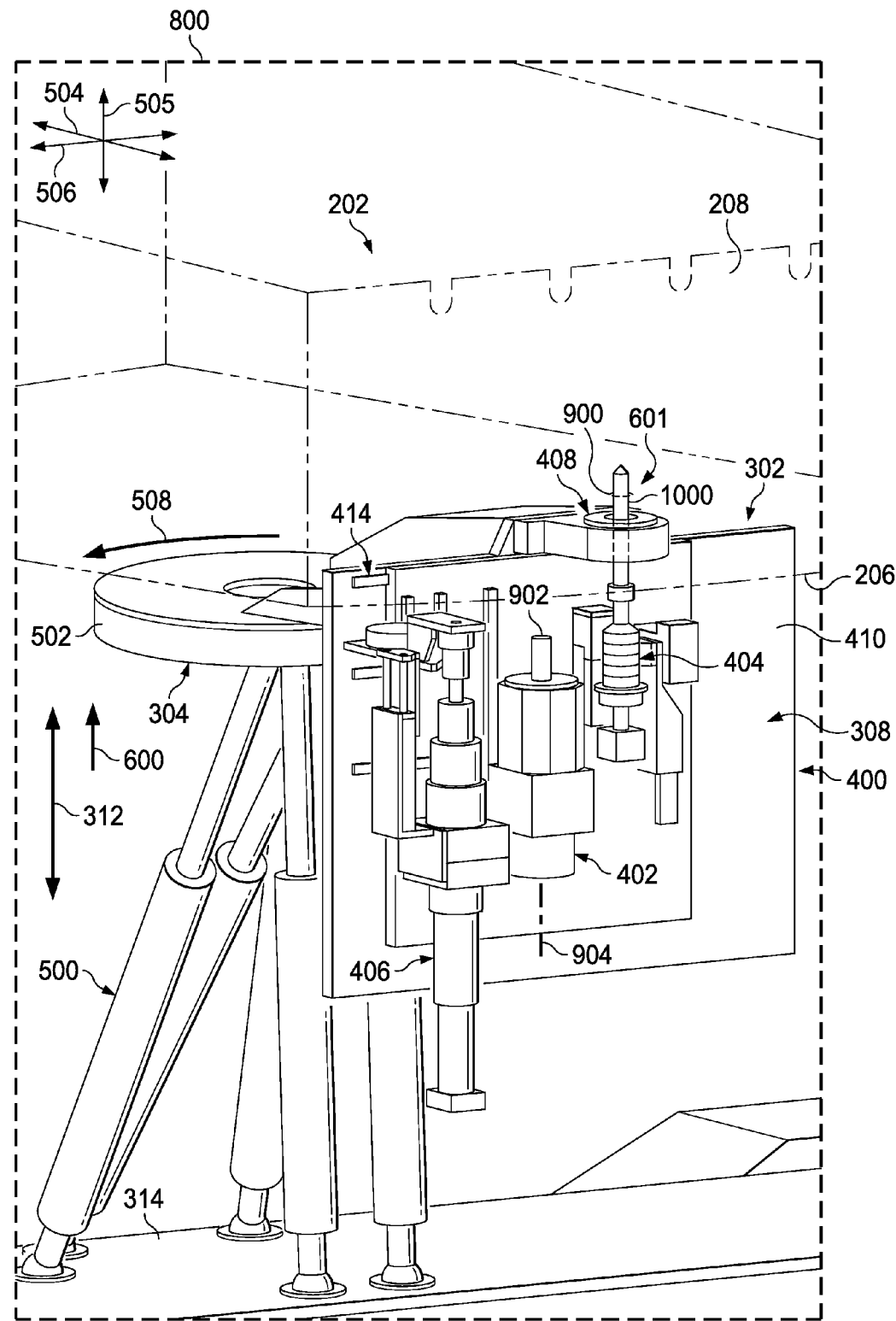
FIG. 10 is another illustration of an assembly system performing operations in accordance with an illustrative embodiment.

With reference to FIG. 10, inspection system 404 may be extended in the direction of arrow 600 to inspect hole 900. In this illustrative example, hole probe 1000 may be used to measure a diameter of hole 900. Hole probe 1000 may be an example of hole probe 160 shown in block form in FIG. 1.

After inspection of hole 900, hole probe 1000 retracts downward to its previous position. A fastener (not shown in this view) may then be installed in hole 900. End effector 302 and set of tools 308 may move to position fastener installer 406 relative to hole 900.

Figure 11:
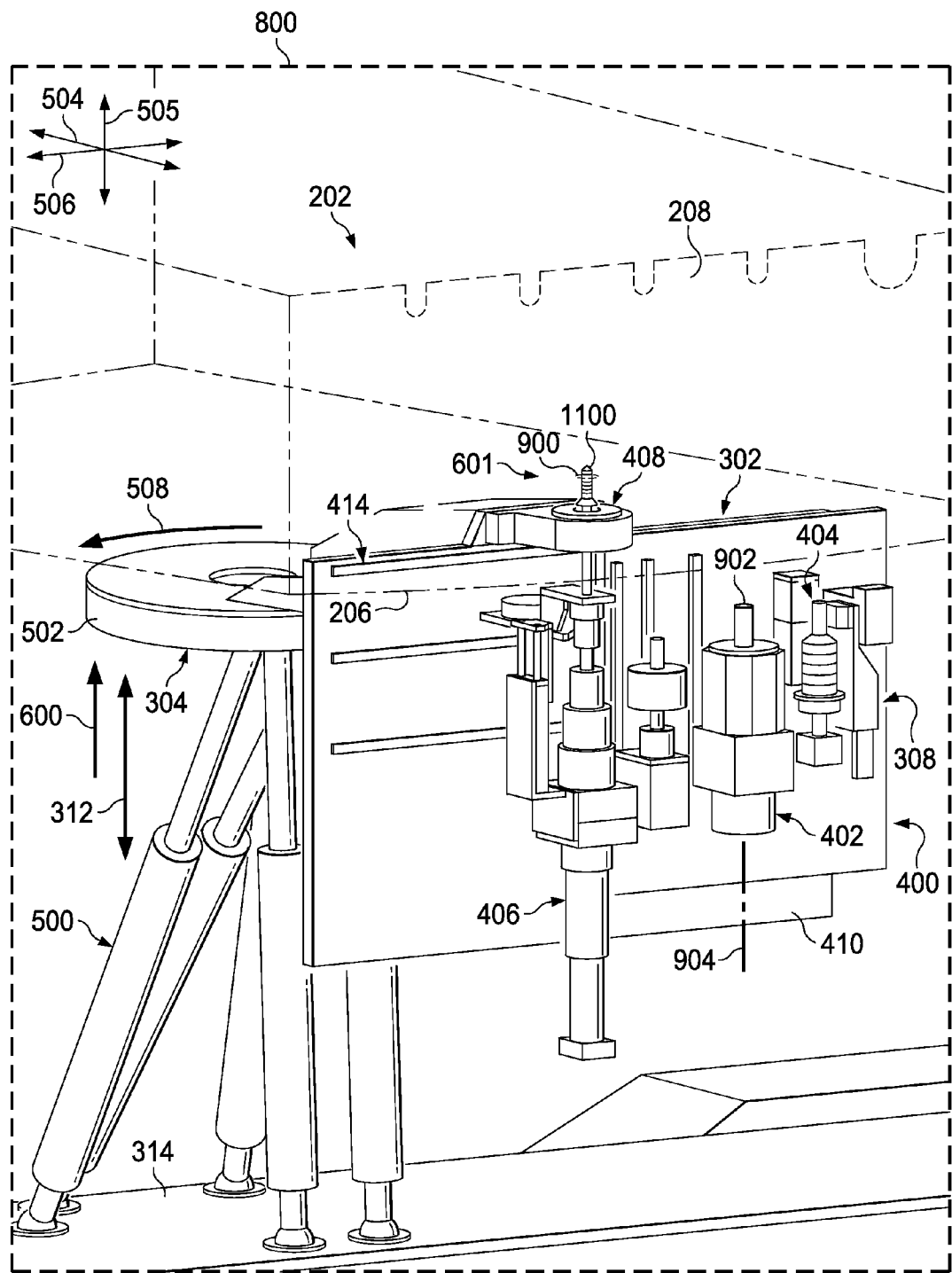
FIG. 11 is yet another illustration of an assembly system performing operations in accordance with an illustrative embodiment.

In FIG. 11, fastener installer 406 may insert fastener 1100 into hole 900. Fastener installer 406 may move from side to side using track system 414 and then extend vertically to insert fastener 1100 in hole 900.

Figure 12:
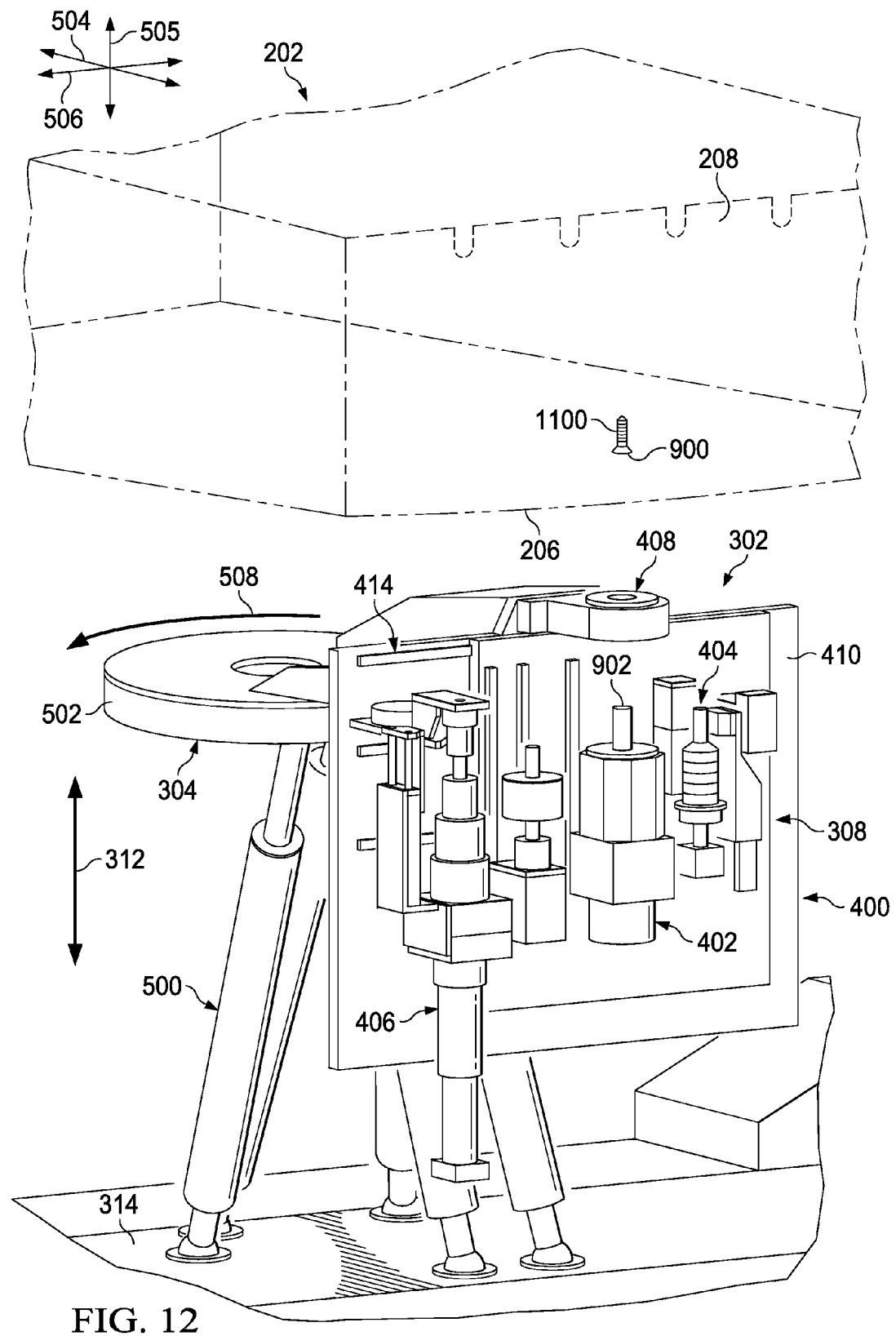
FIG. 12 is still another illustration of an assembly system performing operations in accordance with an illustrative embodiment.

Referring now to FIG. 12, fastener installer 406 has installed fastener 1100 into hole 900. End effector 302 may now be repositioned relative to a next location to drill a hole.

In this illustrative example, assembly system 204 may be configured to provide "one-up assembly" of fasteners in panel 208. In this illustrative example, "one-up" assembly may refer to the process of drilling and fastening joints without having to drill holes, to disassemble parts for cleaning and/or deburring before reassembling to install fasteners. This one-up assembly may increase the rate at which fasteners may be installed in panel 208 and also may increase wing assembly rates.

In other illustrative examples, assembly system 204 may not install fastener 1100. Instead, assembly system 204 may only drill and measure holes in panel 208. Various fasteners may be subsequently installed by assembly system 204, a human operator, some other type of device, or a combination thereof.

In another illustrative example, assembly system 204 may be used in a non-one-up assembly situation. For instance, assembly system 204 may drill first drill hole 900 and inspect the diameter of hole 900, before being moved away from panel 208. Panel 208 may then be lowered, cleaned, deburred, and reinstalled. Assembly system 204 then may be brought back into place for fastener insertion.

Figure 13:
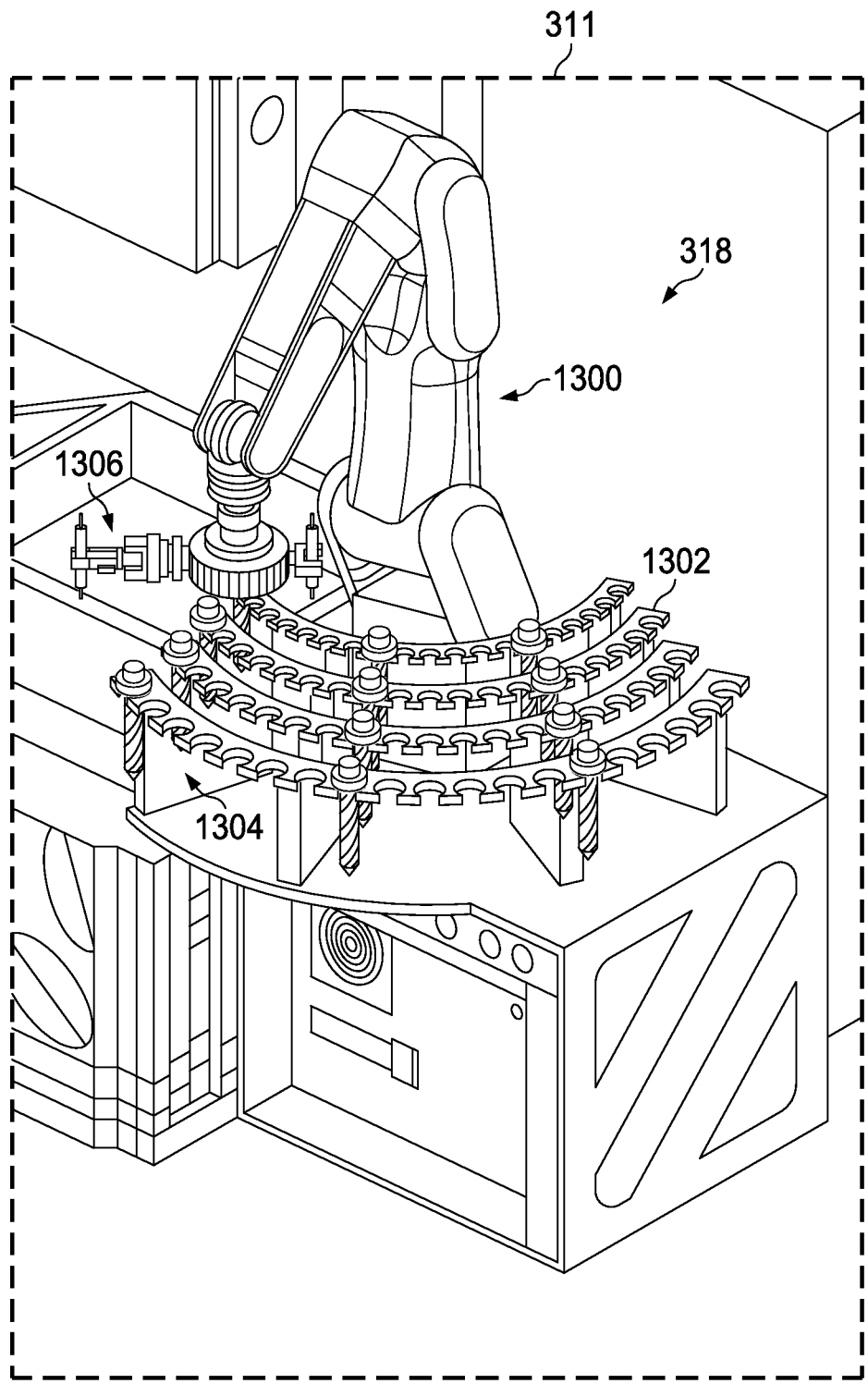
FIG. 13 is an illustration of a tool management system in a section in accordance with an illustrative embodiment.

With reference next to FIG. 13, an illustration of tool management system 318 in section 311 from FIG. 3 is depicted in accordance with an illustrative embodiment. In this example, tool management system 318 is shown without other components in assembly system 204 to better show features of tool management system 318.

In this depicted example, tool management system 318 may include a number of components. As depicted, tool management system 318 may include robot arm 1300, storage rack 1302, and tools 1304.

As depicted, robot arm 1300 may have end effector 1306. End effector 1306 is configured to hold a portion of tools 1304 to exchange tools 1304 with end effector 302 shown in FIG. 3. For instance, end effector 1306 may exchange a probe, a drill bit, a removable pressure foot, or other tools with end effector 302, depending on the operations being performed by end effector 302.

In this illustrative example, storage rack 1302 also may hold a portion of tools 1304. Robot arm 1300 may use end effector 1306 to drop off a tool in storage rack 1302. In a similar fashion, robot arm 1300 may use end effector 1306 to pick up a tool stored in storage rack 1302. In this manner, tool management system 318 may provide various tools 1304 for use on panel 208 shown in FIG. 2.

Figure 14:
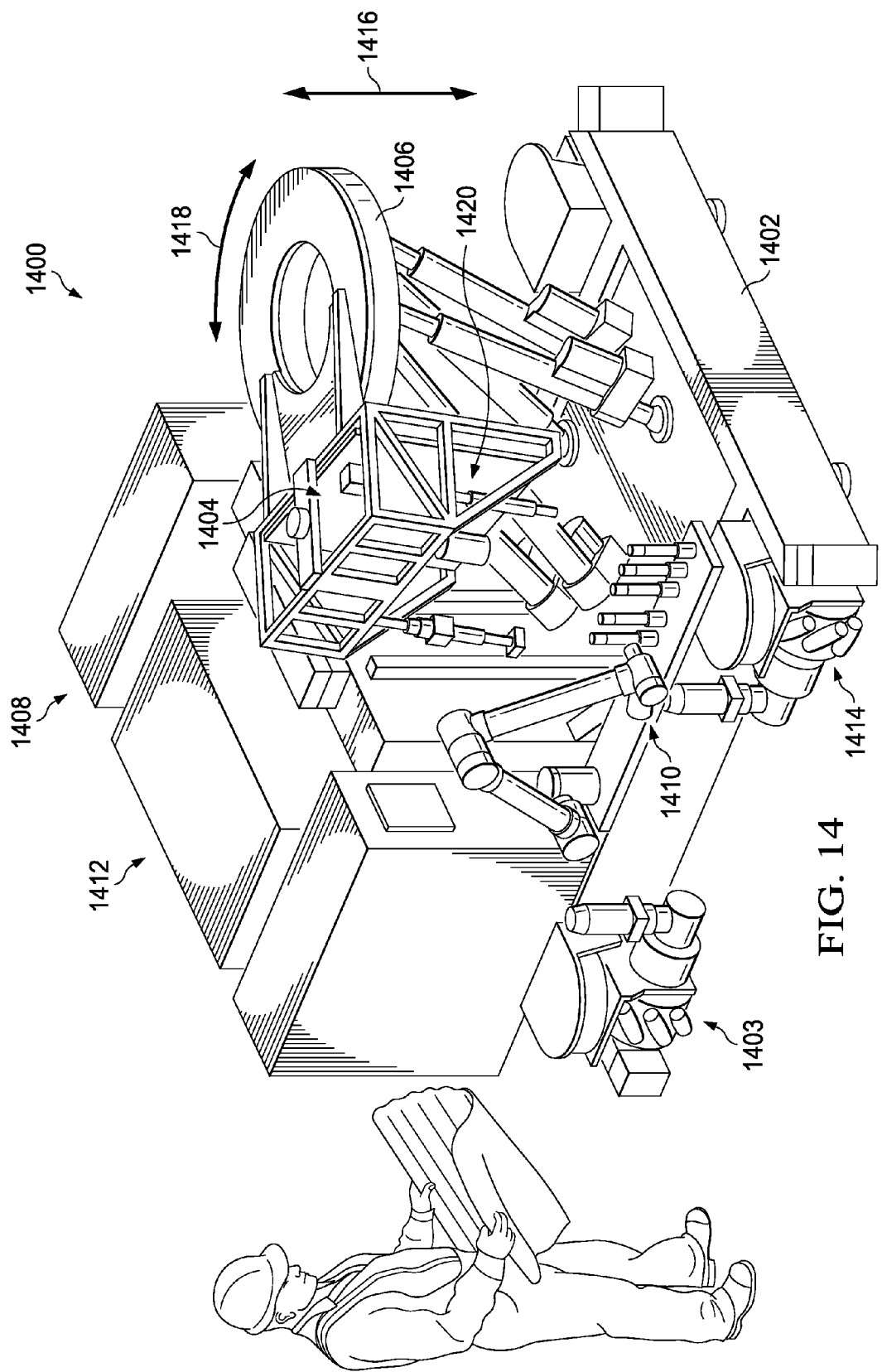
FIG. 14 is an illustration of another implementation for an assembly system in accordance with an illustrative embodiment.

In FIG. 14, an illustration of another implementation for an assembly system is depicted in accordance with an illustrative embodiment. In this depicted example, assembly system 1400 may be an example of a physical implementation for assembly system 102 shown in block form in FIG. 1.

As depicted, assembly system 1400 may include the same or different components from assembly system 204 shown in FIG. 2. In this illustrative example, assembly system 1400 may include mobile platform 1402, movement system 1403, end effector 1404, motion platform 1406, controller 1408, tool management system 1410, and fastener management system 1412. Mobile platform 1402, movement system 1403, end effector 1404, motion platform 1406, controller 1408, tool management system 1410, and fastener management system 1412 may be examples of physical implementations for mobile platform 118, first movement system 119, end effector 120, motion platform 122, controller 128, tool management system 126, and fastener management system 127, respectively, shown in block form in FIG. 1.

In this depicted example, movement system 1403 may include mecanum wheels 1414 attached to mobile platform 1402. Mecanum wheels 1414 are used to move mobile platform 1402. Mecanum wheels 1414 may be an example of a physical implementation for mecanum wheels 133 shown in block form in FIG. 1, or other types of omni-wheels or omni-directional wheels used in an illustrative embodiment.

A second movement system (not shown in this view) may move motion platform 1406 along vertical axis 1416. Motion platform 1406 may move end effector 1404 relative to a surface of a structure (not shown in this view). This movement may include rotation in the direction of arrow 1418.

As illustrated, end effector 1404 may hold set of tools 1420 that perform operations on the structure. Set of tools 1420 may perform these operations under the control of controller 1408. Fastener management system 1412 and tool management system 1410 supply components to set of tools 1420 in this illustrative example.

The illustrations of assembly system 204 in FIGS. 2-13 and assembly system 1400 in FIG. 14 are not meant to imply physical or architectural limitations to the manner in which an illustrative embodiment may be implemented. Other components in addition to or in place of the ones illustrated may be used. Some components may be optional.

The different components shown in FIGS. 2-14 may be illustrative examples of how components shown in block form in FIG. 1 can be implemented as physical structures. Additionally, some of the components in FIGS. 2-14 may be combined with components in FIG. 1, used with components in FIG. 1, or a combination of the two.

Although the illustrative embodiments are shown and described with reference to panel 208 of a wing, assembly system 204 is not so limited. Assembly system 204 may be used for performing operations in lower sections of fuselage panels, lower wing to body joint, and other types of structures.

The illustrative embodiments may be used with various configurations of structures that hold wing assembly 202. For example, without limitation, assembly system 204 may be used with immobile or semi-mobile fixtures where there is access from below.

Alternatively, assembly system 204 may be arranged below drivable supports configured to hold wing assembly 202. These drivable supports may take the form of automated guided vehicles. In this manner, assembly system 204 is versatile in its use within manufacturing environment 200.

The illustrative embodiments further recognize and take into account one or more different considerations with respect to positioning end effector 120 with pressure foot 151 relative to surface 116 of structure 106. For example, without limitation, the illustrative embodiments recognize and take into account that it may be desirable to determine position 148 of end effector 120 prior to end effector 120 contacting surface 116 of structure 106. As an example, it may be desirable to modify a speed, an orientation, or both, of end effector 120 before contacting surface 116 of structure 106. These parameters may be modified such that pressure foot 151 contacts surface 116 with a desired contact force to clamp structure 106 with its substructure, to reduce the risk of inconsistencies forming in structure 106, to reduce the risk of damages to pressure foot 151, or a combination thereof.

The illustrative embodiments also recognize and take into account that it may be desirable to provide more accurate position data for end effector 120 as end effector 120 moves toward surface 116. For example, without limitation, it may be desirable to avoid objects protruding from surface 116 as pressure foot 151 contacts surface 116. These undesired objects may cause inaccurate position data to be collected by sensor system 138. With inaccurate position data, operation 111 may be performed in an undesired manner. In addition, it may be desirable to position the sensors in sensor system 138 around location 135 for hole 134 such that more accurate position data is generated for end effector 120 with respect to location 135.

The illustrative embodiments further recognize and take into account that it may be desirable to increase the speed at which end effector 120 approaches surface 116. An increase in approach speed may lead to drilling and fastening operations being performed more quickly than with some currently used systems. As a result, the time needed to manufacture structure 106 may be reduced.

Thus, the illustrative embodiments provide a method and apparatus for positioning end effector 120 relative to structure 106. An apparatus may comprise end effector 120 and sensor system 138. End effector 120 may be configured to perform an operation on structure 106. Sensor system 138 may have a plurality of sensors extending outward from end effector 120.

Figure 15:
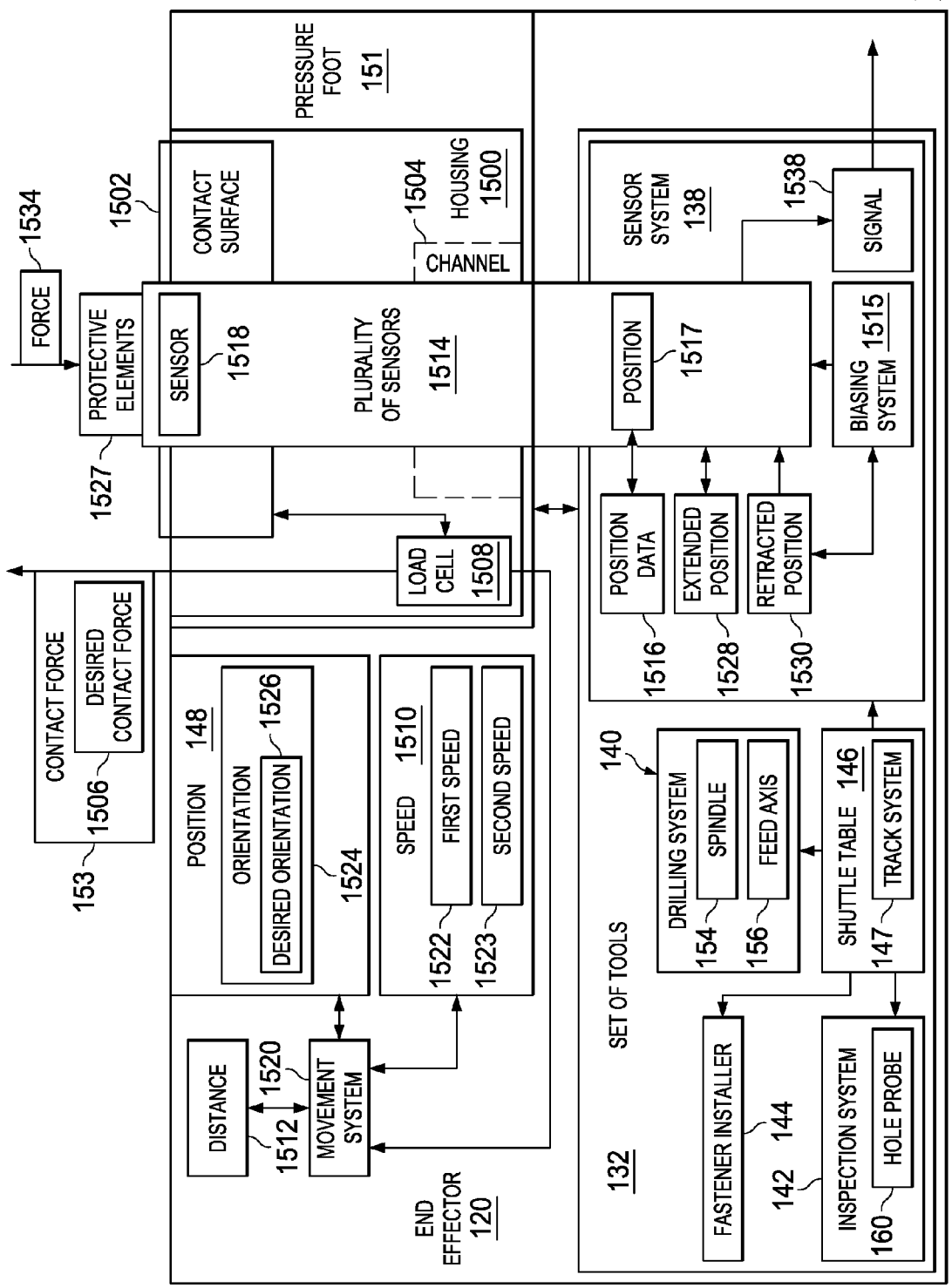
FIG. 15 is an illustration of a block diagram of an end effector in accordance with an illustrative embodiment.

Turning to FIG. 15, an illustration of a block diagram of end effector 120 from FIG. 1 is depicted in accordance with an illustrative embodiment. In this depicted example, examples of components that may be used to implement end effector 120 are shown in this figure.

As depicted, pressure foot 151 may be connected to end effector 120. Pressure foot 151 may be configured to contact surface 116 of structure 106 at location 135 shown in FIG. 1.

In this illustrative example, pressure foot 151 may have housing 1500, contact surface 1502, and channel 1504. Housing 1500 may be a structure surrounding components within pressure foot 151. Housing 1500 of pressure foot 151 may be connected to end effector 120 in this illustrative example.

As shown, contact surface 1502 may be a portion of pressure foot 151 that is oriented toward surface 116 of panel 112 in FIG. 1. In some illustrative examples, contact surface 1502 may be positioned on end effector 120 such that contact surface 1502 protrudes slightly from end effector 120. In other words, contact surface 1502 may extend outward from end effector 120. In this manner, contact surface 1502 of pressure foot 151 is the portion of end effector 120 that contacts surface 116 of structure 106.

Pressure foot 151 may be configured to contact surface 116 at location 135 with desired contact force 1506. Desired contact force 1506 may be an amount of force needed for set of tools 132 to perform operation 111 in FIG. 1 in a desired manner. In this illustrative example, desired contact force 1506 may be an amount of force sufficient to push structure 106 against a substructure to clamp the components in place.

Structure 106 may be clamped before performing operation 111. As an example, panel 112 may need to be clamped to a rib or spar with desired contact force 1506 to install fastener 104 shown in FIG. 1. Desired contact force 1506 may be zero when it is not desirable for pressure foot 151 to contact surface 116.

In this illustrative example, pressure foot 151 may remain in contact with surface 116 of structure 106 at location 135 throughout the performance of operation 111 on structure 106. In particular, contact surface 1502 may remain in contact with surface 116 as set of tools 132 move along track system 147 in shuttle table 146 to install fastener 104. Pressure foot 151 may exert desired contact force 1506 as fastener 104 is being installed.

In this illustrative example, channel 1504 may be located centrally in pressure foot 151. Channel 1504 may be a space within housing 1500 of pressure foot 151 through which set of tools 132 may pass. Channel 1504 may extend centrally through substantially all of housing 1500 in this illustrative example. Channel 409 in pressure foot 408 in FIG. 4 may be an example of a physical implementation for channel 1504 shown in this figure.

In this depicted example, channel 1504 of pressure foot 151 may provide access for set of tools 132 to location 135 on surface 116 of structure 106. For instance, inspection system 142 may move along track system 147 in shuttle table 146 to align with channel 1504 of pressure foot 151. Inspection system 142 then may be extended through channel 1504 in pressure foot 151 to inspect location 135 on surface 116 of structure 106.

As another illustrative example, fastener installer 144 may move along track system 147 to align with channel 1504. Fastener installer 144 may then extend through channel 1504 to install fastener 104 in hole 134. Pressure foot 151 may maintain desired contact force 1506 to push surface 116 of structure 106 at location 135 against its substructure during these operations.

As depicted, load cell 1508 may be associated with pressure foot 151. Load cell 1508 may be connected to contact surface 1502 of pressure foot 151.

In this depicted example, load cell 1508 may be a device configured to identify contact force 153 between pressure foot 151 and surface 116 of structure 106. In particular, load cell 1508 may be configured to identify contact force 153 between contact surface 1502 of pressure foot 151 and surface 116 at location 135.

In this illustrative example, as contact surface 1502 of pressure foot 151 touches surface 116 at location 135, load cell 1508 may identify contact force 153. At least one of speed 1510 of end effector 120 or distance 1512 traveled by end effector 120 may be modified based on contact force 153 identified by load cell 1508. For example, without limitation, end effector 120 may be steered as it moves toward work surface 116 using feedback provided by at least one of load cell 1508, a metrology system 152 in FIG. 1, and sensor system 138. In other words, steering may occur "on the fly" using feedback from various systems.

In this illustrative example, speed 1510 may be a rate of movement of end effector 120. Speed 1510 also may represent the rate of movement of pressure foot 151. Distance 1512 may be an amount of space between contact surface 1502 of pressure foot 151 and surface 116.

Based on contact force 153 identified using load cell 1508, end effector 120 may slow down, speed up, change orientation, or be modified in some other manner. As an example, if contact force 153 is greater than desired contact force 1506, speed 1510 may be reduced such that contact force 153 from pressure foot 151 reduces the formation of inconsistencies, avoids the formation of inconsistencies, or both, in surface 116 of structure 106.

Speed 1510 may be altered based on pre-programmed instructions in some illustrative examples. For instance, when contact force 153 is determined, end effector 120 may automatically adjust its speed. In other illustrative examples, speed 1510 is measured dynamically using a measurement device. In still another illustrative example, speed 1510 of end effector 120 is calculated by various applications in communication with controller 128 in FIG. 1. In this case, speed 1510 may be calculated from position information generated by metrology system 152, sensor system 138, or both as shown in FIG. 1.

As another example, if contact force 153 is less than desired contact force 1506, end effector 120 may be moved closer to surface 116 to provide desired contact force 1506. As yet another example, if contact force 153 is substantially equal to desired contact force 1506, end effector 120 may be stopped and operation 111 may be started on surface 116 of structure 106. These changes may occur under the direction of controller 128, system controller 166 in FIG. 1, or both.

In this illustrative example, sensor system 138 may be used to position pressure foot 151 and end effector 120 relative to location 135 on surface 116 prior to contacting surface 116. In an illustrative example, sensor system 138 may move along track system 147 in shuttle table 146 to align with channel 1504 in pressure foot 151. Sensor system 138 may be extended through channel 1504 toward surface 116.

In this illustrative example, sensor system 138 may have plurality of sensors 1514 and biasing system 1515. Plurality of sensors 1514 may be devices configured to generate position data 1516 about position 1517 of plurality of sensors 1514 relative to surface 116 of structure 106 at location 135.

In this depicted example, position 1517 may include an orientation for each of plurality of sensors 1514 relative to surface 116, a location of each of plurality of sensors 1514 in three-dimensional space, a distance from surface 116 for each of plurality of sensors 1514, or a combination thereof. In this illustrative example, position data 1516 may be information about position 1517 including, for example, without limitation, coordinates, values, or other types of information used to identify position 1517 with respect to at least one of global coordinate system 101 or airplane coordinate system 103 shown in FIG. 1.

Sensor 1518 may be one of plurality of sensors 1514 in this illustrative example. Sensor 1518 may take a number of different forms. For example, without limitation, sensor 1518 may be selected from one of a linear variable differential transformer, a capacitive transducer, a laser distance sensor, a contact encoder, a capacitive displacement sensor, an eddy-current sensor, an ultrasonic sensor, a multi-axis displacement transducer, and other suitable types of sensors.

As depicted, plurality of sensors 1514 may extend outward from pressure foot 151. Specifically, plurality of sensors 1514 may extend outward substantially perpendicular to contact surface 1502 of pressure foot 151. In this manner, plurality of sensors 1514 may be configured to contact surface 116 of structure 106 at location 135 prior to pressure foot 151 contacting surface 116 of structure 106.

In this illustrative example, each of plurality of sensors 1514 may have a different position 1517 relative to location 135 on surface 116 of structure 106. As a result, each of plurality of sensors 1514 may generate different position data 1516.

For example, without limitation, if plurality of sensors 1514 includes three sensors, position 1517 of each sensor relative to location 135 on surface 116 may be different. For instance, each sensor may have a different orientation relative to location 135 on surface 116. As another example, each sensor may have a different distance between the sensor and surface 116. In this manner, different position data 1516 may be generated by each of the three sensors in this illustrative example.

From position data 1516 generated by each of plurality of sensors 1514, the manner in which end effector 120 approaches location 135 on surface 116 of structure 106 may be adjusted. End effector 120 may be adjusted using movement system 1520.

As illustrated, movement system 1520 may be associated with end effector 120. In this illustrative example, movement system 1520 may comprise a number of components configured to move end effector 120.

Motion platform 122, as shown in FIG. 1, may be an example of movement system 1520 in some cases. In other illustrative examples, movement system 1520 may be used in addition to or in place of motion platform 122 to move end effector 120. Movement system 1520 may include wheels, a track system, pulleys, or other suitable movement devices in this illustrative example.

As depicted, movement system 1520 may be configured to change position 148 of end effector 120. For instance, movement system 1520 may change orientation 1524 of end effector 120 to desired orientation 1526 prior to contact with surface 116 of structure 106 at location 135.

In this illustrative example, orientation 1524 may be the direction that end effector 120 currently faces about a number of axes. Desired orientation 1526 may be the direction that end effector 120 faces when contact surface 1502 is substantially parallel to surface 116 of structure 106 at location 135.

Orientation 1524 and desired orientation 1526 also may represent the direction that contact surface 1502 of pressure foot 151 faces, since pressure foot 151 moves with end effector 120. Movement system 1520 may change orientation 1524 to desired orientation 1526 based on position data 1516 from each of plurality of sensors 1514.

As illustrated, movement system 1520 may change speed 1510 of end effector 120 as pressure foot 151 approaches surface 116. Initially, movement system 1520 may move end effector 120 at first speed 1522 toward surface 116.

Movement system 1520 may then reduce speed 1510 to second speed 1523 prior to pressure foot 151 contacting surface 116 of structure 106. Speed 1510 may be reduced to second speed 1523 based on position data 1516 from plurality of sensors 1514. As an example, if position data 1516 indicates that pressure foot 151 is about to contact surface 116, movement system 1520 may reduce speed 1510 to second speed 1523 such that pressure foot 151 does not contact surface 116 with an undesired amount of contact force 153.

Movement system 1520 may increase speed 1510 in some illustrative examples. For example, without limitation, speed 1510 may be increased from second speed 1523 to first speed 1522 to decrease the time needed for end effector 120 to approach location 135 on surface 116.

In this illustrative example, movement system 1520 may be configured to change position 148 of end effector 120 as end effector 120 moves toward surface 116 of structure 106. For instance, movement system 1520 may dynamically change orientation 1524 without stopping end effector 120. In a similar fashion, movement system 1520 may change speed 1510, distance 1512 traveled by end effector 120, or both as end effector 120 moves toward location 135 on surface 116 of structure 106.

As illustrated, biasing system 1515 may be associated with plurality of sensors 1514. Biasing system 1515 may comprise a number of components configured to bias plurality of sensors 1514 between extended position 1528 and retracted position 1530 in response to contacting surface 116 of structure 106 at location 135.

In this illustrative example, extended position 1528 may be a configuration for plurality of sensors 1514 in which plurality of sensors 1514 protrude outwardly from contact surface 1502 of pressure foot 151 in the direction of location 135 on surface 116. Retracted position 1530 may be a configuration for plurality of sensors 1514 in which plurality of sensors 1514 are positioned within housing 1500 of pressure foot 151.

In this illustrative example, each of plurality of sensors 1514 may extend and retract individually, or may extend and retract in combination. The extension and retraction may be active or passive, depending on the particular implementation. When active, controller 128 may extend one or more of plurality of sensors 1514 to contact surface 116.

Biasing system 1515 may take various forms in this illustrative example. For instance, biasing system 1515 may include at least one of a number of springs, coils, mechanical devices, or other suitable structures.

As plurality of sensors 1514 contact surface 116 of structure 106 and end effector 120 continues to move toward surface 116 at location 135, surface 116 exerts force 1534 on plurality of sensors 1514. In response, plurality of sensors 1514 are biased from extended position 1528 to retracted position 1530. In other words, plurality of sensors 1514 may move into housing 1500 in response to force 1534.

For instance, when biasing system 1515 includes a spring, plurality of sensors 1514 may compress the spring. In this manner, plurality of sensors 1514 are "spring-loaded" such that force 1534 may not damage plurality of sensors 1514. In addition, plurality of sensors 1514 also may not cause inconsistencies to form on surface 116. When end effector 120 moves away from location 135 on surface 116, the spring may force plurality of sensors 1514 outward.

In some instances, plurality of sensors 1514 may include a number of protective elements 1527 positioned on at least one sensor in plurality of sensors 1514. Protective elements 1527 are configured to prevent components in plurality of sensors 1514 from scratching or marring surface 116 at location 135. For example, without limitation, a pad, a coating, or some other suitable protective element may be positioned on at least one of plurality of sensors 1514.

After end effector 120 is positioned relative to location 135 on surface 116 in a desired manner, sensor system 138 may be repositioned on shuttle table 146 such that other tools in set of tools 132 may perform additional operations. In this illustrative example, sensor system 138 may be moved along track system 147 in shuttle table 146 out of alignment from channel 1504.

For example, without limitation, drilling system 140 may then be moved along track system 147 to align with channel 1504 of pressure foot 151. Drilling system 140 may then be extended to drill hole 134 in surface 116 of structure 106 at location 135. Subsequently, fastener 104 may be inserted in hole 134.

In this illustrative example, sensor system 138 may be configured to measure flushness 171 of fastener 104 inserted into hole 134 drilled in location 135 on surface 116 of structure 106 shown in FIG. 1. After fastener 104 is inserted in hole 134, sensor system 138 may then be moved to align with channel 1504 of pressure foot 151. Plurality of sensors 1514 then may be used to measure flushness 171 of fastener 104. Based on flushness 171, operation 111 performed by set of tools 132 on end effector 120 may be modified.

For instance, if flushness 171 indicates fastener 104 is recessed from surface 116 of structure 106 more than desired, at least one of drilling system 140 or fastener installer 144 may be reconfigured. In one illustrative example, fastener installer 144 may be reconfigured to use less force when installing fastener 104. In another example, drilling system 140 may be reconfigured to adjust the countersink, depth, angle, or some other parameter. If flushness 171 indicates that fastener 104 is substantially planar to surface 116 of panel 112 within selected tolerances, end effector 120 with set of tools 132 may duplicate its operations on subsequent fastener installations.

In some illustrative examples, sensor system 138 also may be configured to identify object 174 on surface 116 of structure 106 at location 135. Sensor system 138 may be configured to generate signal 1538 when object 174 is identified. Signal 1538 may be configured to stop end effector 120 before pressure foot 151 reaches object 174.

For example, without limitation, when sensor 1518 comes in contact with object 174, sensor 1518 may send signal 1538 to controller 128 shown in FIG. 1. From signal 1538, controller 128 may command movement system 1520 to stop end effector 120 and reposition end effector 120 to avoid object 174. Signal 1538 may be an electrical signal in this illustrative example.

The illustration of end effector 120, pressure foot 151, and sensor system 138 in FIG. 15 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, sensor system 138 with plurality of sensors 1514 may be used on other types of structures other than panel 112. As an example, end effector 120 with sensor system 138 may be oriented toward an upper panel, a panel in a vertical configuration, or an object in another type of configuration. In other words, the movement of plurality of sensors 1514, end effector 120, and pressure foot 151 is not limited to an upward movement relative to a lower panel of a structure. Each component works in a similar fashion when approaching structures with varying configurations.

As another illustrative example, movement system 1520 may not move end effector 120 such that plurality of sensors 1514 are substantially perpendicular to surface 116 at location 135. Instead, in some examples, hole 134 may be drilled along an axis that is not normal to surface 116 at location 135. In this case, end effector 120 may be oriented at an angle. Another device, other than pressure foot 151, may be needed to clamp structure 106 to its substructure. In still another illustrative example, plurality of sensors 1514 may extend outward from contact surface 1502 of pressure foot 151 at a different angle other than about ninety degrees, depending on the particular implementation.

Figure 16:
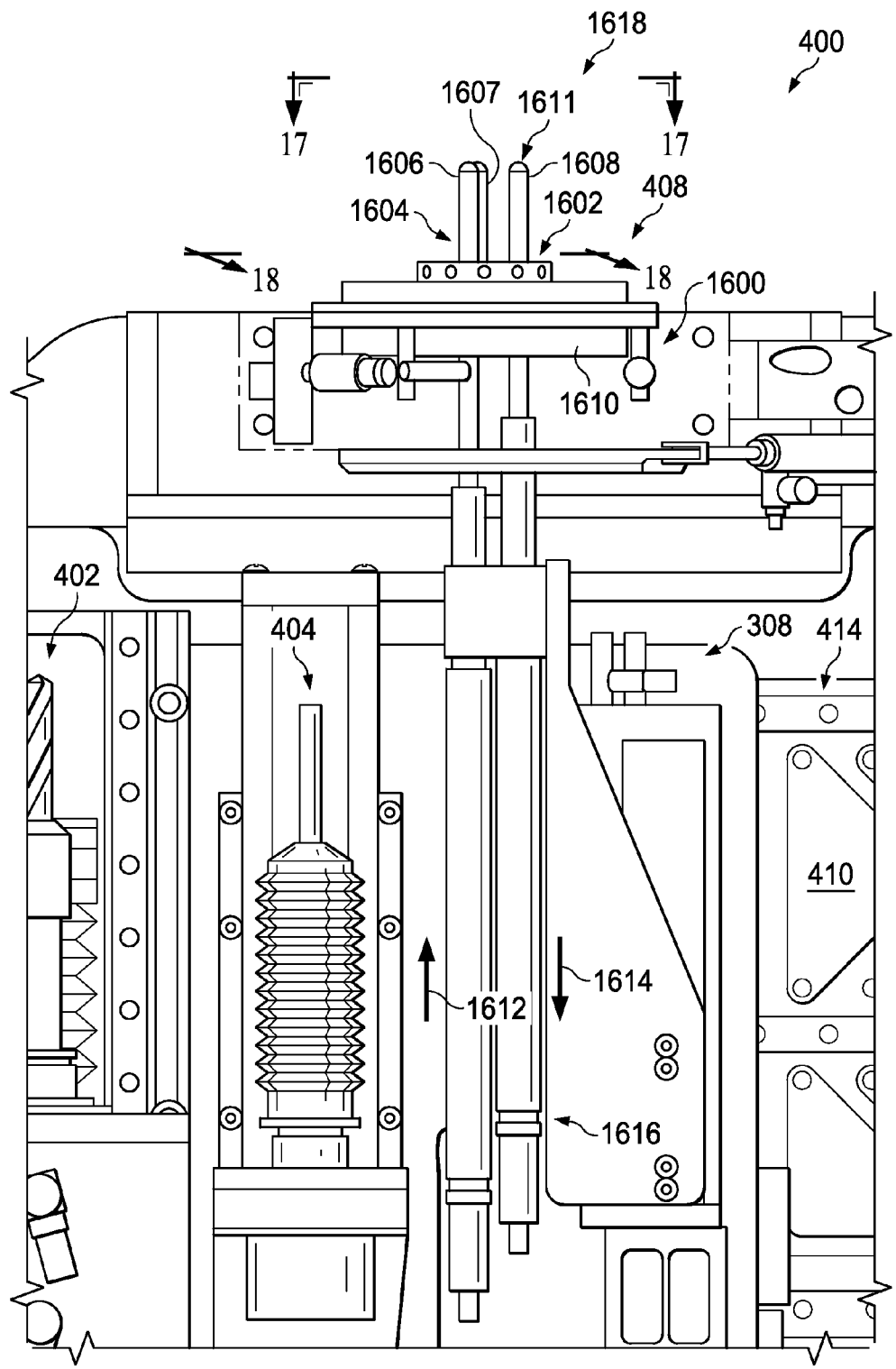
FIG. 16 is an illustration of a side view of a pressure foot on an end effector in accordance with an illustrative embodiment.

With reference next to FIG. 16, an illustration of a side view of pressure foot 408 on end effector 302 from FIG. 4 is depicted in accordance with an illustrative embodiment. In this depicted example, an enlarged view of pressure foot 408 is shown in the direction of lines 16-16 in FIG. 4.

As illustrated, pressure foot 408 may include contact surface 1600 and housing 1602. A channel (not shown in this view) extends centrally through housing 1602. Contact surface 1600 and housing 1602 may be examples of physical implementations for contact surface 1502 and housing 1500, respectively, of pressure foot 151 shown in block form in FIG. 15.

In this depicted example, sensor system 400 may include plurality of sensors 1604. Plurality of sensors 1604 may include sensor 1606, sensor 1607, and sensor 1608 in this illustrative example. Plurality of sensors 1604 may be an example of a physical implementation for plurality of sensors 1514 shown in block form in FIG. 15.

In this illustrative example, sensor 1606, sensor 1607 (partially obscured in this view) and sensor 1608 may be linear variable differential transformers. Linear variable differential transformers may be contact-type sensors in this illustrative example. A "contact-type sensor" may be a sensor that generates position data when in contact with an object. Sensor 1606, sensor 1607, and sensor 1608 may individually generate position data for use in adjusting a direction of travel for end effector 302. Protective elements 1611 may be placed on the protruding ends of sensor 1606, sensor 1607, and sensor 1608 to prevent scratching or marring the surface of the structure.

Plurality of sensors 1604 extend outward from pressure foot 408 in this illustrative example. In particular, plurality of sensors 1604 may extend centrally though the channel in pressure foot 408. Plurality of sensors 1604 may extend outward substantially perpendicular to contact surface 1600 of pressure foot 408 in this illustrative example.

Plurality of sensors 1604 may be configured to move in the direction of arrow 1612 to extend beyond pressure foot 408. In a similar fashion, plurality of sensors 1604 may be configured to move in the direction of arrow 1614. Biasing system 1616 may be configured to bias plurality of sensors 1604 as they move back and forth in the directions of arrow 1612 and arrow 1614.

In this illustrative example, plurality of sensors 1604 is in extended position 1618. Extended position 1618 of plurality of sensors 1604 may be an example of an implementation for extended position 1528 of plurality of sensors 1514 in FIG. 15.

In some cases, sensor 1606, sensor 1607, and sensor 1608 may be configured to extend different distances from pressure foot 408. For instance, at least one of sensor 1606, sensor 1607, and sensor 1608 may be configured to extend further than the other.

As depicted, load cell 1610 may be connected to pressure foot 408. Load cell 1610 may be an example of an implementation for load cell 1508 shown in block form in FIG. 15.

In this illustrative example, load cell 1610 may be connected to contact surface 1600 of pressure foot 408. Load cell 1610 may measure a contact force between pressure foot 408 and the surface of the structure.

Figure 17:
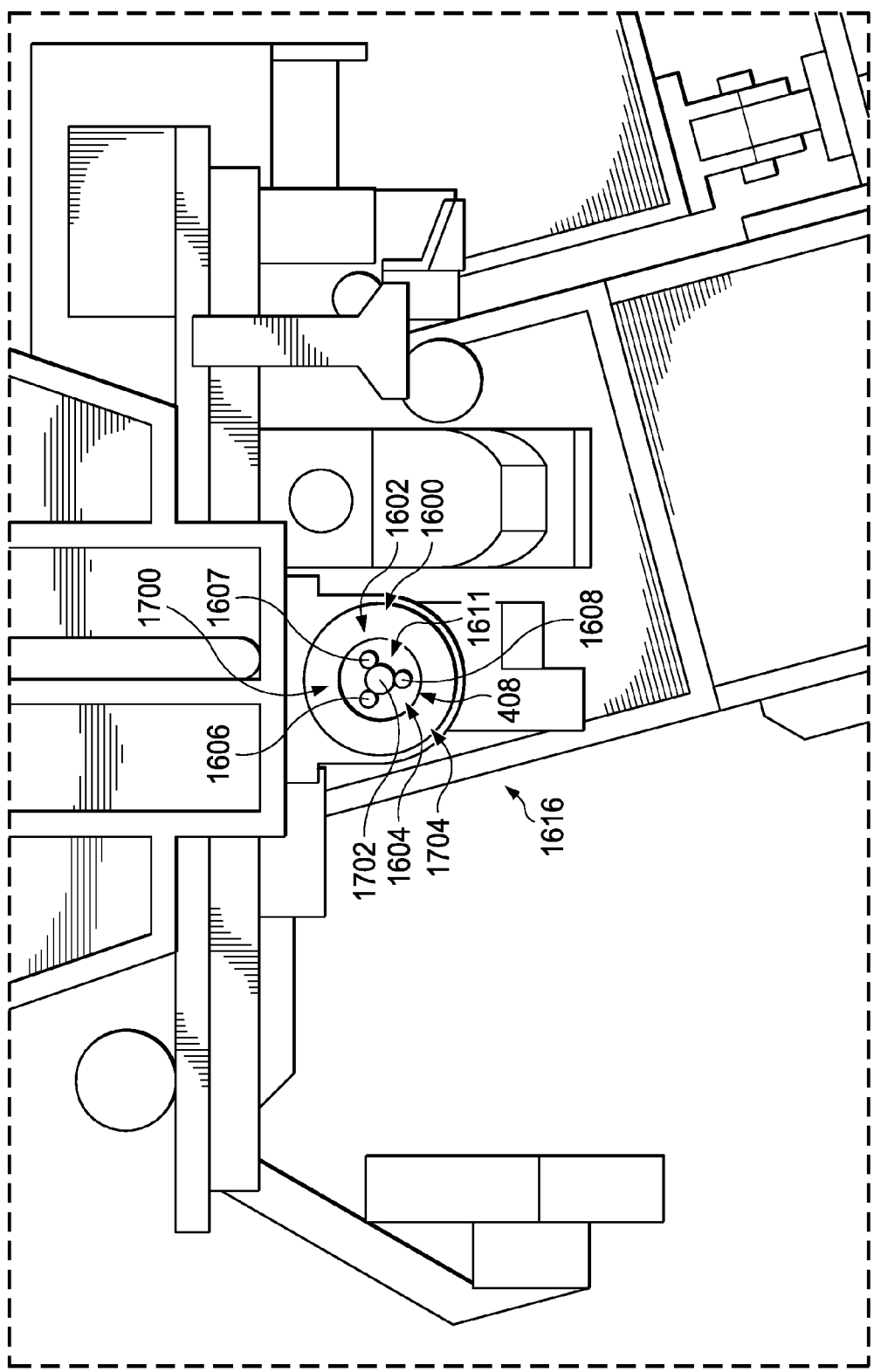
FIG. 17 is an illustration of a top view of a pressure foot in accordance with an illustrative embodiment.

In FIG. 17, an illustration of a top view of pressure foot 408 in FIG. 16 is depicted in accordance with an illustrative embodiment. A top view of pressure foot 408 is shown in the direction of lines 17-17 in FIG. 16. This view is taken normal to axis 1702 shown in this figure.

Channel 1700 in pressure foot 408 may be seen in this view. Channel 1700 may have axis 1702. Axis 1702 may extend centrally through channel 1700.

As shown, plurality of sensors 1604 may have configuration 1704. Configuration 1704 may be an arrangement of plurality of sensors 1604 where each sensor is positioned substantially equidistant from the other sensors about axis 1702. In this illustrative example, sensor 1606, sensor 1607, and sensor 1608 are positioned substantially equidistant from one another about axis 1702. Configuration 1704 for plurality of sensors 1604 may generate position data about a desired location for hole 900 in FIG. 9.

In this illustrative example, operations may be performed by set of tools 308, shown in FIGS. 3-12, along axis 1702. For example, without limitation, hole 900 may be drilled along axis 1702. As another illustrative example, fastener 1100 from FIG. 11 may be installed along axis 1702. When properly aligned, axis 1702 of channel 1700 may correspond to axis 137 for hole 134 shown in FIG. 1.

Because plurality of sensors 1604 are positioned about axis 1702 in this manner, position data may be generated for a location for hole 900 with a smaller margin of error than with some currently used systems. In other words, since plurality of sensors 1604 are so closely positioned relative to a desired location for hole 900, more accurate position data may be generated, due to the possibly compound curvature of the structure surface. As a result, a greater likelihood of accurate performance drilling and fastening operations may be achieved.

FIGS. 18-21 are illustrations of an enlarged view of end effector 302 with pressure foot 408 as end effector 302 moves relative to location 601 on surface 206 of panel 208 from FIG. 6. The movement of end effector 302 is adjusted based on position data generated by plurality of sensors 1604 from FIG. 16. In FIG. 18-21, end effector 302 is shown in the direction of lines 18-18 in FIG. 16.

Figure 18:
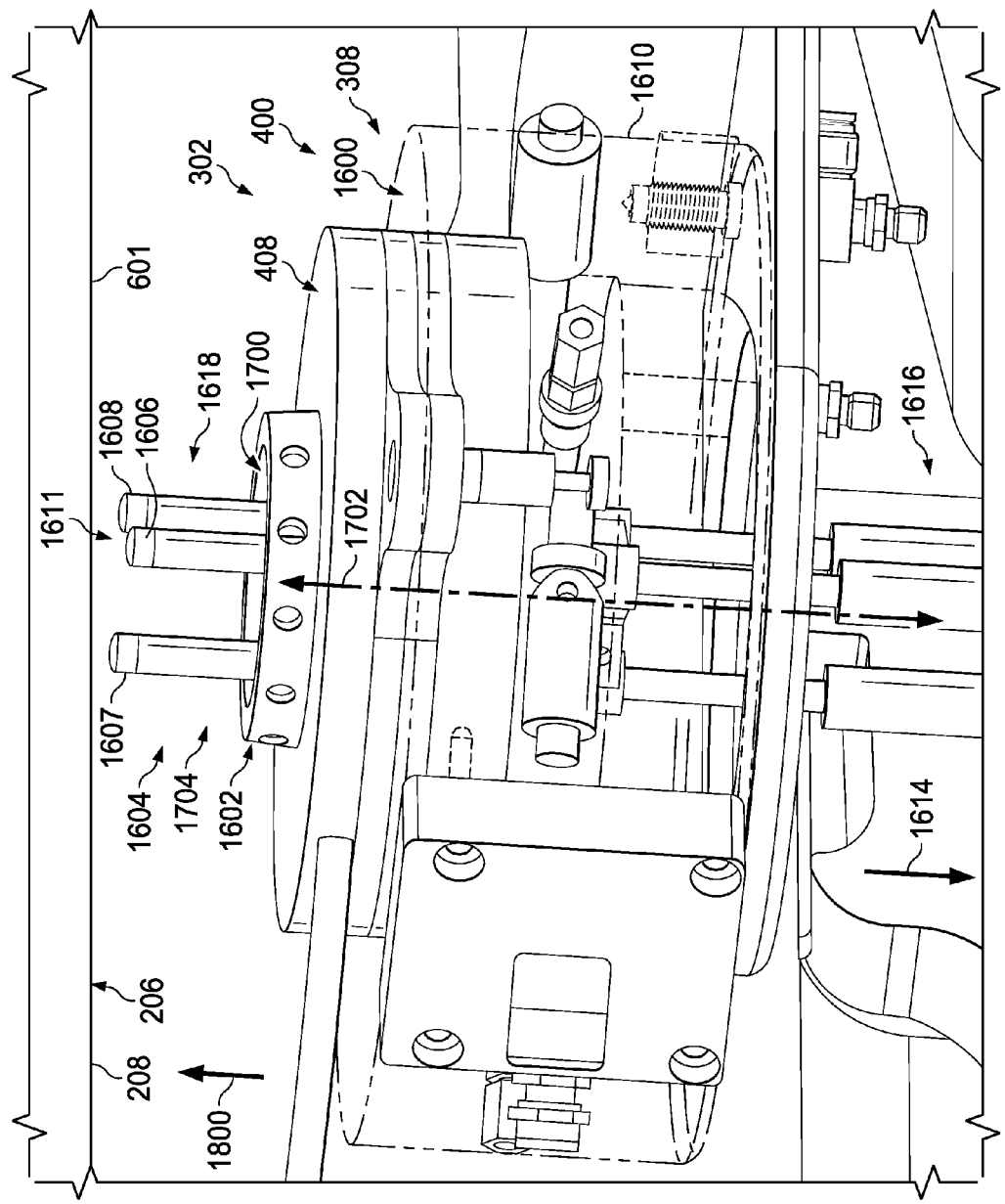
FIG. 18 is an illustration of an end effector moving toward a location on a surface of a panel in accordance with an illustrative embodiment.

Referring to FIG. 18, an illustration of end effector 302 moving toward location 601 on surface 206 of panel 208 is depicted in accordance with an illustrative embodiment. In this depicted example, end effector 302 may move toward location 601 on surface 206 of panel 208 in the direction of arrow 1800.

In this illustrative example, it may be desirable for axis 1702 to be perpendicular to location 601 on surface 206 to perform operations at location 601 in a desired manner. As a result, end effector 302 may need to be repositioned relative to location 601 on surface 206.

End effector 302 may move in the direction of arrow 1800 until one of plurality of sensors 1604 contacts surface 206 at location 601. That sensor may then generate position data about its position relative to surface 206 at location 601. From this position data, controller 320 (not shown in this view) may send signals to reposition end effector 302. End effector 302 may be repositioned using a movement system (not shown in this view). For instance, end effector 302 may be repositioned using motion platform 304 shown in FIG. 3.

In some illustrative examples, when plurality of sensors 1604 comprise a non-contact type sensor, each of plurality of sensors 1604 may generate position data continuously as end effector 302 moves toward location 601 on surface 206. In this illustrative example, a "non-contact type" sensor is a sensor that provides position data without contact with a structure.

In this illustrative example, end effector 302 may move in the direction of arrow 1800 at a first speed. As end effector 302 gets closer to location 601 on surface 206, the movement system may reduce the speed of end effector 302 to a second speed. The second speed may be a speed at which the risk of undesired encounters between pressure foot 408 and surface 206 at location 601 are reduced.

In this manner, end effector 302 may approach location 601 on surface 206 in at least two stages. In the first stage, end effector 302 moves at a more rapid pace than in the second stage. Because plurality of sensors 1604 extend outward from pressure foot 408 and provide position data, end effector 302 may be adjusted to be normal to location 601 on surface 206 before pressure foot 408 touches surface 206. This action allows for more rapid approach and dynamic adjustment of end effector 302, resulting in less time needed to position end effector 302 as desired.

Due to the compound curvature of surface 206, plurality of sensors 1604 may be positioned relative to one another in an equilateral triangular arrangement at a plane on, and parallel to, contact surface 1600. Channel 1700 runs through the center of the equilateral triangular arrangement. Axis 1702 is located at the centroid of the equilateral triangular arrangement. Each of plurality of sensors 1604 is located at a corner in the equilateral triangular arrangement. Other triangular sensor arrangements are also possible in other illustrative examples.

Figure 19:
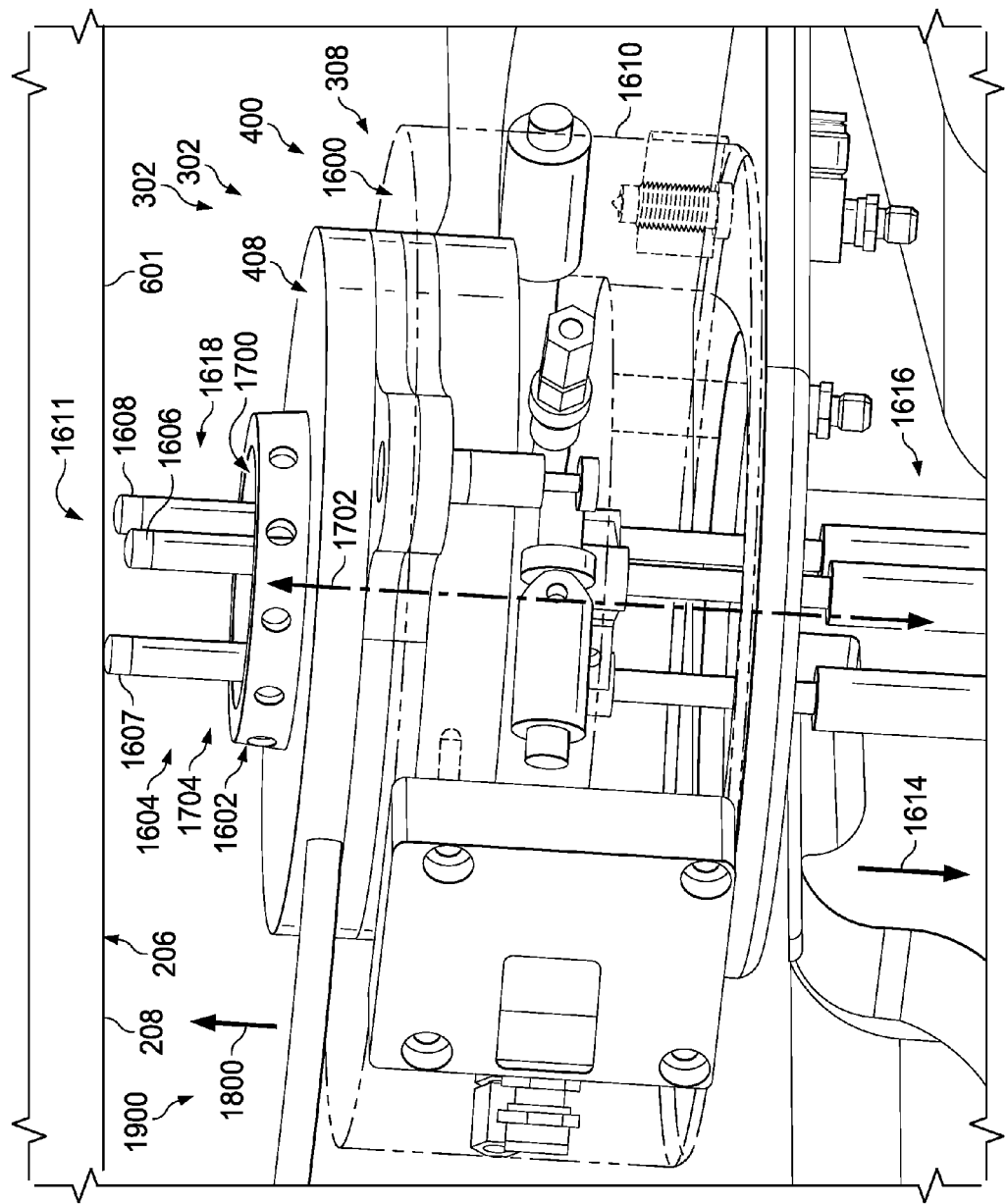
FIG. 19 is an illustration of a sensor contacting a surface of a panel at a location in accordance with an illustrative embodiment.

In FIG. 19, an illustration of sensor 1607 contacting surface 206 of panel 208 at location 601 is depicted in accordance with an illustrative embodiment. In this illustrative example, end effector 302 has moved in the direction of arrow 1800.

End effector 302 has orientation 1900 relative to location 601 on surface 206 in this illustrative example. Orientation 1900 may be an example of an implementation for orientation 1524 shown in block form in FIG. 15.

As depicted, sensor 1607 has made contact with surface 206 of panel 208 at location 601. In response to this contact, sensor 1607 begins to move in the direction of arrow 1614.

Figure 20:
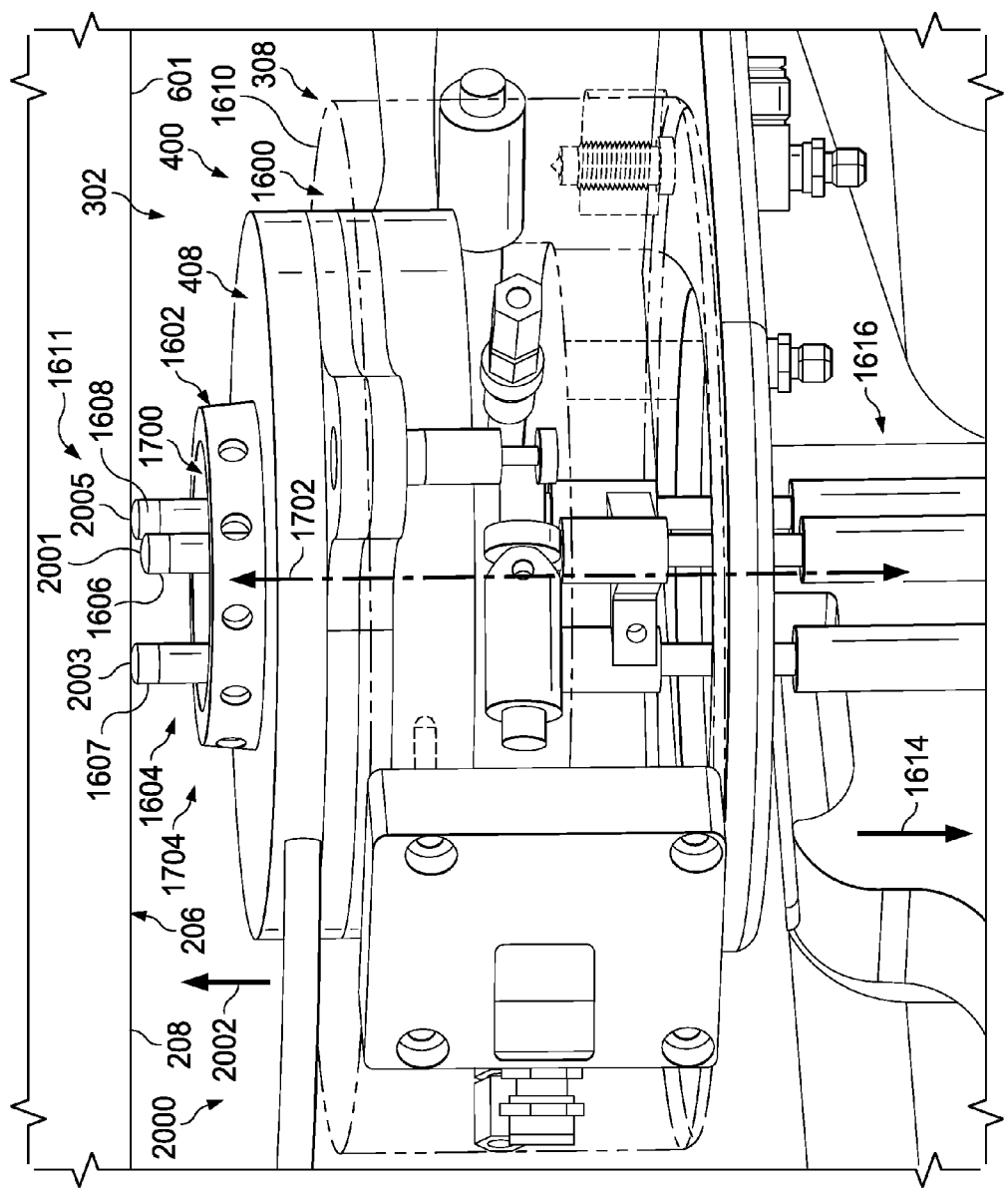
FIG. 20 is an illustration of an end effector adjusting a position of an end effector in accordance with an illustrative embodiment.

In this depicted example, the movement of sensor 1607 causes sensor 1607 to generate position data. This position data may be used by the movement system to change the position of end effector 302 as shown in FIG. 20. For example, the movement system may change orientation 1900 of end effector 302 to orientation 2000 as shown in FIG. 20 as end effector 302 moves closer to surface 206.

Since neither sensor 1606 nor sensor 1608 have contacted surface 206, sensor 1606 and sensor 1608 may not generate position data in this illustrative example. The movement system may be commanded by controller 320 to reposition end effector 120 until sensor 1606 and sensor 1608 generate position data equivalent to sensor 1607 as pressure foot 408 closes in on location 135 at the second speed.

Turning now to FIG. 20, an illustration of end effector 302 adjusting a position of end effector 302 is depicted in accordance with an illustrative embodiment. In this illustrative example, axis 1702 is substantially normal to the plane formed by contact point 2001 for sensor 1606, contact point 2003 for sensor 1607, and contact point 2005 for sensor 1608 at location 601 on surface 206.

End effector 302 now has orientation 2000. In this illustrative example, orientation 2000 may be a desired orientation. In this illustrative example, orientation 2000 is an orientation for end effector 302 in which contact surface 1600 of pressure foot 408 is substantially normal to surface 206 at location 601. Orientation 2000 may be an example of an implementation for desired orientation 1526 shown in block form in FIG. 15.

End effector 302 may move toward surface 206 in the direction of arrow 2002. Movement in the direction of arrow 2002 may still occur at the first speed.

All of plurality of sensors 1604 may contact surface 206 in this illustrative example at the corresponding contact points. Each sensor in plurality of sensors 1604 may move in the direction of arrow 1614. As plurality of sensors 1604 move, each sensor generates position data that may be used to make additional adjustments to the orientation of end effector 302.

Figure 21:
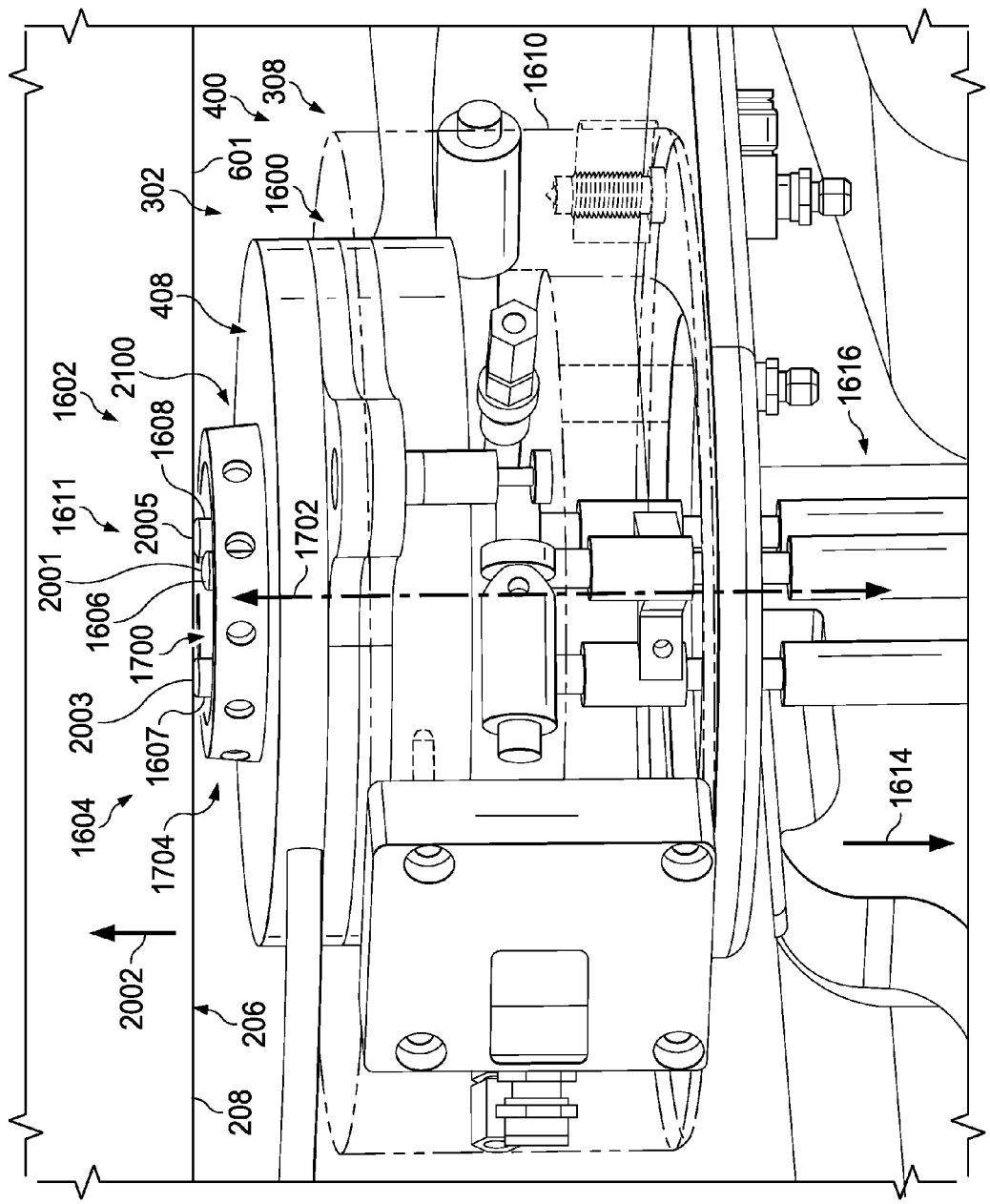
FIG. 21 is an illustration of a pressure foot before contacting a surface of a panel in accordance with an illustrative embodiment.

Next, in FIG. 21, an illustration of pressure foot 408 before contacting surface 206 of panel 208 at location 601 is depicted in accordance with an illustrative embodiment. In this depicted example, end effector 302 has moved in the direction of arrow 2002. Contact surface 1600 of pressure foot 408 is about to touch surface 206 of panel 208 at location 601.

In this depicted example, the movement system has reduced the speed of end effector 302 in response to signals sent by controller 320. End effector 302 continues to move in the direction of arrow 2002 until contact surface 1600 contacts surface 206 of panel 208 in a desired manner.

On contact, load cell 1610 measures the contact force between the two objects. If the contact force is substantially equal to a desired contact force for clamping, set of tools 308 may begin to perform operations on surface 206 at location 601, as shown and described with reference to FIGS. 6-12, above. If not, end effector 302 may be moved further toward location 601 on surface 206 at the second speed until a desired contact force is reached.

In this illustrative example, plurality of sensors 1604 may be in retracted position 2100. In retracted position 2100, plurality of sensors 1604 may not extend outward from pressure foot 408. Retracted position 2100 may be an example of an implementation for retracted position 1530 for plurality of sensors 1514 shown in block form in FIG. 15.

Figure 22:
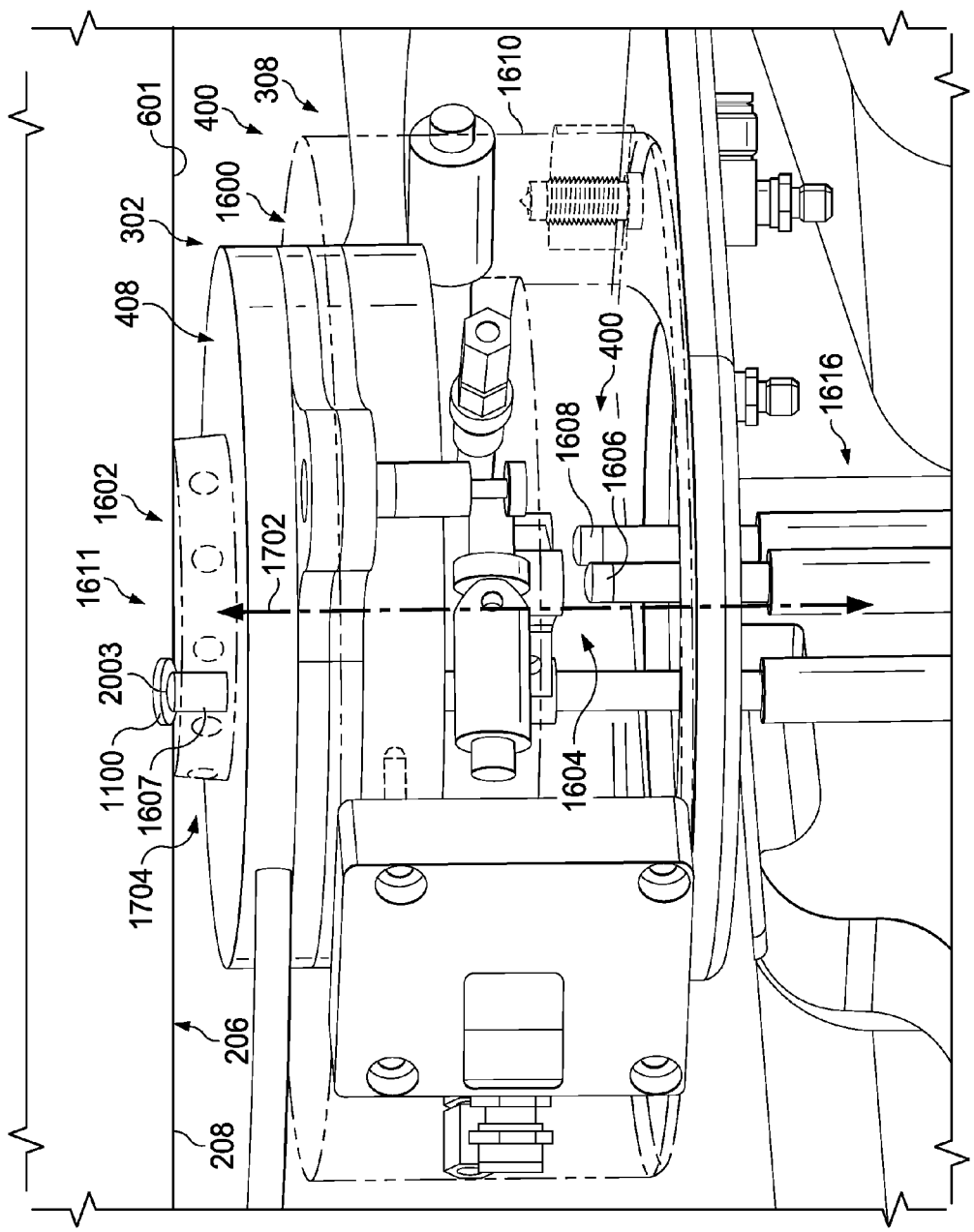
FIG. 22 is an illustration of a sensor system inspecting a flushness of a fastener installed in a panel in accordance with an illustrative embodiment.

With reference now to FIG. 22, an illustration of sensor system 400 inspecting a flushness of fastener 1100 installed in panel 208 as shown in FIG. 12 is depicted in accordance with an illustrative embodiment. In this depicted example, contact surface 1600 of pressure foot 408 is interfaced with surface 206 at location 601.

Sensor 1607 may be extended centrally through channel 1700, shown in FIGS. 17-21, in pressure foot 408 to contact fastener 1100. Sensor 1608 and sensor 1606 remain retracted in this illustrative example.

Sensor 1607 may then measure fastener 1100. This measurement may then be compared to the original reading from the three sensors on initial contact with surface 206 at location 601. The original three contact points 2001, 2003, and 2005 allow calculation of a plane in which the current reading is proximally the center of the three sensors. A difference in height between fastener 1100 and surface 206 at location 601 around fastener 1100 may then be determined.

Figure 23:
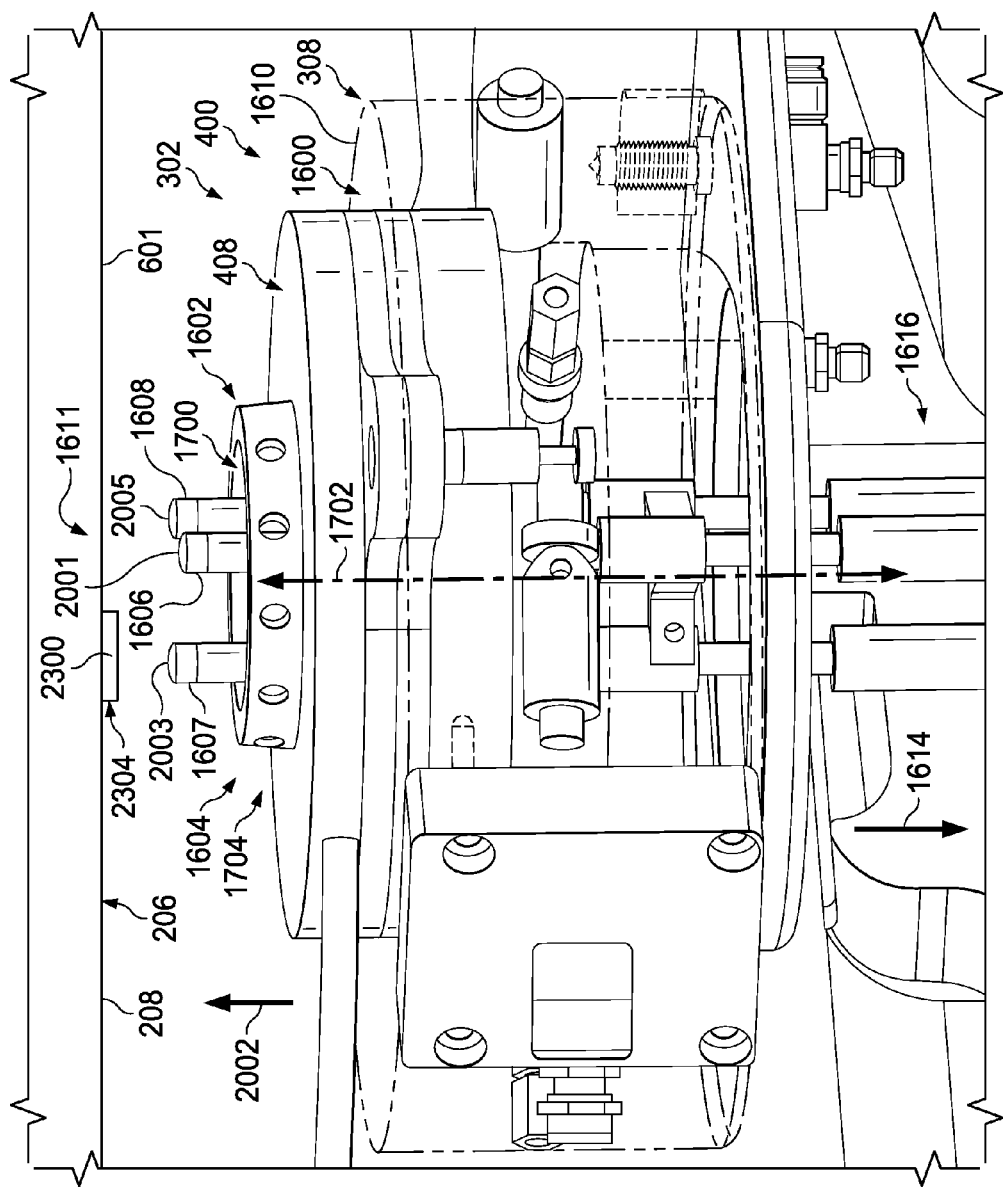
FIG. 23 is an illustration of an end effector approaching an object on a surface of a panel in accordance with an illustrative embodiment.

Turning to FIG. 23, an illustration of end effector 302 approaching an object on surface 206 of panel 208 at location 601 is depicted in accordance with an illustrative embodiment. In this depicted example, object 2300 may be present on surface 206.

Object 2300 may be debris, a crowned fastener, or some other type of object in this illustrative example. Object 2300 may be an example of a physical implementation for object 174 shown in block form in FIG. 1.

It may be desirable for pressure foot 408 to avoid an encounter with object 2300. For example, without limitation, an encounter between pressure foot 408 and object 2300 may result in rework required for pressure foot 408. In another example, applying undesirable pressure to object 2300 using pressure foot 408 may damage surface 206 in some manner.

In this illustrative example, end effector 302 moves in the direction of arrow 2002 toward surface 206 at location 601. Plurality of sensors 1604 may be used to sense the presence of object 2300, as well as location 2304 of object 2300 on surface 206 at location 601, before pressure foot 408 comes in contact with object 2300.

Figure 24:
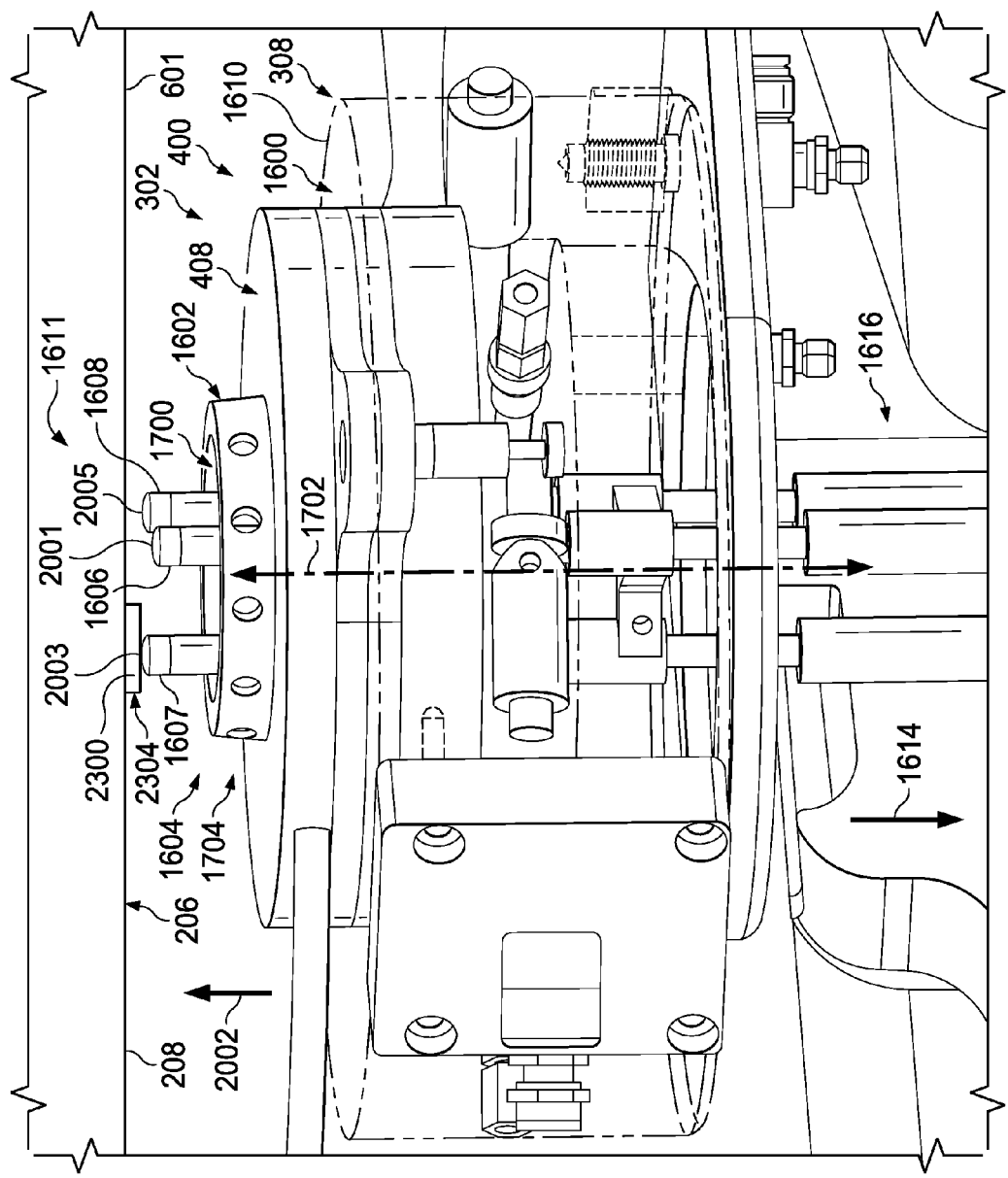
FIG. 24 is an illustration of a sensor contacting an object on a surface of a panel in accordance with an illustrative embodiment.

In FIG. 24, an illustration of sensor 1607 contacting object 2300 on surface 206 of panel 208 at location 601 shown in FIG. 23 is depicted in accordance with an illustrative embodiment. In this depicted example, sensor 1607 has contacted object 2300 and may begin to move in the direction of arrow 1614. At the same time, sensor 1607 generates position data indicating the presence of object 2300.

The movement system may be configured to stop movement of end effector 302 such that pressure foot 408 does not touch object 2300. Object 2300 may be removed from surface 206, end effector 302 may be repositioned to avoid contact with object 2300, or both.

Figure 25:
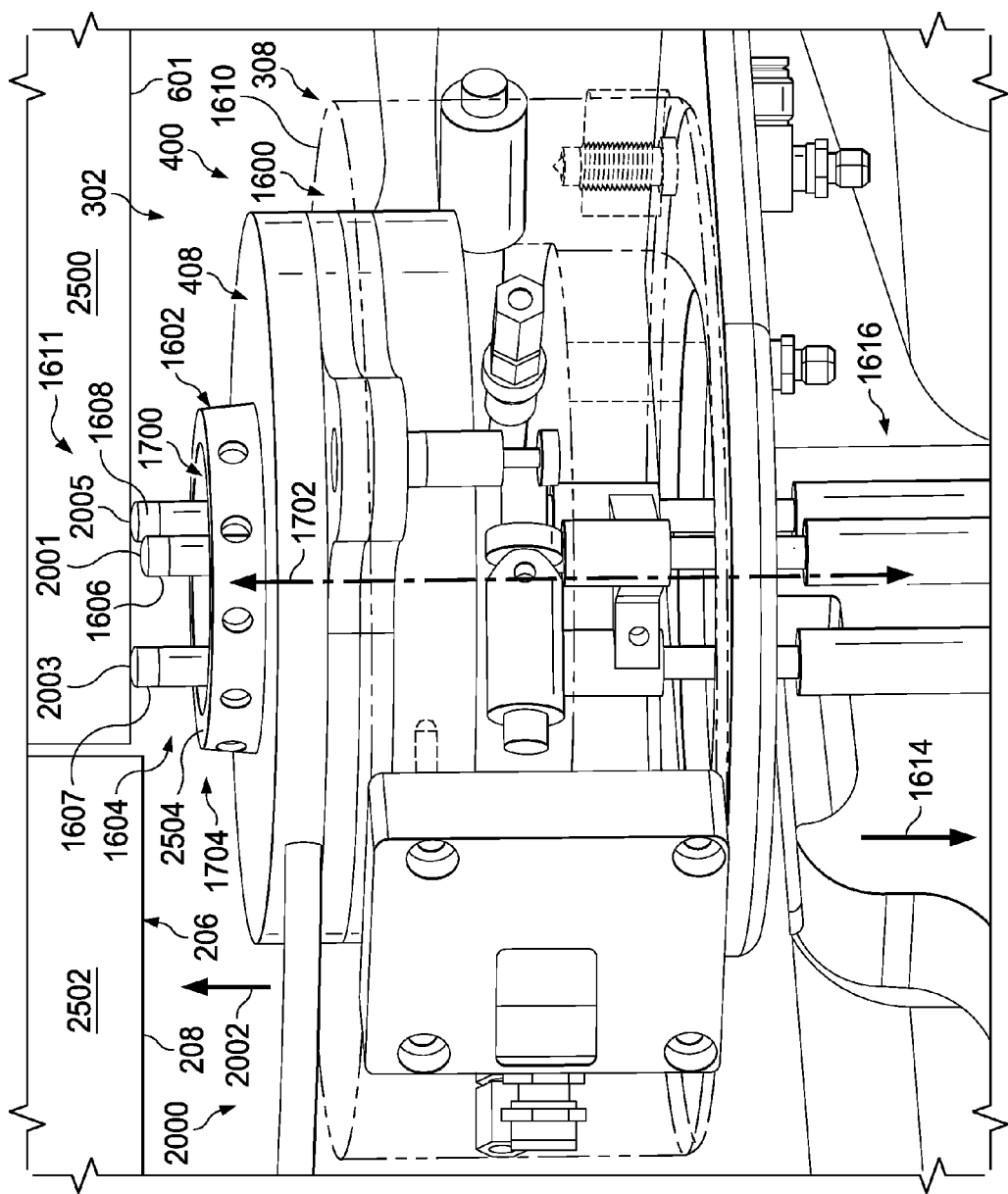
FIG. 25 is an illustration of an end effector approaching a surface of a panel in accordance with an illustrative embodiment.

Turning to FIG. 25, an illustration of end effector 302 approaching surface 206 of panel 208 is depicted in accordance with an illustrative embodiment. In this depicted example, portion 2500 of surface 206 may have a different contour than portion 2502 of surface 206. For instance, portion 2502 and portion 2500 may be a location for a lap joint on surface 206.

As shown, without plurality of sensors 1604 extending beyond contact surface 1600 of pressure foot 408, position data would be generated on contact by pressure foot 408. However, this position data can be inaccurate. Portion 2504 of contact surface 1600 of pressure foot 408 may contact portion 2502 first, instead of providing accurate position data about the normality of pressure foot 408 to portion 2500 of surface 206.

The use of plurality of sensors 1604 extending beyond contact surface 1600 ensures accurate position data to adjust end effector 302 in a desired manner. Data is generated relative to the precise location for the hole, thus improving accuracy and decreasing the potential for misalignment of end effector 302.

Figure 26:
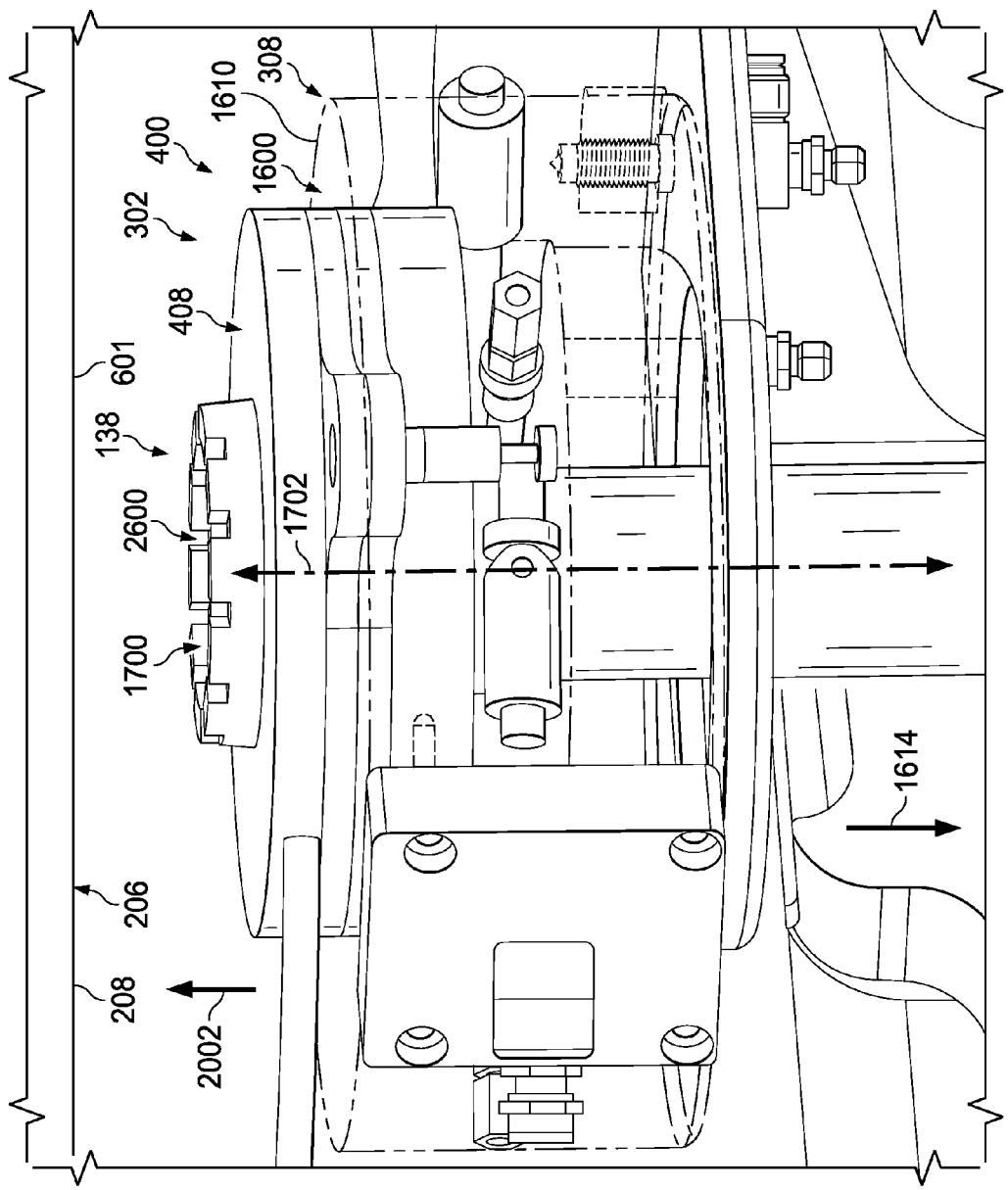
FIG. 26 is an illustration of an end effector with a pressure foot and a sensor system in accordance with an illustrative embodiment.

Referring next to FIG. 26, an illustration of end effector 302 with pressure foot 408 and sensor system 138 is depicted in accordance with an illustrative embodiment. In this depicted example, sensor system 138 may include plurality of sensors 2600.

Plurality of sensors 2600 have replaced plurality of sensors 1604 as shown in FIG. 16. Plurality of sensors 2600 may be an example of another physical implementation for plurality of sensors 1514 shown in block form in FIG. 15.

In this illustrative example, plurality of sensors 2600 may be arranged within channel 1700 of pressure foot 408. For instance, plurality of sensors 2600 may be arranged about axis 1702 within channel 1700.

As depicted, plurality of sensors 2600 may not extend outward from pressure foot 408. Instead, plurality of sensors 2600 may be non-contact type sensors.

In this instance, plurality of sensors 2600 may generate position data continuously as end effector 302 approaches surface 206 of panel 208. In this manner, end effector 302 may be repositioned such that axis 1702 is substantially perpendicular to surface 206 prior to pressure foot 408 contacting surface 206.

The illustrations of pressure foot 408 and sensor system 138 in FIGS. 16-26 are not meant to imply physical or architectural limitations to the manner in which an illustrative embodiment may be implemented. Other components in addition to or in place of the ones illustrated may be used. Some components may be optional.

The different components shown in FIGS. 16-26 may be illustrative examples of how components shown in block form in FIG. 15 can be implemented as physical structures. Additionally, some of the components in FIGS. 16-26 may be combined with components in FIG. 16, used with components in FIG. 16, or a combination of the two.

As an example, although three sensors are shown in plurality of sensors 1604 in FIGS. 16-25, other numbers of sensors may be used. For example, without limitation, two sensors, four sensors, six sensors, ten sensors, or some other suitable number of sensors may be present in plurality of sensors 1604.

In addition, other configurations for plurality of sensors 1604 may be used other than configuration 1704. As an example, plurality of sensors 1604 may be arranged along a diameter of channel 1700. In another illustrative example, plurality of sensors 1604 may be arranged along a circumference of channel 1700.

In still other illustrative examples, plurality of sensors 1604 may contact surface 206 at location 601 from above. In this case, end effector 302 may be oriented above panel 208 and move downward toward location 601 on surface 206. In still other illustrative examples, plurality of sensors 1604 may contact surface 206 from the side, at an angle, or in some other manner, depending on the particular implementation.

Although the illustrative examples are described with respect to panel 208 for an aircraft, an illustrative embodiment may be applied to other types of platforms. The platform may be, for example, without limitation, a mobile platform, a stationary platform, a land-based structure, an aquatic-based structure, and a space-based structure.

More specifically, the platform may be a surface ship, a tank, a personnel carrier, a train, a spacecraft, a space station, a satellite, a submarine, an automobile, a power plant, a bridge, a dam, a house, a manufacturing facility, a building, and other suitable platforms. In addition, plurality of sensors 1604 may be used to generate position data relative to other structures within each of these platforms.

Figure 27:
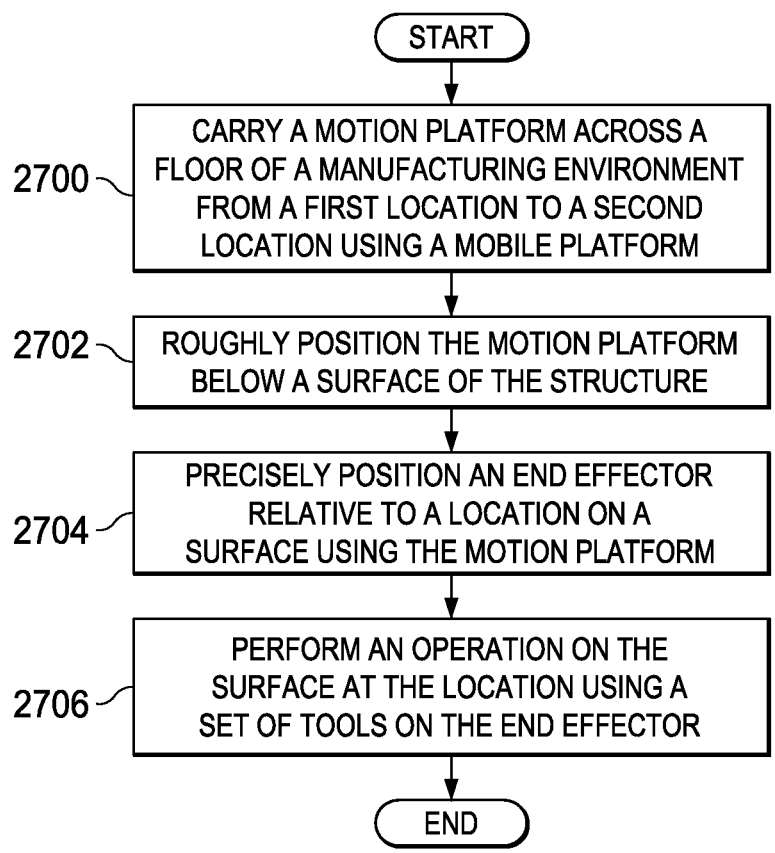
FIG. 27 is an illustration of a flowchart of a process for operating an assembly system to perform an operation on a structure in accordance with an illustrative embodiment.

With reference now to FIG. 27, an illustration of a flowchart of a process for operating assembly system 102 to perform operation 111 on structure 106 from FIG. 1 is depicted in accordance with an illustrative embodiment. In particular, the process illustrated in FIG. 27 may be implemented to install fastener 104 in panel 112. Control of the different operations may be performed by controller 128 in assembly system 102.

The process may begin by carrying motion platform 122 across floor 107 of manufacturing environment 100 from first location 117 to second location 121 using mobile platform 118 (operation 2700). Next, the process may roughly position motion platform 122 below surface 116 of structure 106 (operation 2702).

Thereafter, the process precisely positions end effector 120 relative to location 135 on surface 116 using motion platform 122 (operation 2704). End effector 120 may hold set of tools 132 to perform operation 111 on structure 106. The process then may perform operation 111 on surface 116 at location 135 using set of tools 132 on end effector 120 (operation 2706), with the process terminating thereafter.

Figure 28:
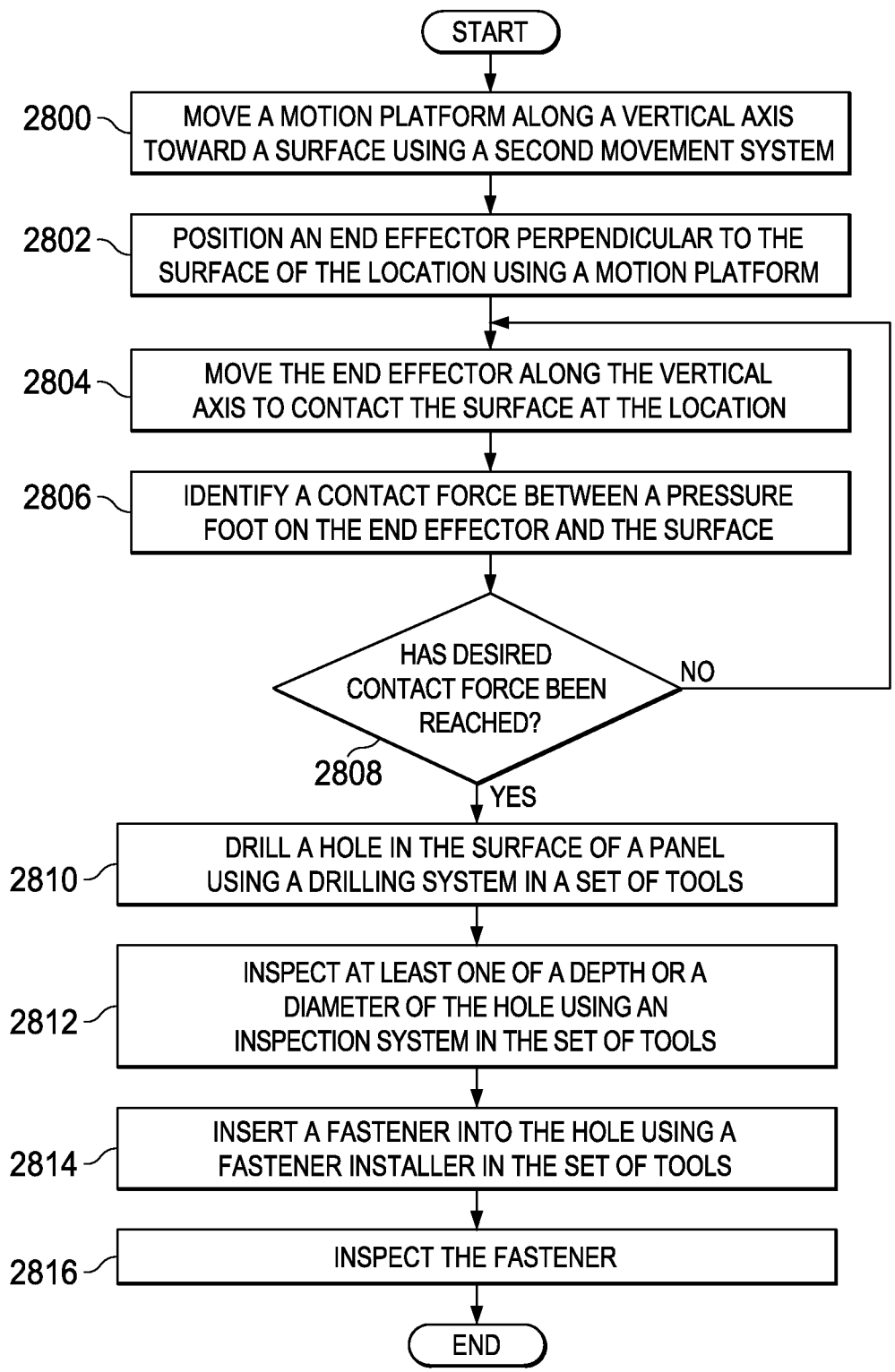
FIG. 28 is an illustration of a flowchart of a process for operating an assembly system to install a fastener in a panel of a structure in accordance with an illustrative embodiment.

Turning next to FIG. 28, an illustration of a flowchart of a process for operating assembly system 102 to install fastener 104 in panel 112 of structure 106 from FIG. 1 is depicted in accordance with an illustrative embodiment. The process illustrated in this figure also may be implemented after mobile platform 118 has reached second location 121.

The process may begin by moving motion platform 122 along vertical axis 136 toward surface 116 using second movement system 124 (operation 2800). The process may position end effector 120 perpendicular to surface 116 of location 135 using motion platform 122 (operation 2802). In some illustrative examples, end effector 120 is not positioned perpendicular to location 135, as described with reference to FIG. 1, above.

In operation 2802, sensor system 138 may identify position 148 of end effector 120 and compare that position to desired position 130 for end effector 120. End effector 120 may then be moved using a combination of components in motion platform 122.

Next, the process may move end effector 120 along vertical axis 136 to contact surface 116 at location 135 (operation 2804). The process identifies contact force 153 between pressure foot 151 on end effector 120 and surface 116 (operation 2806).

In this illustrative example, contact force 153 may be identified using a load cell or other load-sensing device. Contact force 153 may be identified to reduce undesired encounters between end effector 120 and surface 116, to determine whether desired contact force 153 has been reached, or both.

A determination may be made as to whether desired contact force 153 has been reached (operation 2808). The desired contact force 153 provides clamping force for panel 112 and its substructure. In some cases, no clamping force is necessary.

Controller 128 may compare contact force 153 identified by the load cell to a pre-determined contact force. If desired contact force 153 has been reached, the process drills hole 134 in surface 116 of panel 112 using drilling system 140 in set of tools 132 (operation 2810).

Thereafter, the process may inspect at least one of depth 155 or diameter 158 of hole 134 using inspection system 142 in set of tools 132 (operation 2812). For instance, hole probe 160 may be inserted into hole 134 to inspect hole 134. In other illustrative examples, inspection system 142 may inspect countersink depth, countersink angle, countersink normality to location 135, the normality of hole 134 to location 135, countersink diameter, grip length, or some other parameter for hole 134 as well.

The process then may insert fastener 104 into hole 134 using fastener installer 144 in set of tools 132 (operation 2814). In operation 2814, fastener management system 127 may assist fastener installer 144 by applying sealant 164 to fastener 104 and supplying fastener installer 144 with fastener 104 for insertion. The process may inspect fastener 104 (operation 2816), with the process terminating thereafter.

Returning to operation 2808, if desired contact force 153 has not been reached between surface 116 and end effector 120, the process returns to operation 2804 as described above. In this illustrative example, as set of tools 132 perform these operations, set of tools 132 may be moved along track system 147 in shuttle table 146 on end effector 120 to position each tool relative to hole 134. If additional adjustment is needed, at least one of second movement system 124 and motion platform 122 may be used. Further, tool management system 126 may exchange tools in set of tools 132 as needed.

Figure 29:
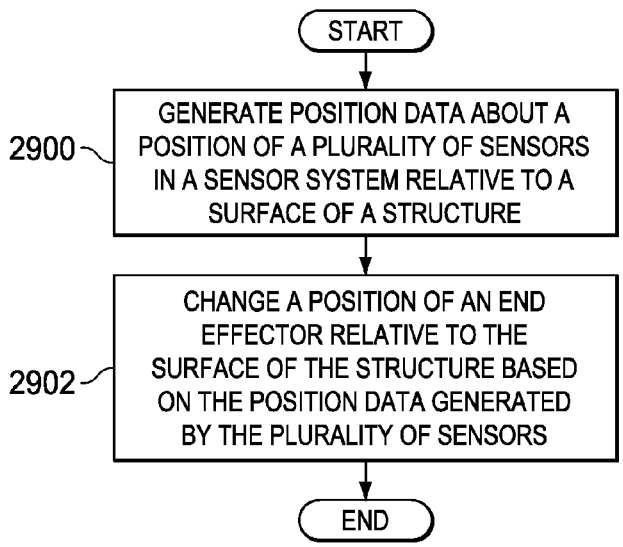
FIG. 29 is an illustration of a flowchart of a process for positioning an end effector relative to a surface of a structure in accordance with an illustrative embodiment.

Referring now to FIG. 29, an illustration of a flowchart of a process for positioning end effector 120 relative to surface 116 of structure 106 from FIG. 1 is depicted in accordance with an illustrative embodiment. The process illustrated in FIG. 29 may be implemented using sensor system 138 with plurality of sensors 1514 as shown in FIG. 15. Control of the different operations may be performed by controller 128 in assembly system 102 shown in FIG. 1.

The process may begin by generating position data 1516 about position 1517 of plurality of sensors 1514 in sensor system 138 relative to surface 116 of structure 106 (operation 2900). Position data 1516 may be generated before, during, or after at least one of plurality of sensors 1514 has contacted surface 116.

The process then may change position 148 of end effector 120 relative to surface 116 of structure 106 based on position data 1516 generated by plurality of sensors 1514 (operation 2902), with the process terminating thereafter. For example, movement system 1520 may change orientation 1524 of end effector 120 to desired orientation 1526 such that pressure foot 151 is substantially parallel to surface 116 of structure 106.

Figure 30:
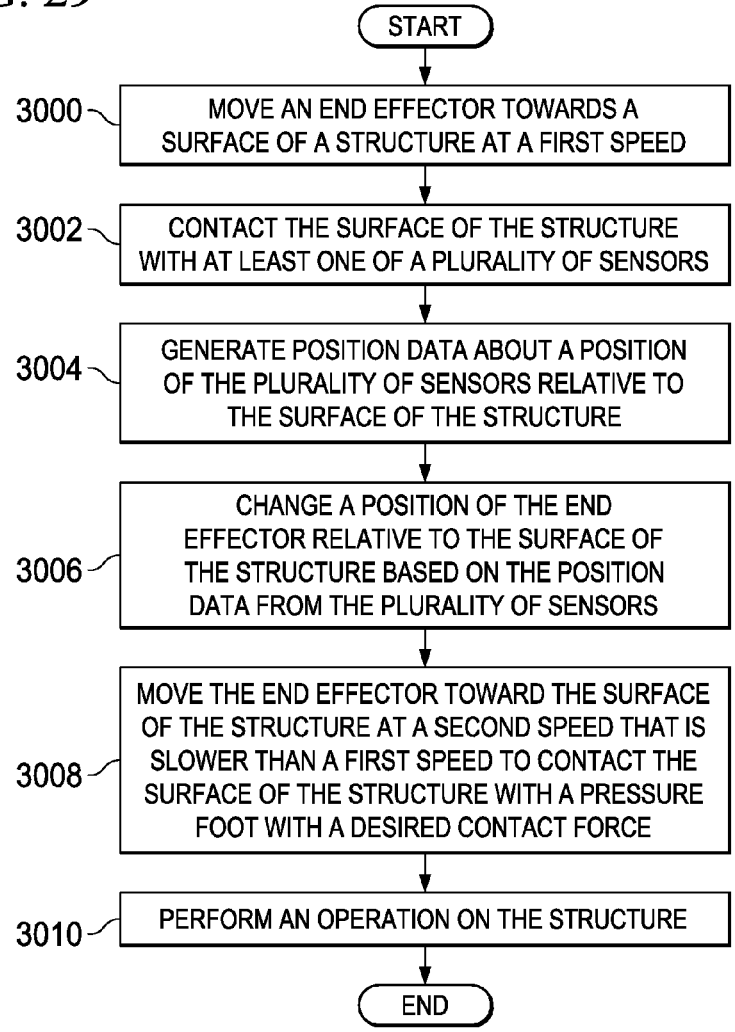
FIG. 30 is an illustration of a flowchart of a process for positioning an end effector relative to a surface of a structure to perform an operation in accordance with an illustrative embodiment.

In FIG. 30, an illustration of a flowchart of a process for positioning end effector 120 relative to surface 116 of structure 106 to perform operation 111 in FIG. 1 is depicted in accordance with an illustrative embodiment. The process illustrated in FIG. 30 may be implemented using sensor system 138 with plurality of sensors 1514 as shown in FIG. 15. The different operations may be controlled by controller 128 in assembly system 102 shown in FIG. 1.

The process may begin by moving end effector 120 toward surface 116 of structure 106 at first speed 1522 (operation 3000). The process then may contact surface 116 of structure 106 with at least one of plurality of sensors 1514 (operation 3002).

Next, position data 1516 may be generated about position 148 of plurality of sensors 1514 relative to surface 116 of structure 106 (operation 3004). Position 148 of end effector 120 may be changed relative to surface 116 of structure 106 based on position data 1516 from plurality of sensors 1514 (operation 3006). Position 148 of end effector 120 relative to surface 116 at location 135 may be changed while end effector 120 travels toward surface 116 at first speed 1522, second speed 1523, or both.

Thereafter, end effector 120 may be moved toward surface 116 of structure 106 at second speed 1523 that is slower than first speed 1522 to contact surface 116 of structure 106 with pressure foot 151 with desired contact force 1506 (operation 3008).

The process then performs operation 111 on structure 106 (operation 3010), with the process terminating thereafter. In particular, fastener 104 may be installed on surface 116 of structure 106 using set of tools 132 on end effector 120.

Figure 31:
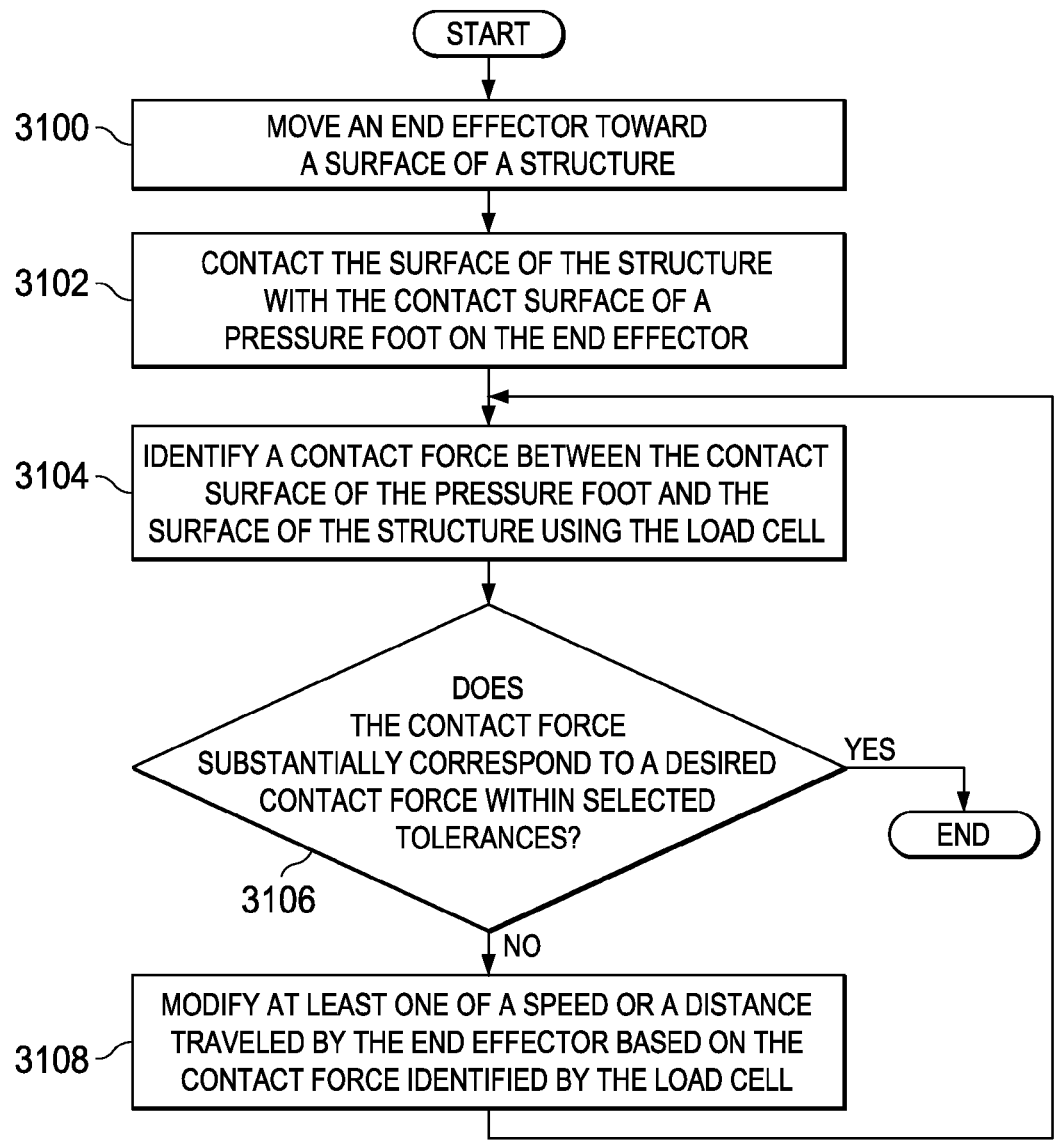
FIG. 31 is an illustration of a flowchart of a process for applying a desired contact force to a structure to clamp the structure in accordance with an illustrative embodiment.

With reference next to FIG. 31, an illustration of a flowchart of a process for applying desired contact force 1506 to structure 106 to clamp structure 106 from FIG. 1 is depicted in accordance with an illustrative embodiment. The process illustrated in FIG. 31 may be implemented using load cell 1508 shown in FIG. 15. Controller 128 in assembly system 102 shown in FIG. 1 may control the different operations.

The process may begin by moving end effector 120 toward surface 116 of structure 106 (operation 3100). Next, the process may contact surface 116 of structure 106 with contact surface 1600 of pressure foot 151 on end effector 120 (operation 3102).

Thereafter, the process may identify contact force 153 between contact surface 1600 of pressure foot 151 and surface 116 of structure 106 using load cell 1508 (operation 3104). The process then may determine whether contact force 153 substantially corresponds to desired contact force 1506 within selected tolerances (operation 3106).

If contact force 153 corresponds to desired contact force 1506, the process terminates. Otherwise, the process modifies at least one of speed 1510 of end effector 120 or distance 1512 traveled by end effector 120 based on contact force 153 identified by load cell 1508 (operation 3108), with the process returning to operation 3104 as described above.

Figure 32:
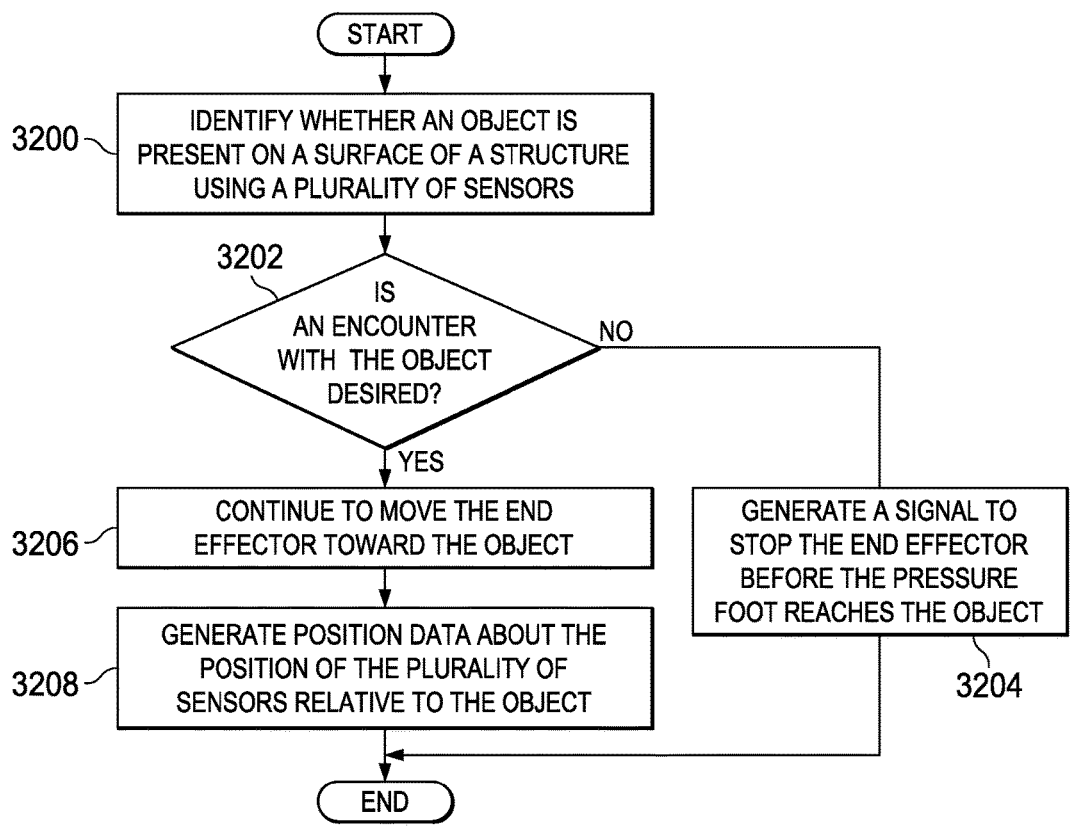
FIG. 32 is an illustration of a flowchart of a process for detecting an object on a surface of a structure using a sensor system in accordance with an illustrative embodiment.

In FIG. 32, an illustration of a flowchart of a process for detecting object 174 on surface 116 of structure 106 using sensor system 138 in FIG. 1 is depicted in accordance with an illustrative embodiment. The process illustrated in FIG. 32 may be implemented using sensor system 138 with plurality of sensors 1514 as shown in FIG. 15. The different operations may be controlled using controller 128 in assembly system 102 shown in FIG. 1.

The process may begin by identifying whether object 174 is present on surface 116 of structure 106 using plurality of sensors 1514 (operation 3200). Next, a determination may be made as to whether an encounter with object 174 is desired (operation 3202).

If an encounter with object 174 is undesired, signal 1538 may be generated to stop end effector 120 before pressure foot 151 reaches object 174 (operation 3204), with the process terminating thereafter. For example, signal 1538 may be generated to stop end effector 120 before reaching debris on surface 116.

If an encounter with object 174 is desired, end effector 120 may continue to move toward object 174 on surface 116 (operation 3206). The process may generate position data 1516 about position 1517 of plurality of sensors 1514 relative to object 174 (operation 3208) with the process terminating thereafter.

For instance, object 174 may be fastener 104 installed in structure 106. Plurality of sensors 1514 may generate position data 1516 to determine flushness 171 for fastener 104 relative to surface 116 of structure 106 in this illustrative example.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of module, a segment, a function, or a portion a combination thereof of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Illustrative embodiments of the disclosure may be described in the context of aircraft manufacturing and service method 3300 as shown in FIG. 33 and aircraft 3400 as shown in FIG. 34. Turning first to FIG. 33, an illustration of a block diagram of an aircraft manufacturing and service method is depicted in accordance with an illustrative embodiment. During pre-production, aircraft manufacturing and service method 3300 may include specification and design 3302 of aircraft 3400 in FIG. 34 and material procurement 3304.

During production, component and subassembly manufacturing 3306 and system integration 3308 of aircraft 3400 in FIG. 34 takes place. Thereafter, aircraft 3400 in FIG. 34 may go through certification and delivery 3310 in order to be placed in service 3312. While in service 3312 by a customer, aircraft 3400 in FIG. 34 is scheduled for routine maintenance and service 3314, which may include modification, reconfiguration, refurbishment, and other maintenance or service.

Each of the processes of aircraft manufacturing and service method 3300 may be performed or carried out by a system integrator, a third party, an operator, or a combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 34, an illustration of a block diagram of an aircraft is depicted in which an illustrative embodiment may be implemented. In this example, aircraft 3400 is produced by aircraft manufacturing and service method 3300 in FIG. 33 and may include airframe 3402 with plurality of systems 3404 and interior 3406. Examples of systems 3404 include one or more of propulsion system 3408, electrical system 3410, hydraulic system 3412, and environmental system 3414. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 3300 in FIG. 33. In particular, assembly system 102 from FIG. 1 may be used during various stages of aircraft manufacturing and service method 3300. For example, without limitation, assembly system 102 may be used to perform operation 111 in a lower panel of aircraft 3400 during component and subassembly manufacturing 3306. Specifically, during component and subassembly manufacturing 3306, sensor system 138 may be used to position pressure foot 151 relative to a surface of aircraft 3400 such that operation 111 may be performed in a desired manner.

In another illustrative example, assembly system 102 may be used to perform inspection operations on aircraft 3400 during routine maintenance and service 3314 or some other stage of aircraft manufacturing and service method 3300. In this case, sensor system 138 may position pressure foot 151 relative to a surface of aircraft 3400 prior to performing inspection operations.

In one illustrative example, components or subassemblies produced in component and subassembly manufacturing 3206 in FIG. 32 may be fabricated or manufactured in a manner similar to components or subassemblies produced while aircraft 3400 is in service 3212 in FIG. 32. As yet another example, one or more apparatus embodiments, method embodiments, or a combination thereof may be utilized during production stages, such as component and subassembly manufacturing 3206 and system integration 3208 in FIG. 32. One or more apparatus embodiments, method embodiments, or a combination thereof may be utilized while aircraft 3400 is in service 3212, during maintenance and service 3214 in FIG. 32, or a combination thereof. The use of a number of the different illustrative embodiments may substantially expedite the assembly, reduce the cost of aircraft 3400, or both.

Thus, the illustrative embodiments may provide a method and apparatus for performing operation 111 on structure 106. In particular, operation 111 may include installing fastener 104. Structure 106 may take the form of panel 112 of wing 114 for aircraft 110 in this illustrative example. Assembly system 102 may comprise mobile platform 118, first movement system 119 associated with mobile platform 118, end effector 120, and motion platform 122. First movement system 119 may be configured to move mobile platform 118 to desired position 130 relative to panel 112 for structure 106. End effector 120 may be configured to hold set of tools 132 and install fastener 104 in panel 112 using set of tools 132. Motion platform 122 may be configured to position set of tools 132 on end effector 120 relative to surface 116 of panel 112 to install fastener 104.

The illustrative embodiments also provide a method and apparatus for positioning end effector 120 relative to structure 106. An apparatus may comprise end effector 120, pressure foot 151 connected to end effector 120, and sensor system 138. End effector 120 may be configured to perform an operation on structure 106. Pressure foot 151 may be configured to contact surface 116 of structure 106 at location 135. Sensor system 138 may have a plurality of sensors extending outward from pressure foot 151. The plurality of sensors may be configured to generate position data about a position of the plurality of sensors relative to location 135 on surface 116 of structure 106.

With the use of assembly system 102, operations may be performed on panel 112 without the need for manual drilling by human operators. The illustrative embodiments provide an autonomous, self-powered system that is capable of navigating under panel 112 without human intervention. In this manner, performing operations on panel 112 may be done more efficiently and in less time than with some currently used systems. As a result, the time, cost, or both time and cost needed to manufacture aircraft 110 may be reduced.

The illustrative embodiments also provide an assembly system with alignment and positioning accuracy. Once under panel 112, end effector 120 with set of tools 132 may move with seven degrees of freedom to move set of tools 132 to desired position 130 perpendicular to surface 116. Sensor system 138 may continuously monitor the position of end effector 120. As a result, normality to surface 116 may be achieved, increasing the consistency and alignment of holes drilled in surface 116.

In addition, sensor system 138, inspection system 142, or both may be used to evaluate performance of assembly system 102. For example, without limitation, sensor system 138 may measure the flushness of a fastener installed in panel 112. Subsequent installations may be modified based on this information to more accurately install fasteners. As another example, inspection system 142 may be used to ensure consistency between holes drilled in panel 112. As a result, less rework may be needed, which further reduces manufacturing time for wing 114.

Illustrative embodiments also allow operations to be performed on panel 112 without the need for fixed monument structures in manufacturing environment 100. Instead, assembly system 102 moves about manufacturing environment 100 using retractable wheels 131. In this manner, manufacturing environment 100 may be reconfigured as needed. Moreover, fewer steps may be needed to set up manufacturing environment 100. Concrete work and monument builds may be reduced or eliminated when no fixed monument structures are used. Accordingly, cost savings may be realized.

Further, plurality of sensors 1514 may be used to change position 148 of end effector 120 prior to pressure foot 151 contacting surface 116 of structure 106 such that pressure foot 151 contacts surface 116 with desired contact force 1506 to clamp structure 106 with its substructure, to reduce the risk of inconsistencies forming in structure 106, to reduce the risk of damage to pressure foot 151, or a combination thereof. In this manner, less rework may be needed on surface 116. Moreover, the life of pressure foot 151 and other components in end effector 120 may be increased. As a result, the production rate of structure 106 may be increased while decreasing the cost of maintenance of the equipment used to manufacture structure 106.

With the use of an illustrative embodiment, speed 1510 at which end effector 120 approaches surface 116 may be increased. Because plurality of sensors 1514 contact surface 116 prior to pressure foot 151, plurality of sensors 1514 allow end effector 120 to change position and continue to move at an increased speed 1510 toward surface 116. Instead of moving slowly through its entire approach to avoid undesired encounters between pressure foot 151 and surface 116, end effector 120 may move rapidly and decelerate right before contact surface 1600 of pressure foot 151 touches surface 116 of structure 106. This increase in speed 1510 may lead to faster cycle times when performing operations using set of tools 132 on end effector 120. As a result, the production rate for structure 106 may be increased.

The illustrative embodiments also provide more accurate position data 1516 as end effector 120 moves toward surface 116. Plurality of sensors 1514 may be used to identify a presence of object 174 protruding from surface 116 of structure 106 and avoid undesired encounters with object 174, inaccurate position data 1516, or both.

In addition, plurality of sensors 1514 may be positioned about a desired location 135 for hole 134 such that more accurate position data 1516 is generated with respect to location 135. With more accurate position data 1516, the consistency and repeatability in performing operations using set of tools 132 may be increased. As a result, less rework may be performed and the cost of manufacturing structure 106 may be reduced.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
an end effector configured to perform an operation on a structure;
a sensor system having a plurality of sensors extending outward from the end effector; and
a pressure foot connected to the end effector and configured to contact a surface of the structure, wherein the plurality of sensors extends outward from the pressure foot.

2. The apparatus of claim 1, wherein the plurality of sensors generate position data about a position of the plurality of sensors relative to the surface of the structure.

3. The apparatus of claim 1, wherein the plurality of sensors is located centrally in the pressure foot and extends outward substantially perpendicular to a contact surface of the pressure foot.

4. An apparatus comprising:
an end effector configured to perform an operation on a structure;
a sensor system having a plurality of sensors extending outward from the end effector; and
a pressure foot connected to the end effector and configured to contact a surface of the structure, wherein the plurality of sensors has an equilateral triangular arrangement.

5. The apparatus of claim 4, wherein each of the plurality of sensors is located at a corner in the equilateral triangular arrangement, and wherein a channel runs through a center of the equilateral triangular arrangement.

6. An apparatus comprising:
an end effector configured to perform an operation on a structure;
a sensor system having a plurality of sensors extending outward from the end effector; and
a pressure foot connected to the end effector and configured to contact a surface of the structure, wherein the plurality of sensors is configured to contact the surface of the structure prior to the pressure foot contacting the surface of the structure.

7. The apparatus of claim 1, wherein the plurality of sensors extends outward from a channel located centrally in the pressure foot.

8. The apparatus of claim further comprising:
a load cell associated with the pressure foot and configured to identify a contact force between the pressure foot and the surface of the structure.

9. The apparatus of claim 8, wherein at least one of a speed of the end effector or a distance traveled by the end effector is modified as the end effector moves toward the surface of the structure based on the contact force identified by the load cell.

10. The apparatus of claim 1, wherein the sensor system is configured to identify whether an object is present on the surface of the structure and generate a signal configured to stop the end effector before the pressure foot reaches the object.

11. The apparatus of claim 1 further comprising:
a movement system configured to change a position of the end effector relative to the surface of the structure based on position data from the plurality of sensors.

12. The apparatus of claim 11, wherein the movement system is configured to dynamically change the position of the end effector as the end effector moves closer to the surface of the structure.

13. The apparatus of claim 11, wherein the movement system is configured to change an orientation of the end effector to a desired orientation prior to contact with the surface of the structure based on the position data from the plurality of sensors.

14. The apparatus of claim 13, wherein the orientation of the end effector is changed as the end effector moves toward the surface of the structure.

15. The apparatus of claim 13, wherein a contact surface of the pressure foot is substantially parallel to the surface of the structure when the end effector is in the desired orientation.

16. The apparatus of claim 13, wherein the movement system moves the end effector at a first speed and reduces the first speed to a second speed prior to the pressure foot contacting the surface of the structure based on the position data from the plurality of sensors.

17. The apparatus of claim 16, wherein a speed of the end effector is dynamically changed from the first speed to the second speed as the end effector moves toward the surface of the structure.

18. The apparatus of claim 1 further comprising:
a biasing system associated with the plurality of sensors and configured to move the plurality of sensors between an extended position and a retracted position in response to the plurality of sensors contacting the surface of the structure.

19. The apparatus of claim 1, wherein the structure is selected from one of a wing, a fuselage, an aileron, a flap, a slat, a spoiler, a stabilizer, a door, a housing, and a nacelle.

20. The apparatus of claim 1, wherein a sensor in the plurality of sensors is selected from one of a linear variable differential transformer, a capacitive transducer, a contact encoder, a capacitive displacement sensor, an eddy-current sensor, an ultrasonic sensor, an ultrasonic sensor, a laser, and a multi-axis displacement transducer.

21. The apparatus of claim 1, wherein the sensor system is configured to measure a flushness of a fastener inserted into a hole drilled in a surface of the structure.

22. The apparatus of claim 1, wherein the end effector is configured to hold a set of tools comprising at least one of a drilling system, an inspection system, a fastener installer, a sealant applicator, a sprayer, or a cleaning system.

23. The apparatus of claim 1 further comprising:
a number of protective elements positioned on at least one sensor in the plurality of sensors and configured to substantially prevent the at least one sensor from scratching a surface of the structure.

24. A method for positioning an end effector relative to a structure, the method comprising:
generating position data about a position of a plurality of sensors in a sensor system relative to a surface of the structure, wherein the plurality of sensors extends outward from a pressure foot associated with the end effector; and
changing a position of the end effector relative to the surface of the structure based on the position data generated by the plurality of sensors.

25. The method of claim 24 further comprising:
changing the position of the end effector as the end effector moves toward the surface of the structure.

26. The method of claim 24, wherein the plurality of sensors is located centrally in the pressure foot and extends outward substantially perpendicular to a contact surface of the pressure foot.

27. The method of claim 26, wherein the plurality of sensors has an equilateral triangular arrangement.

28. The method of claim 27, wherein each of the plurality of sensors is located at a corner in the equilateral triangular arrangement, and wherein a channel runs through a center of the equilateral triangular arrangement.

29. The method of claim 26, wherein the plurality of sensors generate the position data about the position of the plurality of sensors relative to the surface of the structure.

30. The method of claim 26 further comprising:
changing an orientation of the end effector to a desired orientation prior to contact with the surface of the structure based on the position data from the plurality of sensors, wherein the contact surface of the pressure foot is substantially normal to the surface of the structure when the end effector is in the desired orientation.

31. The method of claim 30 further comprising:
changing the orientation of the end effector as the end effector moves toward the surface of the structure.

32. The method of claim 30 further comprising:
moving the end effector at a first speed using a movement system; and
contacting the surface of the structure with at least one sensor in the plurality of sensors as the end effector moves at the first speed.

33. The method of claim 32 further comprising:
reducing the first speed to a second speed prior to the pressure foot contacting the surface of the structure based on the position data from the plurality of sensors.

34. The method of claim 33 further comprising:
reducing the first speed to the second speed as the end effector moves toward the surface of the structure.

35. The method of claim 24 further comprising:
contacting the surface of the structure with the plurality of sensors; and
moving the plurality of sensors between an extended position and a retracted position within a housing of the pressure foot as the end effector moves toward the surface of the structure.

36. The method of claim 24 further comprising:
biasing the plurality of sensors outward from the pressure foot from a channel located centrally in the pressure foot.

37. The method of claim 24 further comprising:
contacting the surface of the structure using the pressure foot with a desired contact force; and
performing an operation on the surface of the structure using a set of tools associated with the end effector.

38. The method of claim 37 further comprising:
moving the set of tools relative to the surface of the structure using a track system on a shuttle table associated with the end effector to perform the operation.

39. The method of claim 24 further comprising:
identifying a contact force between the pressure foot and the surface of the structure using a load cell associated with the pressure foot; and
modifying at least one of a speed of the end effector or a distance traveled by the end effector based on the contact force identified.

40. The method of claim 39 further comprising:
modifying at least one of the speed of the end effector or the distance traveled by the end effector as the end effector moves toward the surface of the structure.

41. The method of claim 24 further comprising:
identifying whether an object is present on the surface of the structure using a sensor in the plurality of sensors, wherein the object protrudes from the surface of the structure; and
generating a signal configured to stop the end effector before the pressure foot reaches the object.

42. The method of claim 24 further comprising:
positioning the plurality of sensors relative to a desired location for a hole to be drilled on the surface of the structure.

43. The method of claim 24 further comprising:
inspecting a flushness of a fastener inserted into a hole drilled in the surface of the structure using the sensor system.

44. The method of claim 43 further comprising:
modifying an operation of the end effector based on the flushness of the fastener.

\* \* \* \* \*